(12) United States Patent
Gordiichuk et al.

(10) Patent No.: US 11,302,156 B1
(45) Date of Patent: Apr. 12, 2022

(54) USER INTERFACES ASSOCIATED WITH DEVICE APPLICATIONS

(71) Applicant: Amazon Technologies, Inc., Seattle, WA (US)

(72) Inventors: Dmytro Gordiichuk, Kyiv (UA); Yuriy Katkov, Kyiv (UA); John Modestine, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 16/429,918

(22) Filed: Jun. 3, 2019

Related U.S. Application Data

(60) Provisional application No. 62/694,854, filed on Jul. 6, 2018.

(51) Int. Cl.
| | |
|---|---|
| G08B 5/22 | (2006.01) |
| G08B 26/00 | (2006.01) |
| G06F 9/54 | (2006.01) |
| H04N 7/18 | (2006.01) |

(52) U.S. Cl.
CPC ............ G08B 5/225 (2013.01); G06F 9/542 (2013.01); G08B 26/008 (2013.01); H04N 7/181 (2013.01)

(58) Field of Classification Search
CPC ....... G08B 5/225; G08B 26/008; G06F 9/542; H04N 7/181
USPC ....................................................... 340/7.55
See application file for complete search history.

(56) References Cited

U.S. PATENT DOCUMENTS

| | | | |
|---|---|---|---|
| 5,422,690 A * | 6/1995 | Rothberg | A61B 3/112 351/209 |
| 6,346,887 B1 * | 2/2002 | Van Orden | G08B 21/06 340/575 |
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |

(Continued)

*Primary Examiner* — Naomi J Small
(74) *Attorney, Agent, or Firm* — Lee & Hayes, P.C.

(57) ABSTRACT

This application is directed to user interfaces for displaying information associated with electronic devices. For instance, a client device may receive a request to open an application. The client device may then receive, from a network device, image data generated by one or more electronic devices. Using the image data, the client device may display one or more images represented by the image data on a user interface, where an individual image is associated with a respective electronic device. After a time period has elapsed, the client device may receive, from the network device, additional image data generated by the one or more electronic devices, where the additional image data represents one or more updated images. The client device may then display the one or more updated images, instead of the one or more images, using the user interface.

20 Claims, 27 Drawing Sheets

(56) References Cited

U.S. PATENT DOCUMENTS

| | | |
|---|---|---|
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2007/0291232 A1* | 12/2007 | Marshall ................ G16H 50/20 351/246 |
| 2014/0280516 A1* | 9/2014 | Flowers .................. H04L 67/26 709/203 |
| 2015/0205126 A1* | 7/2015 | Schowengerdt ..... G06K 9/0061 345/633 |
| 2015/0288877 A1* | 10/2015 | Glazer .................. A61B 5/1114 348/77 |
| 2016/0099963 A1* | 4/2016 | Mahaffey .............. H04W 12/12 726/25 |
| 2016/0150190 A1* | 5/2016 | Hatae ............... G08B 13/19693 348/159 |
| 2016/0227259 A1* | 8/2016 | Brav .................. G06K 9/00624 |
| 2016/0266643 A1* | 9/2016 | Martensson ......... A61B 3/0041 |
| 2016/0300316 A1* | 10/2016 | Beseda .................. G06F 16/54 |
| 2017/0237986 A1* | 8/2017 | Choi ...................... H04W 4/80 348/14.02 |
| 2017/0257602 A1* | 9/2017 | Axson ............. G08B 13/19689 |
| 2017/0322687 A1* | 11/2017 | Lavian .................. G06F 16/972 |
| 2018/0054590 A1* | 2/2018 | Mok .................... H04N 21/437 |
| 2018/0101735 A1* | 4/2018 | Lemberger ............ H04L 67/06 |
| 2018/0220189 A1* | 8/2018 | Hodge ............... H04N 21/2347 |
| 2018/0242037 A1* | 8/2018 | Kazantsev ......... H04N 21/4627 |
| 2019/0356505 A1* | 11/2019 | Madden ............... H04L 12/282 |

\* cited by examiner

USER INTERFACES ASSOCIATED WITH DEVICE APPLICATIONS

RELATED APPLICATION

This application claims priority to U.S. Provisional Patent Application Ser. No. 62/694,854, filed on Jul. 6, 2018, titled "USER INTERFACES ASSOCIATED WITH DEVICE APPLICATIONS," the entire contents of which are incorporated herein by reference.

BRIEF DESCRIPTION OF THE DRAWINGS

The various embodiments of the present disclosure are directed to user interfaces associated with device applications, which will now be discussed in detail with an emphasis on highlighting the advantageous features. These embodiments depict the novel and non-obvious embodiments of user interfaces associated with device applications, as shown in the accompanying drawings, which are for illustrative purposes only. These drawings include the following figures, in which like numerals indicate like parts.

DETAILED DESCRIPTION

Figure 1A:
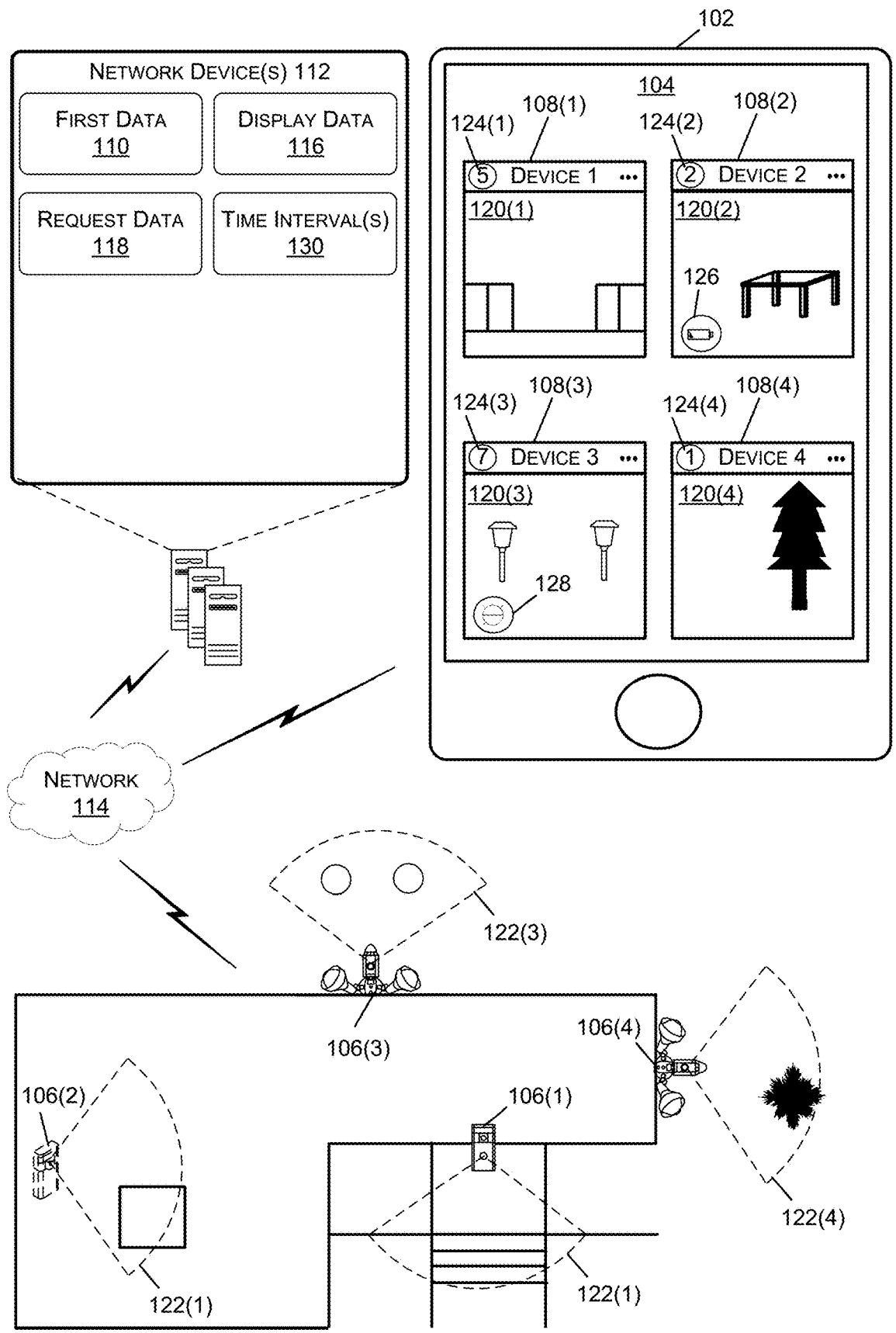
FIGS. 1A-1D are schematic diagrams of examples of a client device displaying a graphical user interface that includes content, and then updating the content included in the graphical user interface based on data generated by A/V devices, according to various aspects of the present disclosure.

One aspect of the present embodiments includes the realization that use an application for monitoring A/V recording and communication device(s) (referred to herein as "A/V devices") may not provide the user with an easily digestible format for monitoring the A/V device(s). For example, if a client device executing the application is providing live view(s) from one or more A/V device(s), the client device may continuously receive respective image data stream(s) generated by each of the A/V device(s), where the image data stream(s) represent(s) live video feed(s) from the A/V device(s). However, network connectivity of the client device (e.g., the bandwidth of the network to which the client device is connected) and/or network connectivity of the A/V device(s) at their respective locations may be insufficient to enable clear and uninterrupted streaming of the live video to the client device. As such, the live video displayed by the client device may freeze, buffer, and/or be of low quality. As a result, it may be difficult for the user to determine what is occurring within the field(s) of view of the A/V device(s), and the user may be less likely to use the application to view or monitor his or her home.

The present embodiments solve this problem by, for example, providing an application that displays a respective still image for each of the A/V device(s) that may transmit image data to a client device. For example, a respective portion of the application (e.g., a respective tile) may be associated with each of the A/V device(s), where a portion associated with an A/V device displays a still image generated by the A/V device. At given time intervals, the client device may receive new still images generated by the A/V device(s) and update the previous image(s) being displayed within the application using the new still images. As such, in some examples, instead of continuously receiving live video (e.g., streaming video) generated by each of the A/V device(s) in order to provide video feed(s) within the application, the client device may periodically receive the still images generated by the A/V device(s) at the given time intervals, and then update the image(s) using the most recently received images. By receiving the still images and/or updating the image(s) at the given time intervals, the client device may have the capacity to receive the image data from the A/V device(s) even when the network connectivity of the client device is poor (e.g., the bandwidth of the network includes a slow rate) and/or the network connectivity at the location(s) of the A/V device(s) is poor. As such, the client device may be able to provide the user with periodically updated still image(s) from the A/V device(s), where the image(s) are of high quality such that the user may determine what is occurring within the field(s) of view of the A/V device(s).

Another aspect of the present embodiments includes the realization that battery powered A/V devices may quickly become depleted of power when configured to provide on-demand live video to the user. For example, in order to provide the live view, the A/V device may activate (e.g., provide power to) a camera in order to generate image data representing a video feed that is associated with the live view. Additionally, the A/V device may activate (e.g., provide power to) one or more microphone(s) in order to generate audio data representing sound that is proximate to the A/V device. Furthermore, the A/V device may activate (e.g., provide power to) a network interface in order to continuously transmit the image data and the audio data to a network device and/or the client device. By activating each of the camera, the microphone(s), and the network interface, the A/V device may use an undesired amount of power from the battery, which may cause the power to quickly be depleted.

The present embodiments solve this problem by, for example, providing an application that updates image(s) being captured by A/V device(s) at given time intervals while a user is monitoring the A/V device(s). For example, an A/V device, such as a battery powered A/V device, may generate and then transmit image data to a network device and/or a client device at given time intervals, where the image data represents an image. In some examples, based on the power level of the battery, the given time intervals may be increased, such that the A/V device is activating the camera to generate the image data and/or activating a network interface to transmit the image data less often. The client device executing the application may then display a respective image each time the client device receives an image data. By activating the camera and/or the network interface less often, the A/V device may use less power from the battery while, at the same time, providing updated images to the client device so that the user can monitor the A/V device. As such, the A/V device may conserve the power of the battery which may cause the battery to last for longer durations of time.

For example, the present disclosure describes, in part, graphical user interfaces (GUIs) that provide content in order to allow a user to monitor A/V device(s). For example, a client device may receive an input associated with opening an application. Based on the input, the client device may open the application (e.g., begin executing the application) that includes a GUI for monitoring the A/V device(s). A respective portion of the GUI may be associated with each of the A/V device(s). For example, a portion of the GUI that is associated with an A/V device may display content related to the A/V device. The content may include, but is not limited to, an identity of the A/V device, image(s) represented by image data generated by the A/V device, an indication of when the latest image data representing an image was generated by the A/V device, an indication of a number of events captured by the A/V device (e.g., since the GUI was last viewed by the user, since the user last viewed events associated with the A/V device, etc.), an indication of (e.g., a graphical element indicating) a battery level associated with the A/V device (e.g., if the A/V device is battery powered), an indication of (e.g., a graphical element indicating) whether a light source of the A/V device is activated (e.g., if the A/V device includes a light source), an indication of (e.g., a graphical element indicating) whether the A/V device is operating in a mode in which notifications are deactivated (e.g., a snooze mode), and/or the like. In some examples, the GUI may include a dashboard, where each of the portions associated with the A/V device(s) includes a tile of the dashboard. In some examples, the portions of the GUI may be arranged in a grid pattern, while in other examples, the portions of the GUI may be arranged in a list pattern, a globe pattern, and/or the like.

While displaying the GUI, the client device may obtain data (referred to, in this example, as "first data") associated with the A/V device(s) and update the content using the first data. The first data may include, but is not limited to, data indicating the identity(ies) of the A/V device(s), image data (referred to, in this example, as "first image data") generated by the A/V device(s), data indicating a respective time at which the first image data was generated by each of the A/V device(s) (e.g., a timestamp), data indicating a respective number of events captured by each of the A/V device(s), data indicating a respective battery level associated with each of the A/V device(s), data indicating whether a respective light source of each of the A/V device(s) is activated (e.g., turned on, receiving power, emitting light, etc.), data indicating whether each of the A/V device(s) is operating in the mode in which notifications are deactivated, and/or the like.

In some examples, the client device may obtain at least a portion of the first data from network device(s) (e.g., servers, storage devices, smart-home hub devices, application programming interface(s) (API(s)), and/or the like). For example, based on receiving input to display the GUI and/or based on initially displaying the GUI (and/or based on opening the application), the client device may transmit data (referred to, in this example, as "second data") to the network device(s), where the second data indicates that the client device is displaying the GUI (and/or that the application is open). Based on the second data, the network device(s) may transmit at least the portion of the first data to the client device. In some examples, the network device(s) may store at least a portion of the first data, such as in a database. In some examples, the network device(s) may transmit data (referred to, in this example, as "third data") to one or more of the A/V device(s), where the third data includes a request for at least a portion of the first data. The network device(s) may then receive the at least the portion of the first data from the one or more A/V device(s).

Additionally to, or alternatively from, receiving the at least the portion of the first data from the network device(s), in some examples, the client device may store at least a portion of the first data in a memory. In such examples, the at least the portion of the first data may represent content that was displayed by the client device the previous time the client device was displaying the GUI. For example, the at least the portion of the first data being stored by the client device may include image data generated by one or more of the A/V device(s), where the image data represents image(s) displayed by the GUI when the client device previously displayed in the GUI. Based on receiving the input to display the GUI and/or based on initially displaying the GUI, the client device may retrieve the at least the portion of the first data, such as from the memory of the client device.

The client device may then use the first data to update the content within the GUI. For example, and for each portion of the GUI that is associated with an A/V device, the client device may use the first data to display the identity of the A/V device, an image (referred to, in this example, as a "first image") represented by the first image data generated by the A/V device, the indication of when the first image data was generated, the indication of the number of events captured by the A/V device, the indication of (e.g., the graphical element indicating) the battery level associated with the A/V device, the indication of (e.g., the graphical element indicating) whether the light source of the A/V device is activated, the indication of (e.g., the graphical element indicating) whether the A/V device is operating in a mode in which notifications are deactivated, and/or the like. The client device may then update (and/or the network device(s) may cause the client device to update) the content for the A/V device(s) at given time intervals.

In some examples, the client device updates (and/or the network device(s) cause the client device to update) the respective content for each of the A/V device(s) using a same time interval. In some examples, the client device updates (and/or the network device(s) cause the client device to update) the respective content for each of the A/V device(s) using a different time interval. For a first example, the client device (and/or the network device(s)) may use a first time interval for A/V device(s) that are powered using external power source(s) and a second, longer time interval for A/V device(s) that are powered using a batter(ies) (e.g., to extend the battery life of the battery powered devices). For a second example, the client device (and/or the network device(s)) may use a first time interval for a first A/V device and a second, different time interval for a second A/V device.

In some examples, the client device (and/or the network device(s)) may change the time interval for an A/V device based on the amount of power remaining within the battery of the A/V device. For example, the client device (and/or the network device(s)) may use a first time interval when the battery includes a first amount of power and a second, longer time interval when the battery includes a second, lesser amount of power. Still, in some examples, the client device (and/or the network device(s)) may change the interval(s) for the A/V device(s) based on how long the client device has been displaying the GUI. For a first example, the client device (and/or the network device(s)) may use first time interval(s) when the client device initially begins displaying the GUI and second, longer time interval(s) the longer the client device is displaying the GUI (e.g., to extend battery life of battery powered devices). For a second example, the client device (and/or the network device(s)) may use first time interval(s) when the client device initially begins displaying the GUI and second, shorter time interval(s) the longer the client device is displaying the GUI (e.g., since the user may be monitoring the A/V device(s) and as such, would want to the content to be updated at shorter time intervals). In either example, a time interval may include, but is not limited to, one second, five seconds, thirty seconds, one minute, and/or the like. In any example, the time intervals may be default time intervals, standard time intervals, user-defined time intervals, or a combination thereof.

For example, at the elapse of a given time interval for an A/V device, the network device(s) may receive data (referred to, in this example, as "fourth data") from the A/V device. The fourth data may include, but is not limited to, data indicating the identity of the A/V device, image data (referred to, in this example, as "second image data") generated by the A/V device, data indicating a time at which the second image data was generated by the A/V device (e.g., a timestamp), data indicating a respective number of events captured by A/V device, data indicating a respective battery level associated with the A/V device, data indicating whether a respective light source of the A/V device is activated, data indicating whether the A/V device is operating in the mode in which alerts are deactivated, and/or the like. In some examples, the network device(s) receive the fourth data based on transmitting data (referred to, in this example, as "fifth data") to the A/V device, where the fifth data includes a request for the fourth data. In some examples, the network device(s) receive the fourth data (and/or transmit the fifth data) based on determining that the client device is still displaying the GUI. The network device(s) may determine that the client device is still displaying the GUI based on receiving, from the client device, data (referred to, in this example, as "sixth data") indicating that the client device is still displaying the GUI (and/or that the application is still open on the client device).

The network device(s) may then transmit the fourth data to the client device. Using the fourth data, the client device may update the content being displayed within the portion of the GUI that is associated with the A/V device. For example, the client device may at least replace the first image being displayed within the portion of the GUI with an image (referred to, in this example, as a "second image") represented by the second image data from the fourth data. The network device(s) and/or the client device may then continue to perform similar processes and/or techniques for updating the content associated with the A/V device each time the given time interval associated with the A/V device elapses. Additionally, the network device(s) and/or the client device may then perform similar processes and/or techniques for updating the content associated with each of the other A/V device(s).

In some examples, the client device may allow the user to interact with the GUI. For a first example, the client device may receive an input selecting a portion of the GUI that is associated with an A/V device. Based on the input, the client device may transmit data (referred to, in this example, as "seventh data") to the network device(s), where the seventh data indicates the selection of the portion of the GUI associated with the A/V device. The network device(s) may then transmit data (referred to, in this example, as "eighth data") to the A/V device, where the eighth data includes a request for image data (referred to, in this example, as "third image data"). The A/V device may generate the third image data and then transmit the third image data to the network device(s), which may transit the third image data to the client device. The client device may then display image(s) (referred to, in this example, as "third image(s)") represented by the third image data. In some examples, the client device displays the third image(s) within the portion of the GUI that is associated with the A/V device. In some examples, the client device may first display a second GUI, and then the client device displays the third image(s) within the second GUI. In some examples, the third image(s) may include a single image while in other examples, the third image(s) may include multiple images (e.g., a video feed). For example, the client device may continue to receive the third image data from the network device(s) and display the third images represented by the third image data.

In some examples, such as when the client device displays the third image(s) within the portion of the GUI that is associated with the A/V device, the client device may receive a second input selecting the portion of the GUI. Based on the second input, the client device may display a second GUI. Additionally, in some examples, the client device may display third image(s) represented by third image data generated by the A/V device using the second GUI. Additionally, or alternatively, in some examples, the client device may transmit data (referred to, in this example, as "ninth data") to the network device(s), where the ninth data indicates the second selection of the portion of the GUI associated with the A/V device. The network device(s) may then transmit data (referred to, in this example, as "tenth data") to the A/V device, where the tenth data includes a request for image data (referred to, in this example, as "fourth image data"). The A/V device may generate the fourth image data and then transmit the fourth image data to the network device(s), which may then transit the fourth image data to the client device. The client device may then display image(s) (referred to, in this example, as "fourth image(s)") represented by the fourth image data using the second GUI.

In some examples, the client device may receive an input selecting an interface element being displayed within a portion of the GUI that is associated with an A/V device. Based on the input, the client device may perform one or more actions. For a first example, if the interface element is associated with a light source of the A/V device, the client device may transmit data (referred to, in this example, as "eleventh data") to the network device(s), where the eleventh data includes a command to activate the light source. The network device(s) may then transmit data (referred to, in this example, as "twelfth data") to the A/V device that causes the A/V device to activate (e.g., turn on, provide power to, cause to emit light, etc.) the light source. For a second example, if the interface element is associated with disabling notifications of the A/V device (e.g., snoozing the A/V device), the client device may refrain from presenting messages indicating that the A/V device detected an object (and/or motion of an object). For a third example, if the interface element is associated with causing the A/V device to output sound (e.g., activate a siren), the client device may transmit data (referred to, in this example, as "thirteenth data") to the network device(s), where the thirteenth data includes a command to cause the A/V device to output the sound. The network device(s) may then transmit data (referred to, in this example, as "fourteenth data") to the A/V device that causes the A/V device to output the sound.

In some examples, the GUI may allow the user to control a security system associated with the property. For example, the GUI may include interface elements associated with the security system. The interface elements may include, but are not limited to, a first interface element for disarming the security system (e.g., causing the security system to enter a disarmed mode), a second interface element for causing the security system to enter a first armed mode (e.g., a home mode), a third interface element for causing the security system to enter a second armed mode (e.g., an away mode), and so forth. While displaying the GUI, the client device may receive an input selecting one of the interface elements. The client device may then transmit data (referred to, in this example, as "fifteenth data") to the network device(s), where the fifteenth data includes a command change a mode of the security system (e.g., disarm the security system, arm the security system according to a mode, etc.). The network device(s) may then transmit data (referred to, in this example, as "sixteenth data") to an electronic device (e.g., a hub device, a voice assistant (VA) device, etc.) that controls the security system, where the sixteenth data causes the electronic device to change the mode of the security system.

In addition, the GUI may include at least a portion of the GUI for displaying status information and/or state information of one or more sensors and/or one or more automation devices associated with the security system. For example, textual information and/or icons represented by data indicative of door sensors and window sensors being opened or closed, door locks being locked or unlocked, garages being opened or closed, lights being on or off, motion sensors detecting or not detecting objects (and/or motion of objects), glass-break sensors detecting broken glass (or the absence thereof), moisture sensors detecting moisture (or the absence thereof), flood and/or freeze sensors detecting flood or freeze (or the absence thereof), and/or the like may be displayed within the GUI. In some examples, a time that the most current state and/or status of the sensor(s) and/or automation device(s) was entered may be included within the textual information and/or the icon(s) (e.g., "Front door closed as of (or since) 10:15 AM," "Garage door opened since 11:47 PM, yesterday," "Moisture sensor detects no moisture since 7-01-2018," and/or the like). In some examples, the textual information and/or the icons for each of the sensor(s) and/or automation device(s) may be displayed at all times, while in other examples, the textual information and/or the icons may be displayed in a rolling list (e.g., display textual information about a door sensor being closed, then display textual information about another door sensor being closed, then display textual information about a motion sensor not currently detecting motion, and so on). Additionally, or alternatively, in some examples, the textual information and/or icons may be displayed for groups of devices. For example, textual information for all doors may be displayed (e.g., "All doors currently closed/secure"), then (or concurrently), textual information for all motion sensors may be displayed (e.g., "All motion sensors cleared," or "All motion sensors not currently detecting motion"). In any example, once one or more sensors and/or one or more automation devices have a change in state and/or status, the GUI may be updated to include the sensor(s) and/or automation device(s) that had the change in state and/or status, and an indication of the change in state and/or status (e.g., "The front door was just opened," "Living room motion sensor detected motion," "The garage is open," "Glass-break detected downstairs," and so on). In some examples, the portion(s) of the GUI associated with any A/V device(s) that may be relevant to the change in state and/or status of one or more of the sensors and/or automation devices may be updated to indicate the relevance. For example, if a front door sensor is tripped (e.g., somebody opens the front door), the portion of the GUI associated with an A/V doorbell installed at the front door may be updated (e.g., a new image may be displayed represented by new image data obtained from the A/V doorbell, live streaming of video represented by the new image data may be displayed in the portion of the GUI, a visual indicator may be displayed, such as by highlighting the portion of the GUI, providing an icon within the portion of the GUI, and/or the like, etc.).

In some examples, while displaying the GUI, one of the A/V device(s) may detect an object (e.g., motion of an object). The A/V device may then generate a message indicating that the object was detected (and/or the motion was detected) and transmit the message to the network device(s) and/or the client device. Additionally, in some examples, the A/V device may generate image data (referred to, in this example, as "fifth image data") and then transmit the fifth image data to the network device(s) and/or the client device. The client device may receive the message from the A/V device and/or the network device(s) and, based on receiving the message, display the message. Additionally, in some examples, the client device may receive the fifth image data from the A/V device and/or the network device(s) and, based on receiving the fifth image data, display image(s) (referred to, in this example, as "fifth image(s)") represented by the fifth image data. In some examples, the client device displays the fifth image(s) within the portion of the GUI that is associated with the A/V device. In some examples, the client device may display a second GUI and then display the fifth image(s) within the second GUI. In some examples, the fifth image(s) may include a single image while in other examples, the fifth image(s) may include multiple images (e.g., a video feed). For example, the client device may continue to receive the fifth image data from the A/V device and/or the network device(s) while the A/V device is detecting the object (and/or for a threshold period of time after the A/V device detected the object), and display the fifth images represented by the fifth image data.

In some examples, the client device may cease from displaying the GUI. The client device may then transmit data (referred to, in this example, as "seventeenth data") to the network device(s), where the seventeenth data indicates that the client device is no longer displaying the GUI. In some examples, the network device(s) may then store data (referred to, in this example, as "eighteenth data") that represents at least a portion of the content that was being displayed by the client device using the GUI. For example, the eighteenth data may include image data representing each of the image(s) that were being displayed by the client device using the GUI. The eighteenth data may further include data that indicates a respective time the image data was generated by each of the A/V device(s). In some examples, the client device may further store data (referred to, in this example, as "nineteenth data"). The nineteenth data may be similar to the eighteenth data.

Although the above description includes the network device(s) transmitting, the to the A/V device(s), data that includes requests for image data (e.g., at the expiration of the time interval(s)), in other examples, the network device(s) may be continuously receiving the image data from the A/V device(s) and storing the image data, such as in a database. Additionally, in such examples, the network device(s) may retrieve the image data, such as at the expiration of the time interval(s) and/or based on determining that the client device is still displaying the GUI, and transmit the image data to the client device. The image data may represent image(s) that were generated by the A/V device(s) at the expiration of the time interval(s).

The remaining detailed description describes the present embodiments with reference to the drawings. In the drawings, reference numbers label elements of the present embodiments. These reference numbers are reproduced below in connection with the discussion of the corresponding drawing features.

FIGS. 1A-1D are schematic diagrams of examples of a client device 102 displaying a graphical user interface (GUI) 104 that includes content, and then updating the content included in the GUI 104 based on data generated by A/V devices 106(1)-(4), according to various aspects of the present disclosure. For example, the client device 102 may receive an input associated with opening an application (e.g., executing the application) that includes the GUI 104 for monitoring the A/V device(s) 106(1)-(4). A respective portion 108(1)-(4) of the GUI 104 may be associated with each of the A/V device(s) 106(1)-(4). For example, a first portion 108(1) of the GUI 104 may be associated with the first A/V device 106(1), a second portion 108(2) of the GUI 104 may be associated with the second A/V device 106(2), a third portion 108(3) of the GUI 104 may be associated with the third A/V device 106(3), and a fourth portion 108(4) of the GUI 104 may be associated with the fourth A/V device 106(4). In some examples, the GUI 104 may correspond to a dashboard being provided by the client device 102, where each of the portions 108(1)-(4) of the dashboard corresponds to a tile for displaying content associated with a respective A/V device 106(1)-(4).

For example, while displaying the GUI 104, the client device 102 may obtain data (which may be represented by "first data 110") associated with the A/V devices 106(1)-(4) and update the content using the first data 110. The first data 110 may include, but is not limited to, data indicating the identit(ies) of the A/V devices 106(1)-(4), image data (referred to, in this example, as "first image data") generated by the A/V devices 106(1)-(4), data indicating a respective time at which the first image data was generated by each of the A/V devices 106(1)-(4) (and/or a respective time since the image data was captured) (e.g., timestamps), data indicating a respective number of events captured by each of the A/V devices 106(1)-(4), data indicating a respective battery level associated with each of the A/V devices 106(1)-(4), data indicating whether a respective light source of each of the A/V devices 106(3)-(4) is activated, data indicating whether each of the A/V devices 106(1)-(4) is operating in the mode in which notifications are deactivated, and/or the like.

In some examples, the client device 102 may obtain at least a portion of the first data 110 from network device(s) 112. For example, based on receiving input to display the GUI 104 and/or based on initially displaying the GUI 104 (and/or based on opening the application), the client device 102 may transmit, over the network 114, data (which may be represented by "display data 116")) to the network device(s) 112, where the display data 116 indicates that the client device 102 is displaying the GUI 104 (and/or that a request to view the GUI was received by the client device 102) (and/or a request for image data generated by the A/V devices 106(1)-(4) for display by the client device 102) (and/or an indication that the application is open on the client device 102). Based on the display data 116, the network device(s) 112 may transmit, over the network 114, the at least the portion first data 110 to the client device 102. In some examples, the network device(s) 112 may store at least a portion of the first data 110, such as in a database. For example, the at least the portion of the first data 110 may represent content that was being displayed by the client device 102 during a previous duration of time at which the client device 102 was displaying the GUI 104. Additionally, or alternatively, in some examples, the network device(s) 112 may transmit, over the network 114, data (which may be represented by "request data 118")) to one or more of the A/V device(s) 106(1)-(4), where the request data 118 includes a request for at least a portion of the first data 110. The network device(s) may then receive, over the network 114, the at least the portion of the first data 110 from the one or more A/V device(s) 106(1)-(4).

Additionally to, or alternatively from, receiving the at least the portion of the first data 110 from the network device(s) 112, in some examples, the client device 102 may store at least a portion of the first data 110 in a memory. In such examples, the at least the portion of the first data 110 may represent content that was displayed by the client device 102 during a previous duration of time at which the client device 102 was displaying the GUI 104. For example, the at least the portion of the first data 110 being stored by the client device 102 may include image data generated by one or more of the A/V device(s) 106(1)-(4), where the image data represents image(s) displayed by the GUI 104 when the GUI 104 was previously displayed by the client device 102. Based on receiving the input to display the GUI 104 and/or based on initially displaying the GUI 104, the client device 102 may retrieve the at least the portion of the first data 110, such as from the memory of the client device 102.

In either example, the client device 102 may then use the first data 110 to update the content within the GUI 104. For example, and as illustrated in FIG. 1A, within the first portion 108(1) of the GUI 104, the client device 102 is displaying an image 120(1) represented by the first image data generated by the first A/V device 106(1), where the image 120(1) represents a first field of view 122(1) of the first A/V device 106(1), and an indication 124(1) of a number of events detected by the first A/V device 106(1) since the client device 102 last displayed the GUI 104 and/or since the client device 102 last displayed events associated with the first A/V device 106(1). Additionally, within the second portion 108(2) of the GUI 104, the client device 102 is displaying an image 120(2) represented by the first image data generated by the second A/V device 106(2), where the image 120(2) represents a second field of view 122(2) of the second A/V device 106(2), an indication 124(2) of a number of events detected by the second A/V device 106(2) since the client device 102 last displayed the GUI 104 and/or since the client device 102 last displayed events associated with the second A/V device 106(2), and a graphical element 126 indicating that a battery of the second client device 106(2) is below a threshold battery level.

Furthermore, within the third portion 108(3) of the GUI 104, the client device 102 is displaying an image 120(3) represented by the first image data generated by the third A/V device 106(3), where the image 120(3) represents a third field of view 122(3) of the third A/V device 106(3), an indication 124(3) of a number of events detected by the third A/V device 106(3) since the client device 102 last displayed the GUI 104 and/or since the client device 102 last displayed events associated with the third A/V device 106(3), and a graphical element 128 indicating that a light source of the third A/V device 106(3) is activated (e.g., turned on, receiving power. Moreover, within the fourth portion 108(4) of the GUI 104, the client device 102 is displaying an image 120(4) represented by first image data generated by the fourth A/V device 106(4), where the image 120(4) represents a fourth field of view 122(4) of the fourth A/V device 106(4), and an indication 124(4) of a number of events detected by the fourth A/V device 106(4) since the client device 102 last displayed the GUI 104 and/or since the client device 102 last displayed events associated with the fourth A/V device 106(4).

The client device 102 may then update (and/or the network device(s) 112 may cause the client device 102 to update) the content for the A/V devices 106(1)-(4) at given time intervals 130. In some examples, the client device 102 updates (and/or the network device(s) 112 cause the client device 102 to update) the respective content for each of the A/V devices 106(1)-(4) using a same time interval 130. In some examples, the client device 102 updates (and/or the network device(s) 112 cause the client device 102 to update) the respective content for each of the A/V devices 106(1)-(4) using a different time interval 130. For a first example, the client device 102 (and/or the network device(s) 112) may use a first time interval 130 for A/V devices (e.g., the third A/V device 106(3) and the fourth A/V device 106(4)) that are powered using external power sources and a second, longer time interval 130 for A/V devices (e.g., the first A/V device 106(1) and the second A/V device 106(2)) that are powered using batteries. For a second example, the client device 102 (and/or the network device(s) 112) may use a first time interval 130 for the first A/V device 106(1) and a second time interval for the second A/V device 106(2).

In some examples, the client device 102 (and/or the network device(s) 112) may change the time interval 130 for an A/V device (e.g., the first A/V device 106(1) and the second A/V device 106(2)) based on the amount of power remaining within the battery of the A/V device. For example, the client device 102 (and/or the network device(s) 112) may use a first time interval 130 when the battery includes a first amount of power and a second, longer time interval 130 when the battery includes a second, lesser amount of power. Still, in some examples, the client device 102 (and/or the network device(s) 112) may change the time interval(s) 130 for the A/V device(s) 106(1)-(4) based on how long the client device 102 has been displaying the GUI 104. For a first example, the client device 102 (and/or the network device(s) 112) may use a first time interval 130 when the client device 102 initially begins displaying the GUI 104 a use second, longer time intervals 130 the longer the client device 102 is displaying the GUI 104. For a second example, the client device 102 (and/or the network device(s) 112) may use a first time interval 130 when the client device 102 initially begins displaying the GUI 104 a use second, shorter time intervals 130 the longer the client device 102 is displaying the GUI 104. In either example, a time interval 130 may include, but is not limited to, one second, five seconds, thirty seconds, one minute, and/or the like.

Figure 1B:
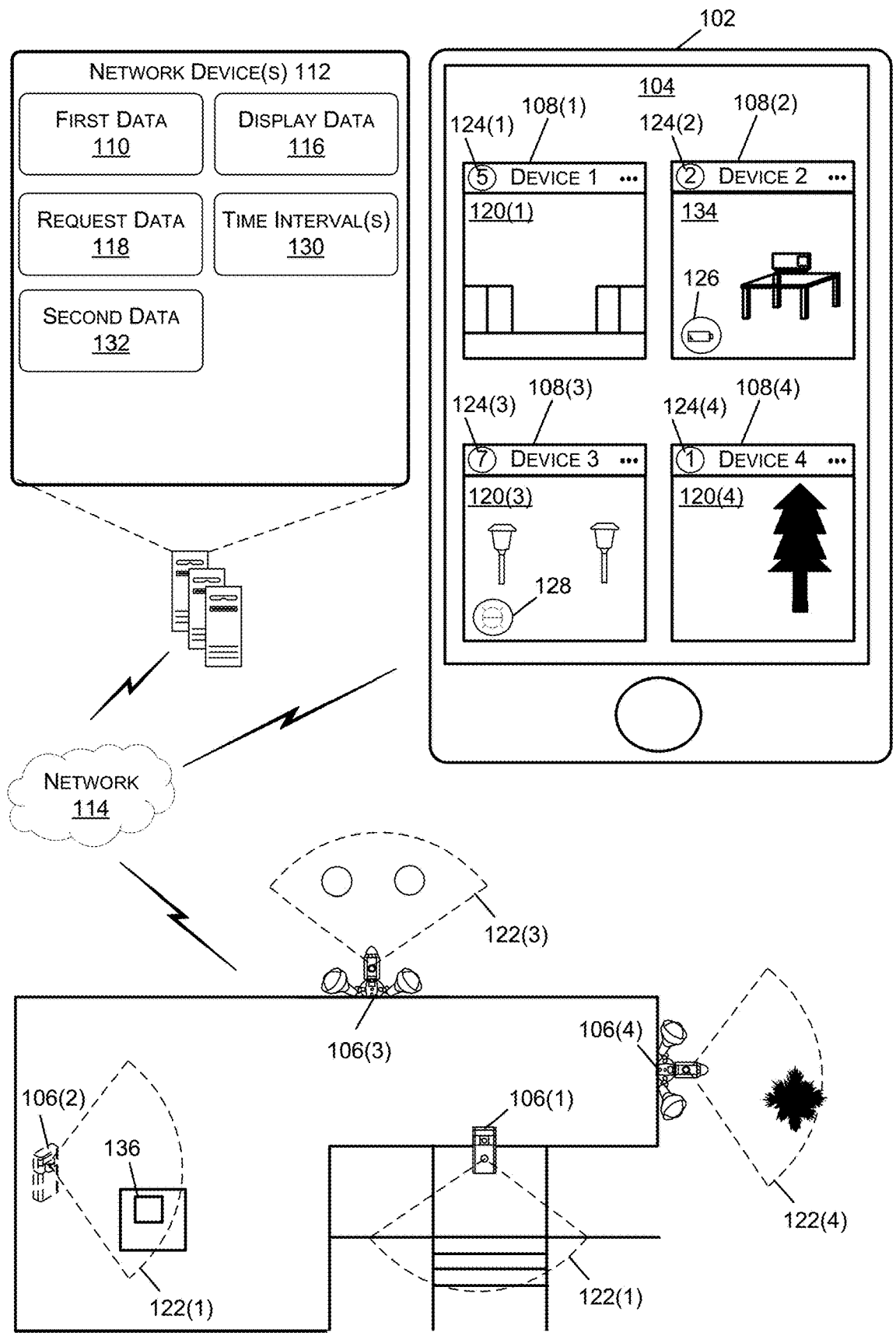

For example, and as illustrated in FIG. 1B, at the elapse of a given time interval 130 for the second A/V device 106(2), the network device(s) 112 may receive, over the network 114, data (which may be represented by "second data 132")) from the second A/V device 106(2). The second data 132 may include, but is not limited to, data indicating the identity of the second A/V device 106(2), image data (referred to, in this example, as "second image data") generated by the second A/V device 106(2), data indicating a time at which the second image data was generated by the second A/V device 106(2) (and/or a respective time since the second image data was captured) (e.g., a timestamp), data indicating a respective number of events captured by second A/V device 106(2) during the time interval 130, data indicating a respective battery level associated with the second A/V device 106(2), data indicating whether the second A/V device 106(2) is operating in the mode in which notifications are deactivated, data indicating a network connectivity associated with the second A/V device 106(2) (e.g., received signal strength (RSSI), current rate at which the second A/V device 106(2) is receiving data, etc.), data indicating whether the second A/V device 106(2) is operating in a different type of mode (e.g., baby monitor mode, package protection mode, a vehicle monitoring mode, etc.), data indicating whether the second A/V device 106(2) is operating as a bridge device (e.g., transmitting/receiving data with two other devices), data indicating whether a door lock that is controlled by the second A/V device 106(2) is locked or unlocked, data indicating whether a light emitter controlled by the second A/V device 106(2) is activate (e.g., turned on) or deactivated (e.g., turned off), and/or the like. In some examples, the network device(s) 112 receive the second data 132 based on transmitting, over the network 114, data (which may also be represented by the "request data 118") to the second A/V device 106(2), where the request data 118 includes a request for the second data 132. In some examples, the network device(s) 112 receive the second data 132 (and/or transmits the second data 132) based on determining that the client device 102 is still displaying the GUI 104. The network device(s) 112 may determine that the client device 102 is still displaying the GUI 104 based on receiving, over the network 114 and from the client device 102, data (which may also be represented by the "display data 116") indicating that the client device 102 is still displaying the GUI 104.

The network device(s) 112 may then transmit the second data 132 to the client device 102. In some instances, the network device(s) 112 transmit the second data 132 based on receiving, from the client device 102, display data 116 indicating that the application is still open on the client device 102. Using the second data 132, the client device 102 may update the content being displayed within the second portion 108(2) of the GUI 104 that is associated with the second A/V device 106(2). For example, the client device 102 may at least replace the image 120(2) being displayed within the second portion 108(2) of the GUI 104 with an image 134 represented by the second image data from the second data 132. As shown, since an object 136 was placed on the table depicted by the image 120(2) between a time that the first image data generated by the second A/V device 106(2) and a time at which the second image data was generated by the second A/V device 106(2) (e.g., a timestamp), the image 134 depicts the object 136 placed on the table. The network device(s) 112 and/or the client device 102 may then continue to perform similar processes and/or techniques for continuing to update the content associated with the second A/V device 106(2) each time the given time interval 130 associated with the second A/V device 106(2) elapses. Additionally, the network device(s) 112 and/or the client device 102 may then perform similar processes and/or techniques for updating the content associated with each of the first A/V device 106(1), the third A/V device 106(3), and the fourth A/V device 106(4).

Figure 1C:
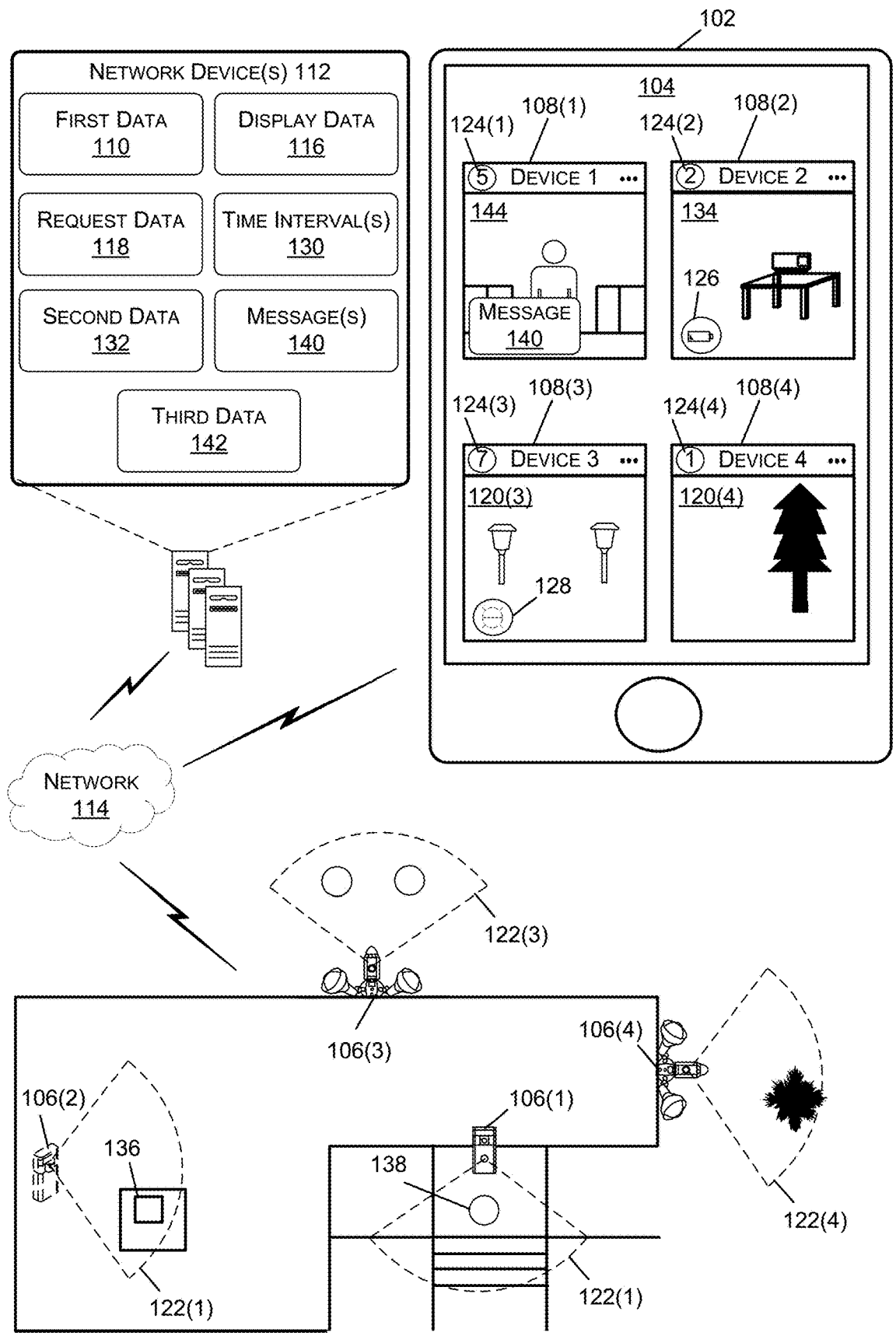

In some examples, while displaying the GUI 104, one of the A/V devices 106(1)-(4) may detect an object (e.g., motion of an object). For example, and as illustrated in FIG. 1C, the first A/V device 106(1) may detect an object 138 (e.g., a person) located within the first field of view 122(1) of the first A/V device 106(1). In response, the first A/V device 106(1) may generate a message 140 indicating that the object (and/or the motion) was detected. The first A/V device 106(1) may then transmit, over the network 114, the message 140 to the network device(s) 112 (which may then forward the message 140 to the client device 102) and/or to the client device 102. Additionally, the first A/V device 106(1) may generate data (which may be represented by the "third data 142"), where the third data 142 includes image data (referred to, in this example, as "third image data"), data indicating a time at which the first A/V device 106(1) generated the third image data (e.g., a timestamp), and/or the like. The first A/V device 106(1) may then transmit, over the network 114, the third data 142 to the network device(s) 112 (which may then forward the third data 142 to the client device 102) and/or to the client device 102.

In some examples, the client device 102 may then display the message 140 indicating that the first A/V device 106(1) detected the object 138 (and/or the motion), such as within the first portion 108(1) of the GUI 104. Additionally, in some examples, the client device 102 may replace the image 120(1) being displayed within the first portion 108(1) of the GUI 104 with image(s) 144 represented by the third image data. In some examples, the image(s) 144 may include a single image 144 represented by the third image data. In some examples, the image(s) 144 may include multiple images 144 represented by the third image data. For example, the images 144 may correspond to a live video feed being generated by the first A/V device 106(1).

Figure 1D:
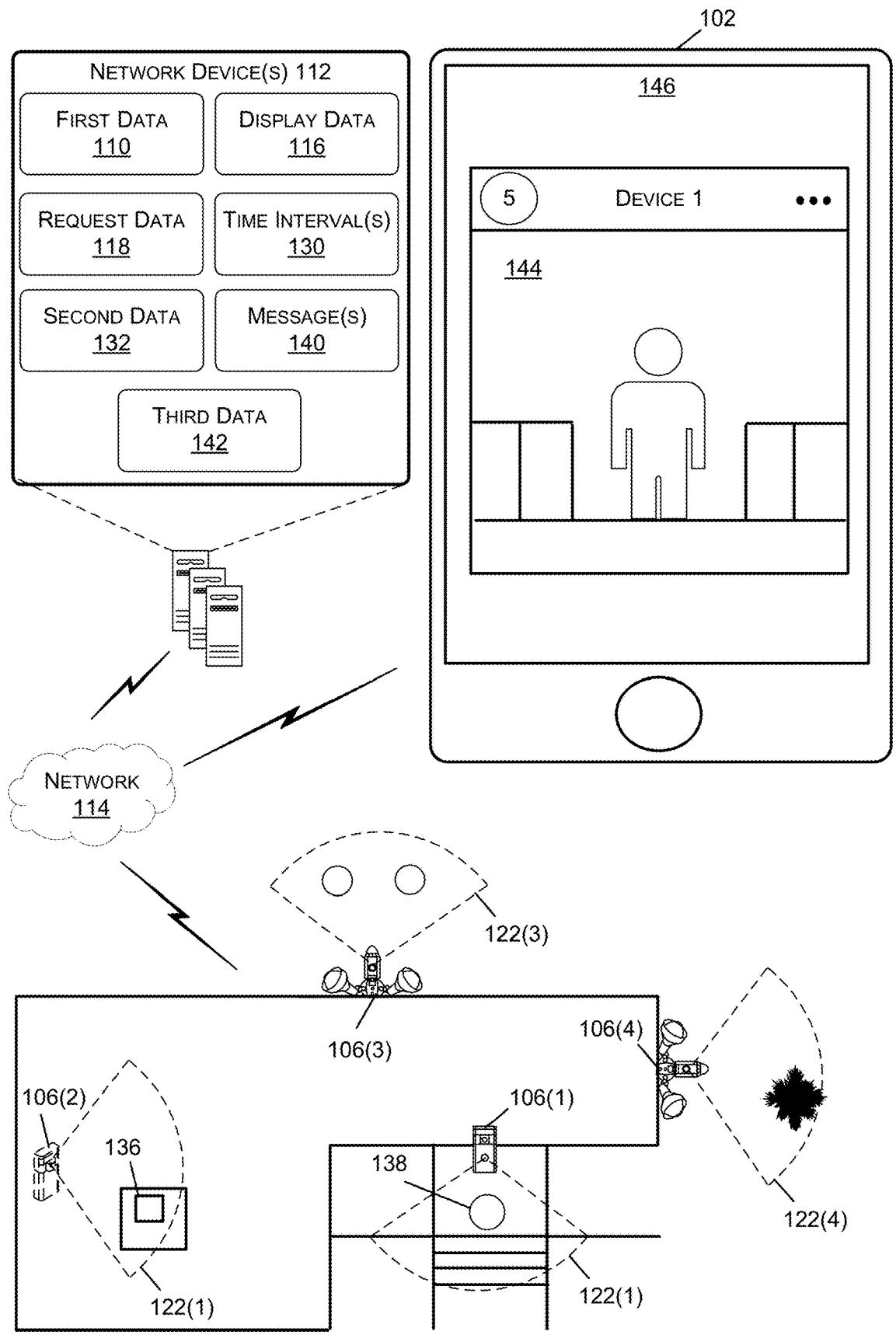

In some examples, the client device 102 may receive an input selecting the first portion 108(1) of the GUI 104 and/or the indicating of the message 140. Based on the input, and as illustrated in FIG. 1D, the client device 102 may display a second GUI 146. Additionally, the client device 102 may display the image(s) 144 represented by the third image data using the second GUI 146. Furthermore, if the image(s) 144 include multiple images 144 represented by the third image data (e.g., a live video feed), the client device 102 may continue to receive, over the network 114, the third data 142 from the network device(s) 112 and/or the first A/V device 106(1) (e.g., first A/V device 106(1) may continue to generate and then transmit the third image data). The client device 102 may then continue to display the images 144 represented by the third image data.

It should be noted that, although the above examples describe the client device 102 displaying a respective image generated by each A/V device 106(1)-(4), in some examples, the client device 102 may be displaying respective images (e.g., a respective video feed) being generated by one or more of the A/V devices 106(1)-(4). For example, the client device 102 may display a respective image for each A/V device that is battery powered, which the respective image is updated at time interval(s) 130, in order to conserve the battery power of the A/V devices. Additionally, the client device 102 may be displaying respective images (e.g., a respective video feed) for each of the A/V devices that is powered using an external power source.

Figure 2:
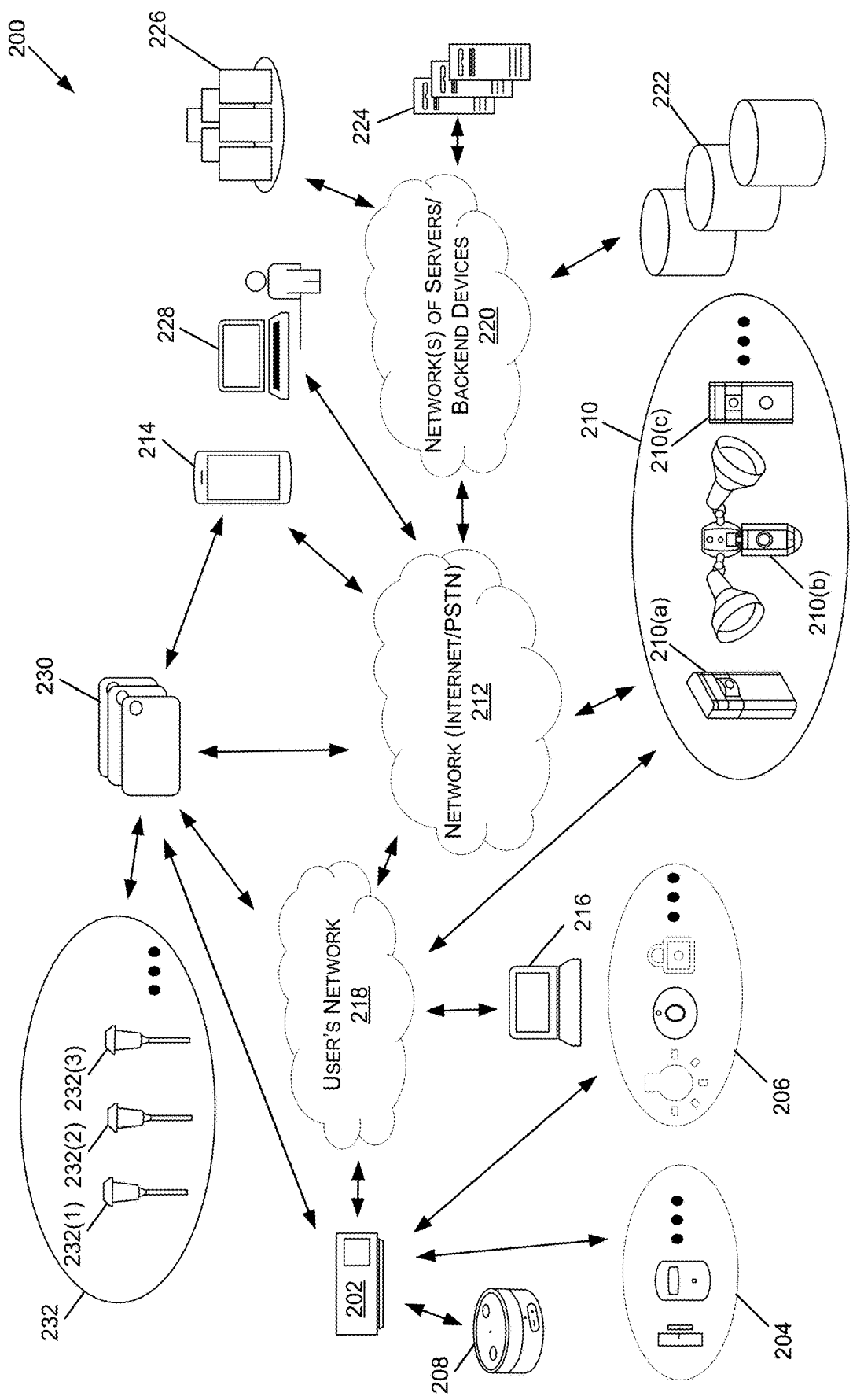
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., homeowners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, electronic device(s) 230 (although only one is shown for clarity reasons), light emitters 232, when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system 200 may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, the electronic device(s) 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the first A/V device 106(1), the second A/V device 106(2), the third A/V device 106(3), and/or the fourth A/V device 106(4)). The A/V devices 210 may include security cameras 210(*a*), light cameras 210(*b*) (e.g., floodlight cameras, spotlight cameras, etc.), A/V doorbells 210(*c*) (e.g., wall powered and/or battery powered A/V doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device(s)), may comprise any device that facilitates communication with and control of the sensors 204, automation devices 206, the VA device 208, the electronic device(s) 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic device(s) 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic device(s) 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic device(s) 230, the light emitters 232, or the A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound.

Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The VA device 208, the hub device 202, and/or the combination thereof may be configured to communicate with the A/V devices 210 in response to inputs (e.g., voice inputs, touch inputs, etc.) from users. For example, the VA device 208, the hub device 202, and/or the combination thereof may receive an input indicating a request to turn on the exterior lights (e.g., the light emitter(s) 232). The VA device 208, the hub device 202, and/or the combination thereof may then generate and transmit data representative of the input to the A/V device(s) 210 over the first network. In some examples, the data representative of the input is transmitted to the A/V device(s) 210 over the first network and/or the network (Internet/PSTN) 212 via the server(s) 224. In other examples, the data representative of the input is transmitted directly to the A/V device(s) 210 over the first network.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic device(s) 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic device(s) 230, and the light emitters 232, may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 102). The client devices 214, 216 may communicate with and/or be associated with (e.g., capable of access to and control of) the A/V devices 210, a smart-home hub device 202, the VA device 208, sensors 204, automation devices 206, the electronic device(s) 230, and/or the light emitters 232. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic device(s) 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more server(s)s 224, and one or more backend application programming interfaces (APIs) 226. While FIG. 2 illustrates the storage device 222, the server(s) 224, and the API 226 as components separate from the network 220, it is to be understood that the storage device 222, the server(s) 224, and/or the API 226 may be considered to be components of the network 220. For example, the network 220 may include a data center with a plurality of computing resources used to implement the storage device 222, the server(s) 224, and the API 226.

The server(s) 224 may comprise a computer program or other computer executable code that, when executed by processor(s) of the server(s) 224, causes the server(s) 224 to wait for requests from other computer systems or software (clients) and provide responses. In an embodiment, the server(s) 224 shares data and/or hardware and/or software resources among the client devices 214, 216. This architecture is called the client-server model. The client devices 214, 216 may run on the same computer or may connect to the server(s) 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server(s) 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic device(s) 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic device(s) 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic device(s) 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of server(s)s/backend devices 220).

The system 200 may also include the electronic device(s) 230. The electronic device(s) 230 may be configured to control the light emitters 232 using conditions set by a user. The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

In some examples, the light emitters 232 may include at least a first type of light emitter 232(1), a second type of light emitter 232(2), and a third type of light emitter 232(3). The first type of light emitters 232(1) may be configured to receive power from the electronic device(s) 230. To control the first type of light emitters 232(1), the electronic device(s) 230 may begin to provide power to the first type of light emitters 232(1) to activate (e.g., turn on, cause to emit light, etc.) the first type of light emitters 232(1) and cease providing the power the deactivate (e.g., turn off, cause to cease emitting the light, etc.) the first type of light emitters 232(1). Additionally, the second type of light emitters 232(2) may be configured to receive power from the electronic device(s) 230. To control the second type of light emitters 232(2), the electronic device(s) 230 (and/or other electronic devices, such as the A/V devices 210) may transmit first control signals to the second type of light emitters 232(2) that are configured to cause the second type of light emitters 232(2) to activate, and transmit second control signals to the second type of light emitters 232(2) that are configured to cause the second type of light emitters 232(2) to deactivate. Furthermore, the third type of light emitters 232(3) may be configured to receive power from a source that is external to the electronic device(s) 230, such as a battery. To control the third type of light emitters 232(3), the electronic device(s) 230 (and/or other electronic devices, such as the A/V devices 210) may transmit first control signals to the third type of light emitters 232(3) that are configured to cause the third type of light emitters 232(3) to activate, and transmit second control signals to the third type of light emitter 232(3) that are configured to cause the third type of light emitters 232(3) to deactivate.

Figure 3:
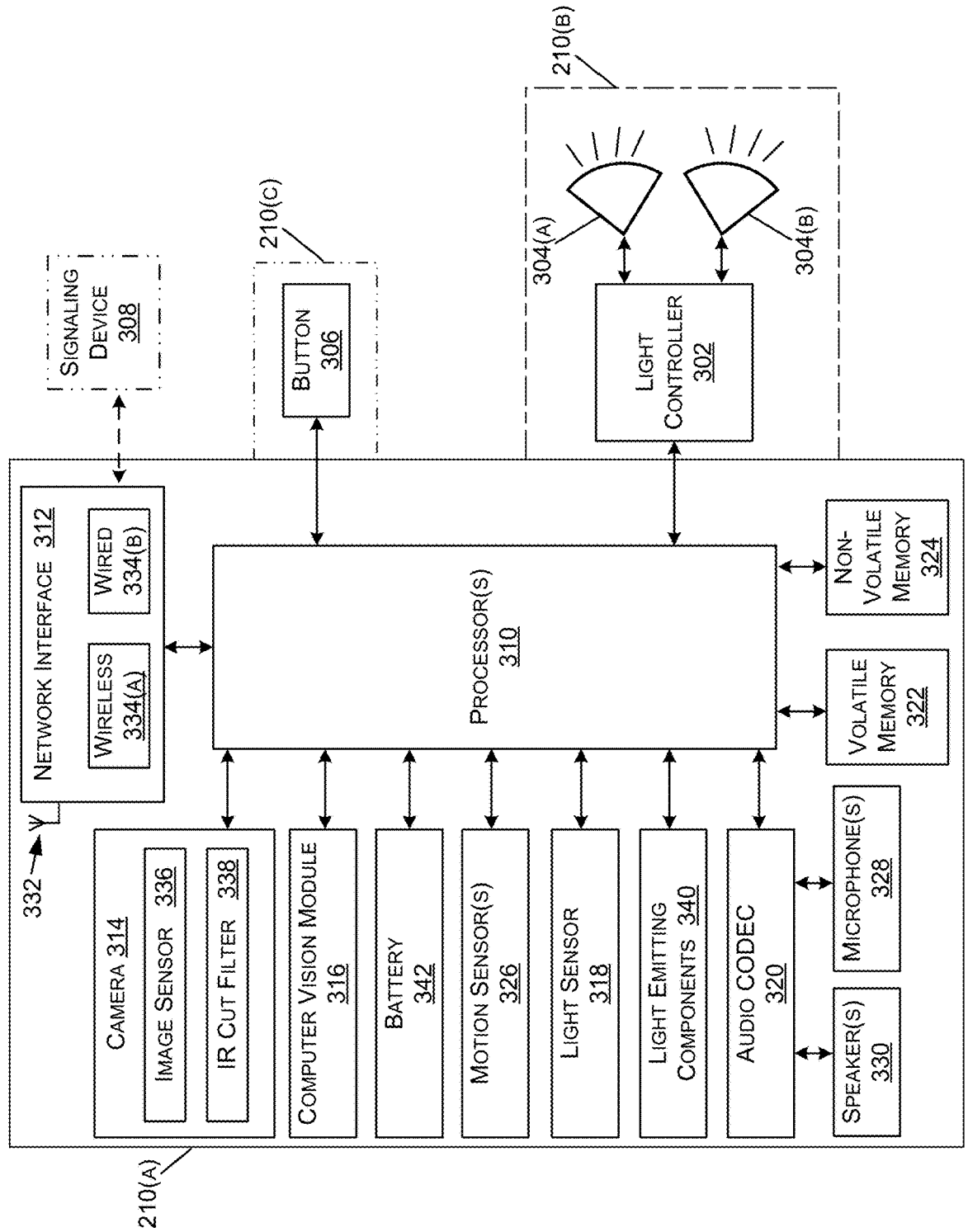
FIG. 3 is a functional block diagram illustrating one example embodiment of an A/V device, according to various aspects of the present disclosure.

FIG. 3 is a functional block diagram for an A/V device 210 according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights (e.g., light sources) 304(a), 304(b). In some embodiments, the one or more A/V devices 210 may include the A/V doorbell 210(c), which may include some or all of the components of the security camera 210(a) in addition to a touch surface(s) 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device(s) (e.g., one or more components of the network(s) of servers/backend devices 220 described in FIG. 2). The network interface 312 may include wireless 334(*a*) and wired 334(*b*) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(*c*) is pressed, the network interface 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the server(s) 224 and/or the API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3A, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an object within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an object that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of object (e.g., person, animal, vehicle, parcel, etc.), a direction of movement of the object, a distance of the object from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may be included additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3A, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3A, the CVM 316, and/or the camera 314 and/or the processor(s) 310 may receive information about the person using any one, or any combination of more than one, of the foregoing biometrics.

Again, with reference to FIG. 3A, in embodiments where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 302 may receive an output signal from the processor(s) 310 that causes the light controller 302 to activate the one or more lights 304(*a*), 304(*b*). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data.

The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

Although the A/V device 210 is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

In some examples, the A/V device 210 may operate as a "bridge" between other devices. For example, the A/V device 210 may receive first data that is transmitted from a first device, such as the server(s) 224, where the first data includes is associated with a second device (e.g., the first data includes a command to be executed by the second device), such as a light emitter 232. The A/V device 210 may then transmit the first data to the second device. Additionally, the A/V device 210 may receive second data from the second device, where the second data is associated with the first device (e.g., the second data indicates that the command was executed). The A/V device 210 may then transmit the second data to the server(s) 224. In some examples, the A/V device 210 may be transmitting/receiving the first data over a first network and be transmitting/receiving the second data over a second network. For example, the first network may include a wireless local area network, such as, but not limited to, the Internet, a local intranet, a Personal Area Network (PAN), a Local Area Network (LAN), a Wide Area Network (WAN), and/or the like. Additionally, the second network may include a low-power wide-area network (LP-WAN), such as, but not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

Figure 4:
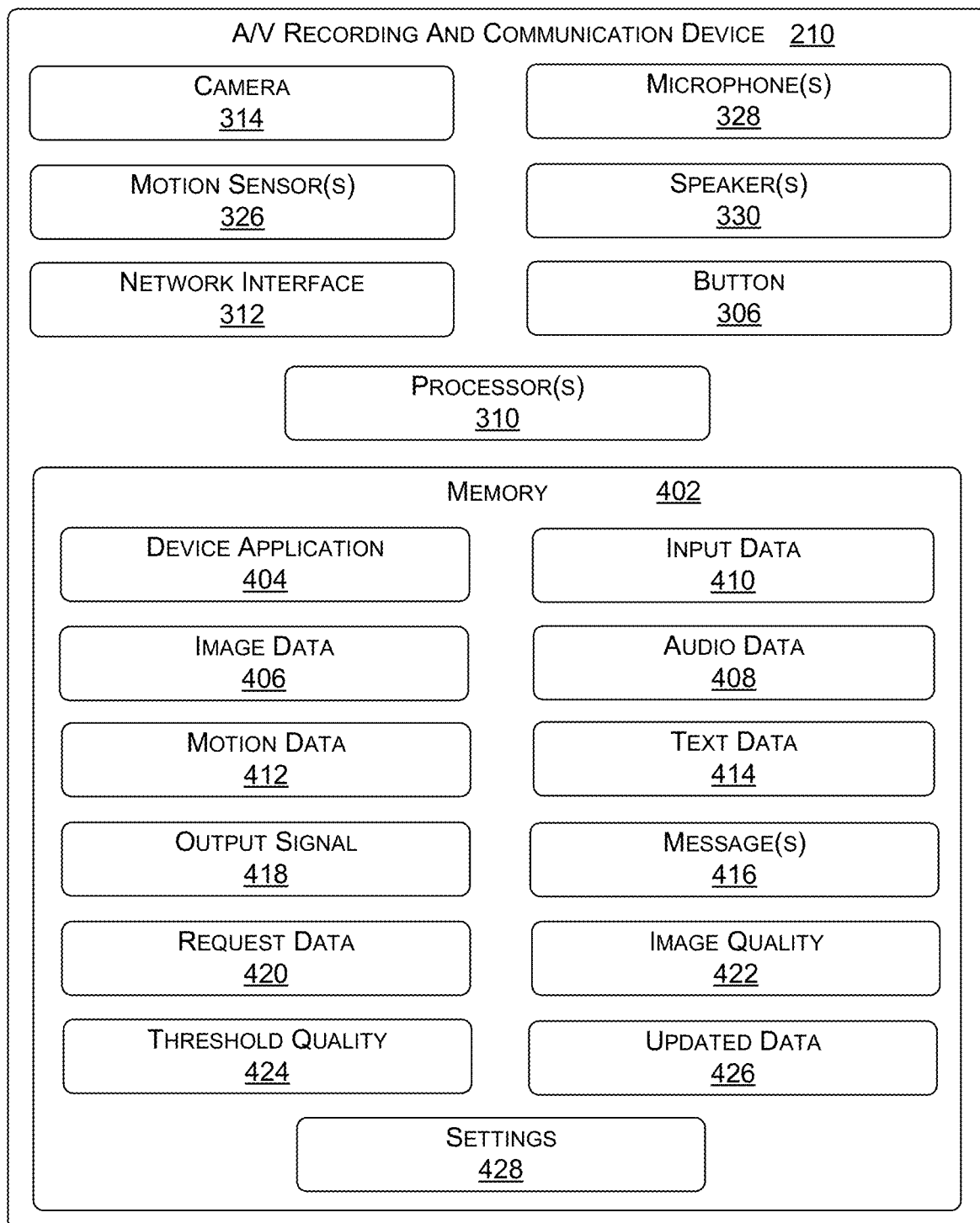
FIG. 4 is a functional block diagram illustrating one example embodiment of an A/V device, according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may include instructions that cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions that cause the processor(s) 310 to generate text data 414 describing the image data 406, the audio data 408, and/or the input data 410, such as in the form of metadata, for example.

In addition, the device application 404 may include instructions that cause the processor(s) 310 to transmit the image data 406, the audio data 408, the motion data 412, the input data 410, the text data 414, and/or message(s) 416 to the client devices 214, 216, the hub device 202, and/or the server(s) 224 using the network interface 312. In various embodiments, the device application 404 may also include instructions that cause the processor(s) 310 to generate and transmit an output signal 418 that may include the image data 406, the audio data 408, the text data 414, the input data 410, and/or the motion data 412. In some of the present embodiments, the output signal 418 may be transmitted to the server(s) 224 and/or the hub device 202 using the network interface 312. The server(s) 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server(s) 224, and the server(s) 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 (which may be similar to, and/or represent, the message(s) 140) may be generated by the processor(s) 310 and transmitted, using the network interface 312, to the client device 214, 216, the server(s) 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the server(s) 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server(s) 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected, in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

In some examples, such as when the A/V device 210 is not continuously transmitting the image data 406, the A/V device 210 may generate and/or transmit image data 406 based on receiving data (e.g., request data 420) (which may be similar to, and/or represent, the request data 118). For example, the A/V device 210 may receive, using the network interface 312, request data 420 from the server(s) 224, the hub device 202, and/or the client device 214, 216. If the A/V device 210 is not already generating image data 406, the request data 420 may cause the A/V device 210 to generate the image data 406. For example, the request data 420 may include a first command to generate the image data 406. Additionally, the request data 420 may cause the A/V device 410 to transmit the image data 406. For example, the request data 420 may include a second command to transmit the image data 406, such as to the server(s) 224, the hub device 202, and/or the client device 214, 216.

In some examples, before transmitting the image data 406, 216, the A/V device 210 may first analyze image(s) represented by the image data 406 in order to determine whether an image quality 422 associated with each of the image(s) exceeds a threshold quality 424. For example, the A/V device 210 may analyze an image represented by the image data 406 to determine an image quality 422 associated with the image. For instance, based on the analysis, the A/V device 210 determine one or more characteristics associated with the image, such as, but not limited to, sharpness, noise, dynamic range, tone reproduction, contrast, color accuracy, distortion, vignetting, exposure accuracy, lateral chromatic aberration, lens flare, color moire, and/or artifacts. Based on the one or more characteristics, the client device 214, 216 may then determine the image quality 422 associated with the image. In some examples, the image quality 422 may be measured using a range, such as a range from zero to one hundred (although other ranges may be used in other examples). The A/V device 210 may then determine whether the image quality 422 exceeds a threshold image quality 422. In some examples, such as when the image quality 422 is measured using a range, the threshold image quality 524 may include any number within the range. For example, if the image quality 422 is measured using a range from zero to one hundred, the threshold image quality 424 may include ninety.

In some examples, based on determining that the image quality 422 exceeds the threshold image quality 424, the A/V device 210 may transmit, using the network interface 312, the image data 406 to the server(s) 224, the hub device 202, and/or the client device 214, 216. In some examples, based on determining that the image quality 422 is below the threshold image quality 424, the A/V device 210 may refrain from transmitting the image data 406 to the server(s) 224, the hub device 202, and/or the client device 214, 216. Additionally, the A/V device 210 may continue to generate additional image data 406 using the camera 314. The A/V device may then then analyze an additional image represented by the additional image data 406 to determine whether an image quality 422 associated with the additional image exceeds the threshold quality 424. Based on determining that the image quality 422 for the additional image exceeds the threshold image quality 424, the A/V device 210 may transmit, using the network interface 312, the additional image data 406 that represents the additional image to the server(s) 224, the hub device 202, and/or the client device 214, 216.

In some examples, based on receiving the request data 420, the A/V device 210 may further generated updated data 426. The updated data 426 may include, but is not limited to, data indicating the identity of the A/V device 210, image data 406 generated by the A/V device 210 (which may be separate from, and/or included within, the updated data 426), data indicating a time at which the image data 406 was generated by the A/V device 210 (e.g., a timestamp), data indicating how long it has been since the image data 406 was generated, data indicating a number of events captured by the A/V device 210, data indicating a battery level of the battery 342 (if the A/V device 210 include the battery 342), data indicating whether lights 304 are activated (if the A/V device 210 include the lights 304), data indicating whether the A/V device 210 operating in the mode in which notifications are deactivated (e.g., the A/V device 210 does not transmit message(s) 416 based on detecting an object), data indicating a network connectivity associated with the second A/V device 210 (e.g., received signal strength (RSSI), current rate at which the second A/V device 210 is receiving data, etc.), data indicating whether the second A/V device 210 is operating in a different type of mode (e.g., baby monitor mode, package protection mode, a vehicle monitoring mode, etc.), data indicating whether the second A/V device 210 is operating as a bridge device (e.g., transmitting/receiving data with two other devices), data indicating whether a door lock that is controlled by the second A/V device 210 is locked or unlocked, data indicating whether a light emitter controlled by the second A/V device 210 is activate (e.g., turned on) or deactivated (e.g., turned off), and/or the like. The A/V device 210 may then transmit, using the network interface 312, the updated data 426 to the server(s) 224, the hub device 202, and/or the client device 214, 216.

In some examples, such as if the A/V device 210 is powered using the battery 342, the A/V device 210 may transmit, using the network interface 504, image data 406 that represents a single image. For example, the A/V device 210 may generate an image using a given data format (e.g., Joint Photographic Expert Group (JPEG), exchangeable image file format (EXIF), tagged image file format (TIFF), etc.). The A/V device 210 may then transmit, using the network interface 504, image data 504 representing the generated image. In some examples, to ensure that the generated image includes an image quality 422 that exceeds the threshold quality 424, the A/V device 210 may first generate image data 406 that represents images over a period of time. The period of time may include, but is not limited to, five seconds, ten seconds, fifteen seconds, thirty seconds, and/or the like. The A/V device 210 may then generate the image using a portion of the image data 406. For example, the A/V device 210 may generate the image using image data 406 that was generated ten seconds after the A/V device 210 began generating the image data 406.

In some examples, such as if the A/V device 210 is powered using an external power source, the A/V device 210 may transmit, using the network interface 504, image data 406 that represents images (e.g., image data 406 that represents a live video feed). As will be discussed below, the server(s) 224 may then use the image data 406 to generate the image in the given data format. For example, the server(s) 224 may generate the image using an I-Frame of the image data 406 that is received from the A/V device 210. Although this example describes the A/V device 210 as being powered using an external power source, similar processes may be used for an A/V device 210 that is powered using a battery 342.

As further illustrated in FIG. 4, the A/V device 210 may store settings 428 in the memory 402. The settings 428 may indicate time(s) at which the A/V device 210 is to generate updated data 426 (and/or the image data 406) and transmit the updated data 426 to the server(s) 224. The time(s) may include, but are not limited to, time interval(s) (e.g., every third second, every minute, every hour, etc.), time(s) of the day (e.g., 4:00 a.m., 11:00 a.m., 2:00 p.m., etc.), day(s) of the week (e.g., Monday, Tuesday, Wednesday, etc.), and/or the like. For example, the settings may indicate that the A/V device 210 is to generate updated data 426 (e.g., the image data 406) each day at 8:00 a.m., 1:00 p.m., and 6:00 p.m., and then transmit the updated data 426 to the server(s) 224. In some examples, the A/V device 210 may receive data indicating updates to the settings 428. For example, the server(s) 224 may determine, based on the day of the year, the sunrise and the sunset for the day. Based on the sunrise and the sunset, the server(s) 224 may transmit the data updating the settings 428 such that the A/V device 210 is generating the image data 406 at time(s) when there is an adequate amount of light.

In some examples, the A/V device 210 may include the settings 428 indicating the time(s) when the A/V device 210 is powered using the battery 342. In such examples, the A/V device 210 may generate the image data 406 at the time(s) such that the A/V device 210 is generating image data 406 less often. For example, the A/V device 210 may only generate image data 406 four times a day, where A/V devices 210 that are powered using external power sources receive request data 420 for image data 406 at the expiration of time interval(s), which may occur multiple times per day (e.g., ten times per day, fifty times per day, etc.).

In some examples, the A/V device 210 may use the settings 428 to determine when to generate and/or transmit the image data 406 based on a mode of operation associated with the A/V device 210 being disabled. Additionally, the A/V device 210 may generate and/or transmit the image data 406 when request data 420 is received from the server(s) 224 based on the mode of operation being enabled. In such examples, the mode of operation may include a live view mode (e.g., a mode for receiving video on demand, where the user may select, at any time, to view image data generated in a field of view of the camera). Because the live view mode is enabled, the A/V device 210 may be configured to receive commands for generating the image data, and as such the server 224 may be configured to transmit the request data 420 to the A/V device 210. While operating in the live view mode, the client device 214, 216 may be configured to continuously receive image data 406 generated by the A/V device 210 such that the client device 214, 216 may continuously display images (e.g., a live video feed) represented by the image data 406. In some examples, the A/V device 210 may be configured to operate depending on the mode of operation when the A/V device 210 is powered using the battery 342. In other examples, the A/V device 210 may be configured to operate depending on the mode of operation even when the A/V device 210 is receiving power from an external power source.

Figure 5:
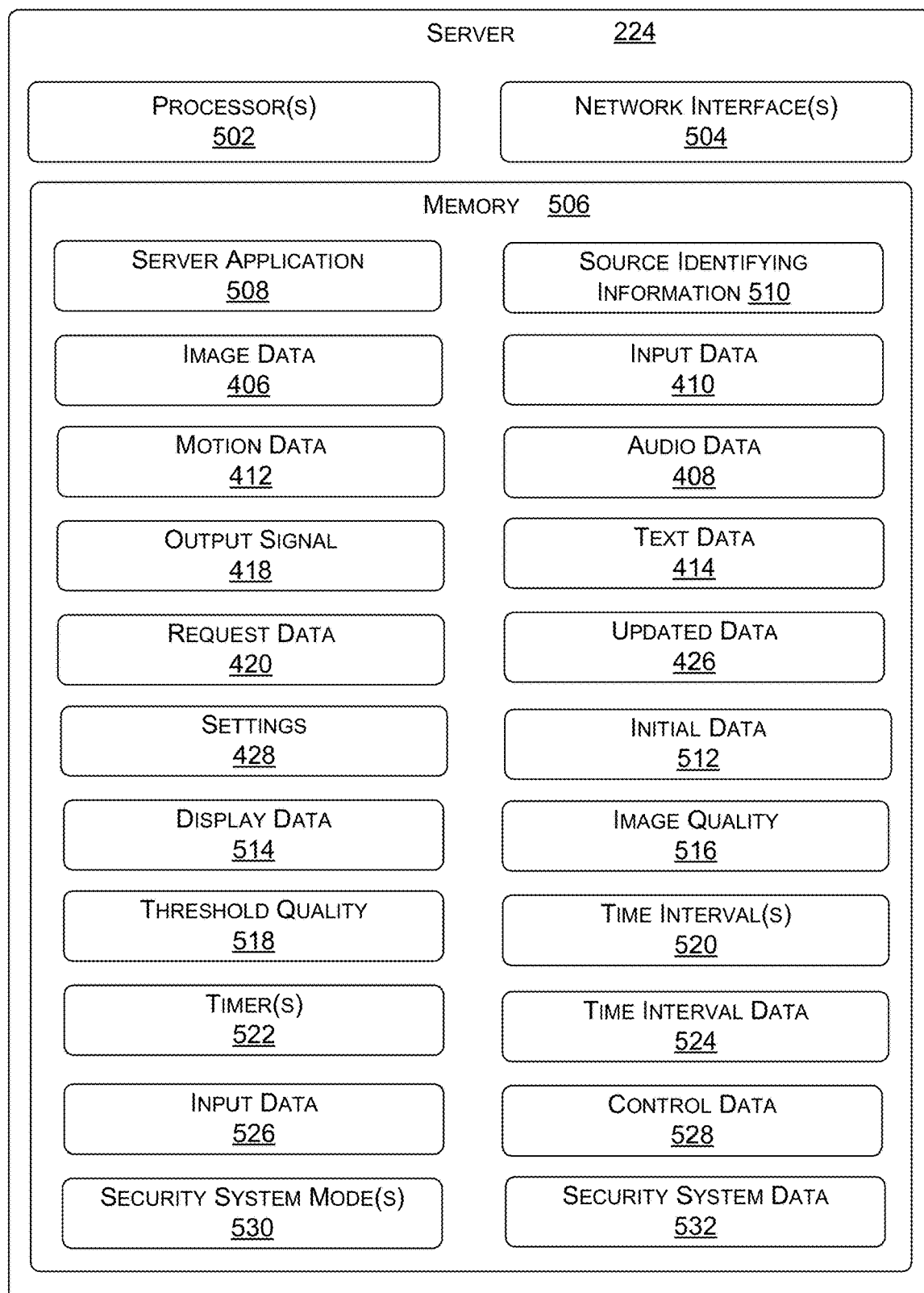
FIG. 5 is a functional block diagram illustrating one example embodiment of a server, according to various aspects of the present disclosure.

FIG. 5 is a functional block diagram illustrating one embodiment of the server(s) 224, according to various aspects of the present disclosure. The server(s) 224 may comprise processor(s) 502 (which may be similar to, and/or include similar functionality as, the processor(s) 310), network interface(s) 504 (which may each be similar to, and/or include similar functionality as, the network interface 312), and a memory 506 (which may be similar to, and/or include similar functionality as, the memory 402). The network interface(s) 504 may allow the server(s) 224 to access and communicate with devices connected to the network (Internet/PSTN) 212 (e.g., the A/V device 210, the hub device 202, the client devices 214, 216, a device controlled by the security monitoring service 228, the electronic device(s) 230, the light emitters 232, etc.).

The memory 506 may include a server application 508. The server application 508 may include instruction that cause the processor(s) 502 to receive and/or retrieve the audio data 408, the text data 414, the input data 410, the messages 416, the image data 406, the motion data 412, the input data 410, and/or the updated data 426 from the A/V device 210 (e.g., in the output signal 418), the client device 214, 216, and/or the hub device 202. The server application 508 may also include instructions that cause the processor(s) 502 to transmit (and/or forward) the audio data 408, the text data 414, the input data 410, the messages 416, the image data 406, the motion data 412, the input data 410, and/or the updated data 426 to the client devices 214, 216 using the network interface(s) 504.

Although referred to as the server(s) 224 with reference to the processes described herein, the server(s) 224 may additionally, or alternatively, include one or more of the devices from the network(s) of servers/backend devices 220. For example, the processes described herein with respect to the server(s) 224 may additionally, or alternatively, at least in part, be performed by one or more APIs 226.

In further reference to FIG. 5, the memory 506 may also include source identifying data 510 that may be used to identify the A/V device 210, the hub device 202, the client devices 214, 216, the electronic device(s) 230, the light emitters 232, the sensors 204, and/or the automation devices 206. In addition, the source identifying data 510 may be used by the processor(s) 502 of the server(s) 224 to determine the client devices 214, 216 are associated with the A/V device 210, the electronic device(s) 230, the light emitters 232, the sensors 204, and/or the automation devices 206.

In some embodiments, the server application 508 may further include instructions that cause the processor(s) 502 to generate and transmit a report signal (not shown) to a third-party client device, which may be associated with a law enforcement agency or the security monitoring service 228, for example. The report signal, which may be the message 416, in some examples, may include the image data 406, the audio data 408, and/or the text data 414.

As described herein, at least some of the processes of the A/V device 210, the hub device 202, and/or the client device 214, 216 may be executed by the server(s) 224. For example, the server(s) 224 may store data (e.g., initial data 512) (which may, in some examples, represent the first data 110) associated with A/V device(s) 210. The initial data 512 may include, but is not limited to, data indicating the identit(ies) of the A/V device(s) 210, image data 406 (referred to, in this example, as "first image data 406") generated by the A/V device(s) 210, data indicating a respective time at which the first image data 406 was generated by each of the A/V device(s) 210, data indicating a respective number of events captured by each of the A/V device(s) 210, data indicating a respective battery level associated with each of the A/V device(s) 210 (if the A/V device(s) 210 include a battery 342), data indicating whether respective lights 304 of each of the A/V device(s) 210 are activated (if the A/V device(s) 210 include the lights 304), data indicating whether each of the A/V device(s) 210 are operating in the mode in which notifications are deactivated, and/or the like. In some examples, the initial data 512 represents the last content that was being displayed by the client device 214, 216 when the client device 214, 216 previously displayed the GUI.

In some examples, the server(s) 224 may receive, using the network interface(s) 504, data (e.g., display data 514) (which may, in some examples, represent the display data 116) from the client device 214, 216. The display data 514 may indicate that the client device 214, 216 is currently executing an application associated with the GUI (e.g., the GUIs 618) and/or the client device 214, 216 is currently displaying the GUI. In some examples, based on receiving the display data 514, the server(s) 224 may transmit, using the network interface(s) 504, at least a portion of the initial data 512 to the client device 214, 216. The transmitting of the at least the portion of the initial data 512, may cause the client device 214, 216 to display the content represented by the at least the portion of the initial data 512 within the GUI (e.g., using the portion(s) of the GUI that are associated with the A/V device(s) 210). Additionally, or alternatively, in some examples, based on receiving the display data 514, the server(s) 224 may transmit, using the network interface(s) 504, data (e.g., request data 420) to at least one of the A/V device(s) 210, where the request data 420 represents a request for updated data 426 (which may be referred to, in this example, as "first updated data 426") (which may, in some examples, represent the first data 110) generated by the at least one of the A/V device(s) 210.

Based on transmitting the request data 420, the server(s) 224 may receive, using the network interface(s) 504, the first updated data 426 from the at least one of the A/V device(s) 210. The first updated data 426 may include, but is not limited to, data indicating the identit(ies) of the A/V device(s) 210, image data 406 (referred to, in this example, as "second image data 406") generated by the A/V device(s) 210, data indicating a respective time at which the second image data 406 was generated by each of the A/V device(s) 210 (e.g., timestamp(s), data indicating a respective number of events captured by each of the A/V device(s) 210, data indicating a respective battery level associated with each of the A/V device(s) 210 (if the A/V device(s) 210 include a battery 342), data indicating whether respective lights 304 of each of the A/V device(s) 210 are activated (if the A/V device(s) 210 include lights 304), data indicating whether each of the A/V device(s) 210 are operating in the mode in which notifications are deactivated, and/or the like. In some examples, the server(s) 224 may then transmit, using the network interface(s) 504, the first updated data 426 to the client device 214, 216. The first updated data 426 may cause the client device 214, 216 to display content represented by the first updated data 426 (e.g., using the portion(s) of the GUI that are associated with the A/V device(s) 210).

In some examples, before transmitting the first updated data 426 to the client device 214, 216, the server(s) 224 may first analyze image(s) represented by the second image data 406 in order to determine if a respective image quality 516 associated with each of the image(s) exceeds a threshold quality 518. For example, the server(s) 224 may analyze an image represented by the second image data 406 generated by an A/V device 210 to determine an image quality 516 associated with the image. For instance, based on the analysis, the server(s) 224 determine one or more characteristics associated with the image, such as, but not limited to, sharpness, noise, dynamic range, tone reproduction, contrast, color accuracy, distortion, vignetting, exposure accuracy, lateral chromatic aberration, lens flare, color moire, and/or artifacts. Based on the one or more characteristics, the server(s) 224 may then determine the image quality 516 associated with the image. In some examples, the image quality 516 may be measured using a range, such as a range from zero to one hundred (although other ranges may be used in other examples). The server(s) 224 may then determine whether the image quality 516 exceeds a threshold quality 518. In some examples, such as when the image quality 516 is measured using a range, the threshold quality 518 may include any number within the range. For example, if the image quality 516 is measured using a range from zero to one hundred, the threshold image quality 518 may include ninety.

In some examples, based on determining that the image quality 516 for the image does not exceed the threshold quality 518, the server(s) 224 may transmit the first image data 406 (e.g., from the initial data 512) to the client device 214, 216. Additionally, based on determining that the image quality 516 for the image exceeds the threshold quality 518, the server(s) 224 may transmit the second image data 406 (e.g., from the first updated data 426) to the client device 214, 216. In some examples, the image quality 516 and/or the threshold image quality 516 used by the server(s) 224 may be similar to the image quality 422 and/or the threshold image quality 424 used by the A/V device(s) 210. In some examples, the image quality 516 and/or the threshold quality 518 used by the server(s) 224 may be different than the image quality 422 and/or the threshold image quality 424 used by the A/V device(s) 210.

Additionally to, or alternatively from, performing the image quality test above, in some example, the server(s) 224 may perform an image quality test to determine if data packets associated with the second image data 406 were damaged and/or lost during the process of receiving the second image data 406 from the A/V device(s) 210. In such example, if the server(s) 224 determine that a threshold number of packets (e.g., one percent, five percent, ten percent, etc.) were damaged or lost, the server(s) 224 may transmit, using the network interface 504, the first image data 406 to the client device 214, 216. Additionally, the server(s) 224 may transmit data to the A/V device(s) 210 that includes a request for additional image data 406. Based on receiving the additional image data 406, the server(s) 224 may perform similar quality analysis of the additional image data 406. If the additional image data 406 passes the quality analysis, the server(s) 224 may transmit, using the network interface 504, the additional image data 406 to the client device 214, 216.

Additionally, or alternatively, in some examples, the server(s) 224 may determine if there is a marker included in the image and/or in the image data 406 that represents the image. For example, if the image includes a JPEG image (see below), the server(s) 224 may determine if there is an end of image (EOI) marker associated with the JPEG image. If the server(s) 224 determine that the marker is not included in the image and/or the image data 406 that represents the image (and/or that the marker is not a correct marker that should be included), the server(s) 224 may determine not to transmit the image data 406. Additionally, the server(s) 224 may retrieve additional image data 406 representing an additional image and perform similar processes. However, if the server(s) 224 determine that the marker is included in the image and/or the image data 406 that represents the image, the server(s) 224 may transmit the image data 406.

In some examples, such as when an A/V device 210 is powered using a battery 342, the image data 406 received from the A/V device 210 may represented an image generated by the A/V device 210. The image may include a data format, such as, but not limited to, (e.g., JPEG, EXIF, TIFF, and/or any other format. In such examples, the server(s) 224 may then transmit, using the network interface 504, the image data 406 representing the image to the client device 214, 216. Additionally, in some examples, such as when an A/V device 210 is powered using an external power source, the image data 406 received from the A/V device 210 may represent multiple images (e.g., the image data 406 may represent a live video feed). In some examples, the image data 406 may be in a video format, such as H.264, H.265, MPEG-4, etc. In such examples, the server(s) 224 may generate an image that includes the data format using the image data 406. For example, the server(s) 224 may use a frame from the image data 406 that is in a video format, such as an I-Frame, and generate an image that includes the data format. The server(s) 224 may then transmit image data 406 representing the generated image to the client device 214, 216. In some examples, the server may determine if the I-Frame is capable of being converted to the data format necessary for transmitting to the image to the client device 214, 216. For example, the server(s) 224 may process the I-Frame to determine if the I-Frame can be converted to the data format. If the I-Frame cannot be converted (e.g., because data packet(s) are lost, data packet(s) are incomplete or broken, etc.), the server(s) 224 may perform similar functions on the next I-Frame in the image data received from the A/V device 210. This process may be performed until a suitable I-Frame is determined that can be converted the data format.

In should be noted that, in some examples, the server(s) 224 may be unable to transmit the request data 420 to an A/V device(s) 210 and/or the server(s) 224 may not receive the first updated data 426 from the A/V device 210. This may be because of network connectivity problems of the server(s) 224 and/or the A/V device 210. For example, the server(s) 224 and/or the A/V device 210 may be unable to connect to the network (Internet/PSTN) 212. In such example, the server(s) 224 may transmit, using the network interface(s) 504, the initial data 512 associated with the A/V device 210 to the client device 214, 216.

It should further be noted that, based on receiving the display data 514, the server(s) 224 may transmit data (e.g., updated data 426) representing timestamp(s) of the currently stored image(s) for the A/V device(s) 210. The timestamp(s) may indicate when the image(s) were generated by the A/V device(s) 210. The client device 214, 216 may then determine, based on the timestamp(s), if image(s) that are stored locally by the client device 214, 216 for the A/V device(s) 210 should be updated. In some examples, the client device 214, 216 may determine that a locally stored image should be updated based on comparing a timestamp for the locally stored image to a timestamp received from the server(s) 224. If they client device 314, 216 determines that the received timestamp indicates that an image stored by the server(s) 224 was generated after the locally stored image, then the client device 214, 216 may determine that the locally stored image should be updated. In some examples, the client device 214, 216 may determine that a locally stored image should be updated by using the received timestamp to determine how long ago the locally stored image was generated. The client device 214, 216 may then determine that the locally stored image was generated over a threshold period of time ago (e.g., ten seconds, fifteen seconds, thirty seconds, five minutes, thirty minutes, one day, etc.). Based on the determination, the client device 214, 216 may determine that the locally stored image should be updated.

The server(s) 224 may then receive, using the network interface, data (e.g., request data 420) from the client device 214, 216, where the request data 420 includes a request for a new image. Based on receiving the request data 420, the server(s) 224 may retrieve a new image generated by the A/V device 210 and transmit, using the network interface 504, image data 406 representing the image to the client device 214, 216.

The server(s) 224 may then continue to transmit updated data 426 and/or image data 406 to the client device 214, 216 at the elapse of time interval(s) 520 (which may represent the time interval(s) 130). In some examples, a same time interval 520 may be used for each of the A/V device(s) 210. In some examples, a different time interval 520 may be used for one or more of the A/V device(s) 210. For a first example, a first time interval 520 may be used for A/V device(s) 210 that are powered using external power source(s) and a second, longer time interval 520 may be used for A/V device(s) 210 that are powered using batteries 342. For a second example, a first time interval 520 may be used for a first A/V device 210 and a second, different time interval may be used for a second, different A/V device 210.

In some examples, a time interval 520 for an A/V device 210 may change based on an amount of power remaining within the battery 342 of the A/V device 210. For example, a first time interval 520 may be used when the battery 342 includes a first amount of power and a second, longer time interval 520 may be used when the battery 342 includes a second, lesser amount of power. In some examples, the time interval(s) 520 for the A/V device(s) 210 may change based on how long the client device 214, 216 has been displaying the GUI. For a first example, a first time interval 520 may be used when the client device 214, 216 initially begins displaying the GUI and a second, longer time intervals 520 may be used the longer that the client device 214, 216 is displaying the GUI. For a second example, a first time interval 520 may be used when the client device 214, 216 initially begins displaying the GUI and a second, shorter time intervals 520 may be used the longer that the client device 214, 216 is displaying the GUI. In either of the examples, a time interval 520 may include, but is not limited to, one second, five seconds, thirty seconds, one minute, and/or the like.

In some examples, the server(s) 224 may determine when the time interval(s) 520 elapse. For example, after transmitting the initial data 512 and/or the first updated data 426 associated with an A/V device 210, the server(s) 224 may start a timer 522 for the A/V device 210. The server(s) 224 may then use the timer 522 to determine when the time interval 520 for the A/V device 210 elapses. For instance, if the time interval 520 includes thirty seconds, the server(s) 224 may determine that the time interval 520 elapses when the timer 522 reaches thirty seconds. Additionally, or alternatively, in some examples, the server(s) 224 may determine that the time interval(s) 520 have elapsed based on receiving, using the network interface(s) 504, data (e.g., time interval data 524) from the client device 214, 216, where the time interval data 524 indicates when the time interval(s) 520 for the A/V device(s) 210 elapse.

In some examples, before receiving and/or transmitting the updated data 426 and/or the image data 406 to the client device 214, 216, the server(s) 224 may determine whether the client device 214, 216 is still displaying the GUI. To determine that the client device 24, 216 is still displaying the GUI, the server(s) 224 may receive, using the network interface(s) 504, data (e.g., display data 514) from the client device 214, 216 indicating that the client device 214, 216 is still displaying the GUI. In some examples, the server(s) 224 receive the display data 514 in response to transmitting, using the network interface 304, data (e.g., request data 420) to the client device 214, 216, where the request data 420 includes a request for if the client device 214, 2167 is still displaying the GUI.

Based on determining that the time interval 520 for an A/V device 210 has elapsed and/or based on determining that the client device 214, 216 is still displaying the GUI, the server(s) 224 may transmit, using the network interface(s) 504, updated data 426 (referred to, in this example, as "second updated data 426") and/or image data (referred to, in this example, as "third image data 406") to the client device 214, 216 such that the client device 214, 216 is able to update the content associated with the A/V device 210. For example, the client device 214, 216 may display an image represented by the third image data 406, within the portion of the GUI that is associated with the A/V device 210, instead of the current image that the client device 214, 216 is displaying. In some examples, the server(s) 224 may be continuously receiving updated data 426 and/or image data 406 from the A/V device 210. In such examples, the server(s) 224 transmit the updated data 426 and/or the image data 406 based on determining that the time interval 520 for an A/V device 210 has elapsed and/or based on determining that the client device 214, 216 is still displaying the GUI. In other examples, based on determining that the time interval 520 for an A/V device 210 has elapsed and/or based on determining that the client device 214, 216 is still displaying the GUI, the server(s) 224 transmit, using the network interface(s) 504, data (which may be represented by request data 420) to the A/V device 210, where the request data 420 includes a request for the updated data 426 and/or the image data 406. The server(s) 224 may then receive, using the network interface(s) 504, the updated data 426 and/or the image data 406 from the A/V device 210.

Additionally to, or alternatively from, using the time interval(s) 520 to determine when to transmit the updated data 426 and/or the image data 406, the server(s) 224 may automatically transmit the updated data 426 and/or the image data 406 in response to receiving the updated data 426 and/or the image data 406 from an A/V device 210. For example, based on the settings 428, the server(s) 224 may automatically receive the updated data 426 and/or the image data 406 from an A/V device 210 at the time(s) indicated by the settings 428. The server(s) 224 may then transmit, using the network interface 504, the updated data 426 and/or the image data 406 to the client device 214, 216. In some examples, the server(s) 224 transmit the updated data 426 and/or the image data 406 based on determining that the client device 214, 216 is displaying the GUI.

In some examples, the server(s) 224 may continue to perform similar processes and/or techniques to transmit updated data 426 and/or image data 406 generated by the A/V device 210 to the client device 214, 216. Additionally, at the elapse of time interval(s) 520 associated with other A/V device(s) 210, the server(s) 224 may perform similar processes and/or techniques to transmit updated data 426 and/or image data 406 generated by the other A/V device(s) 210 to the client device 214, 216.

In some examples, while the client device 214, 216 is displaying the GUI, one of the A/V device(s) 210 may detect an object (e.g., motion of an object). Based on the A/V device 210 detecting the object, the server(s) 224 may receive, using the network interface(s) 504, a message 416 from the A/V device 210 that indicates that the A/V device 210 detected the object (and/or motion). The server(s) 224 may then transmit, using the network interface(s) 504, the message 416 to the client device 214, 216. Additionally, the server(s) 224 may receive, using the network interface(s)

504, image data 406 (referred to, in this example, as "fourth image data 406") from the A/V device 210, where the fourth image data 406 represents image(s). In some examples, the server(s) 224 may then transmit, using the network interface(s) 504, the fourth image data 406 to the client device 214, 216. In some examples, the server(s) 224 may first receive, using the network interface(s) 504, data (e.g., input data 526) from the client device 214, 216, where the input data 526 indicates that the client device 214, 216 received an input associated with viewing the message 416. In such examples, based on receiving the input data 526, the server(s) 224 may transmit, using the network interface(s) 504, the fourth image data 406 to the client device 214, 216.

Additionally, in some examples, while the client device 214, 216 is still displaying the GUI, the server(s) 224 may receive, using the network interface(s) 504, data (e.g., input data 526) from the client device 214, 216, where the input data 526 indicates that the client device 214, 216 received an input associated with an A/V device 210. For example, the input data 526 may indicate that the client device 214, 216 received an input selecting a portion (e.g., a tile) of the GUI that is associated with the A/V device 210. Based on the input data 526, the client device 214, 216 may transmit, using the network interface(s) 504, image data 406 (referred to, in this example, as "fifth image data 406") generated by the A/V device 210 to the client device 214, 216, where the fifth image data 406 represents image(s). In some examples, the server(s) 224 may be continuously receiving image data 406 from the A/V device 210. In such examples, the server(s) 224 transmit the fifth image data 406 based on receiving the input data 526. In other examples, based on receiving the input data 526, the server(s) 224 transmit, using the network interface(s) 504, data (which may be represented by request data 420) to the A/V device 210, where the request data 420 includes a request for the fifth image data 406. The server(s) 224 may then receive, using the network interface(s) 504, the fifth image data 406 from the A/V device 210.

Furthermore, in some examples, while the client device 214, 216 is still displaying the GUI, the server(s) 224 may receive, using the network interface(s) 504, data (e.g., input data 526) from the client device 214, 216, where the input data 526 indicates that the client device 214, 216 received an input selecting an interface element associated with an A/V device 210. For example, the input data 526 may indicate that the client device received an input associated with a first interface element for causing the A/V device 210 to activate lights 304 (e.g., if the A/V device 210 includes the lights 304), a second interface element for causing the A/V device 210 to output a sound (e.g., activate a siren), a third interface element for causing the A/V device 210 (and/or the client device 214, 216) to no longer provide notifications (e.g., messages 416) when the A/V device 210 detects an object (and/or motion), and/or the like. Based on receiving the input data 526, the server(s) 224 may transmit, using the network interface(s) 504, data (e.g., control data 528) to the A/V device 210, where the control data 528 causes the A/V device 210 to perform the action. For example, if the input data 526 indicates a selection of the first interface element, the control data 528 may cause the A/V device 210 to activate (e.g., turn on, provide power to, etc.) the lights 304.

Moreover, in some examples, while the client device 214, 216 is still displaying the GUI, the server(s) 224 may receive, using the network interface(s) 504, data (e.g., input data 526) from the client device 214, 216, where the input data 526 indicates that the client device 214, 216 received an input selecting an interface element associated with the security system. For example, the input data 526 may indicate that the client device received an input associated with a first interface element for disarming the security system (e.g., a disarmed mode 530), a second interface element for causing the security system to enter a first armed mode (e.g., a home mode 530), a third interface element for causing the security system to enter a second armed mode (e.g., an away mode 530), and so forth. Based on receiving the input data 526, the server(s) 224 may transmit, using the network interface(s) 504, data (e.g., security system data 532) to an electronic device (e.g., the hub device, 202, the VA device 208, etc.) of the security system, where the security system data 532 causes the electronic device to change the mode of the security system from a current mode 530 to the selected mode 530.

In some examples, while the security system is operating in the stay mode 530, the sensors 204 inside the property (e.g., the motion sensors) may be disarmed, while the sensors 204 (e.g., the door sensors, the window sensors, etc.) outside and along a perimeter of the property and/or the A/V device(s) 210 may be armed. Additionally, during the stay mode 530, at least one of the automation devices 206 (e.g., an exterior automation system) may be activated between certain hours, such as, but not limited to, 6:00 p.m. and 4:00 a.m.

In the away mode 530, the sensors 202 inside the property, the sensors 202 outside and along the perimeter of the property, and/or the A/V device(s) 210 may be armed. Additionally, during the away mode 530, at least one of the automation devices 206 (e.g., an interior and/or exterior automation system) may be activated between certain hours, such as, but not limited to, 6:00 p.m. and 4:00 a.m.

In the disarmed mode 530, all of the sensors 202 and/or the automation devices 206 may be disarmed. However, in the disarmed mode 530, one or more A/V A/V device(s) 210 may be in an active state for detecting motion and/or recording image data 406 in the field of view of the one or more A/V device(s) 210.

In some examples, the server(s) 224 may receive, using the network interface(s) 504, data (e.g., display data 514) from the client device 214, 216, where the display data 514 indicates that the client device 214, 216 is no longer displaying the GUI. Based on the display data 514, the server(s) 224 may store data (e.g., initial data 512, updated data 426, image data 406, etc.) that represents the content that was being presented by the client device 214, 216 at the time the client device 214, 216 ceased displaying the GUI. In some examples, the server(s) 224 may store the data as initial data 512 that the server(s) 224 may transmit to the client device 214, 216 when the client device 214, 216 once again displays the GUI.

It should be noted that, in some examples, the server(s) 224 may update the initial data 512 each time the server(s) 224 receive updated data 426 from the A/V device(s) 210. For example, the server(s) 224 may, within the initial data 512, store one image for each A/V device 210. As such, when the server(s) 224 receive updated data 426 (e.g., image data 406) from an A/V device 210, the server(s) 224 may update (e.g., replace) the stored image with a new image generated by the A/V device 210. Additionally, the server(s) 224 may update (e.g., replace) to the stored timestamp for the stored image with the timestamp for the new image.

The hub device 202, the server(s) 224, the A/V devices 210, one or more additional or alternative components of the network(s) of servers/backend devices 220, and/or another electronic device may alternatively be referred to herein as "network device(s)". In some examples, the network device(s) may be remote from a location and/or property that includes the electronic devices (e.g., the hub device 202, the sensors 204, the automation devices 206, the A/V devices 210, the electronic device 230, the light emitters 232, etc.). In some examples, the network device(s) may be located at the location and/or the property that includes the electronic devices. In some examples, there may be a combination thereof. In other words, in some examples, at least one network device (e.g., a server, a storage device, etc.) may be remote from the location and/or property while at least one network device (e.g., the hub device 202, the electronic device(s) 230, etc.) may be located at the location and/or the property.

In some examples, the network device(s) may provide one or more services for users. For example, the network device(s) may provide a first service (e.g., a device service) that transmits message(s) 416 and/or image data 406 to the client device 214, 216 based on event(s) being detected by the A/V device(s) 210. For another example, the network device(s) may provide a second service (e.g., a snapshot service) that transmits initial data 512 and/or updated data 426 to the client device 214, 216 such that the client device 214, 216 may updated content of GUIs.

Figure 6:
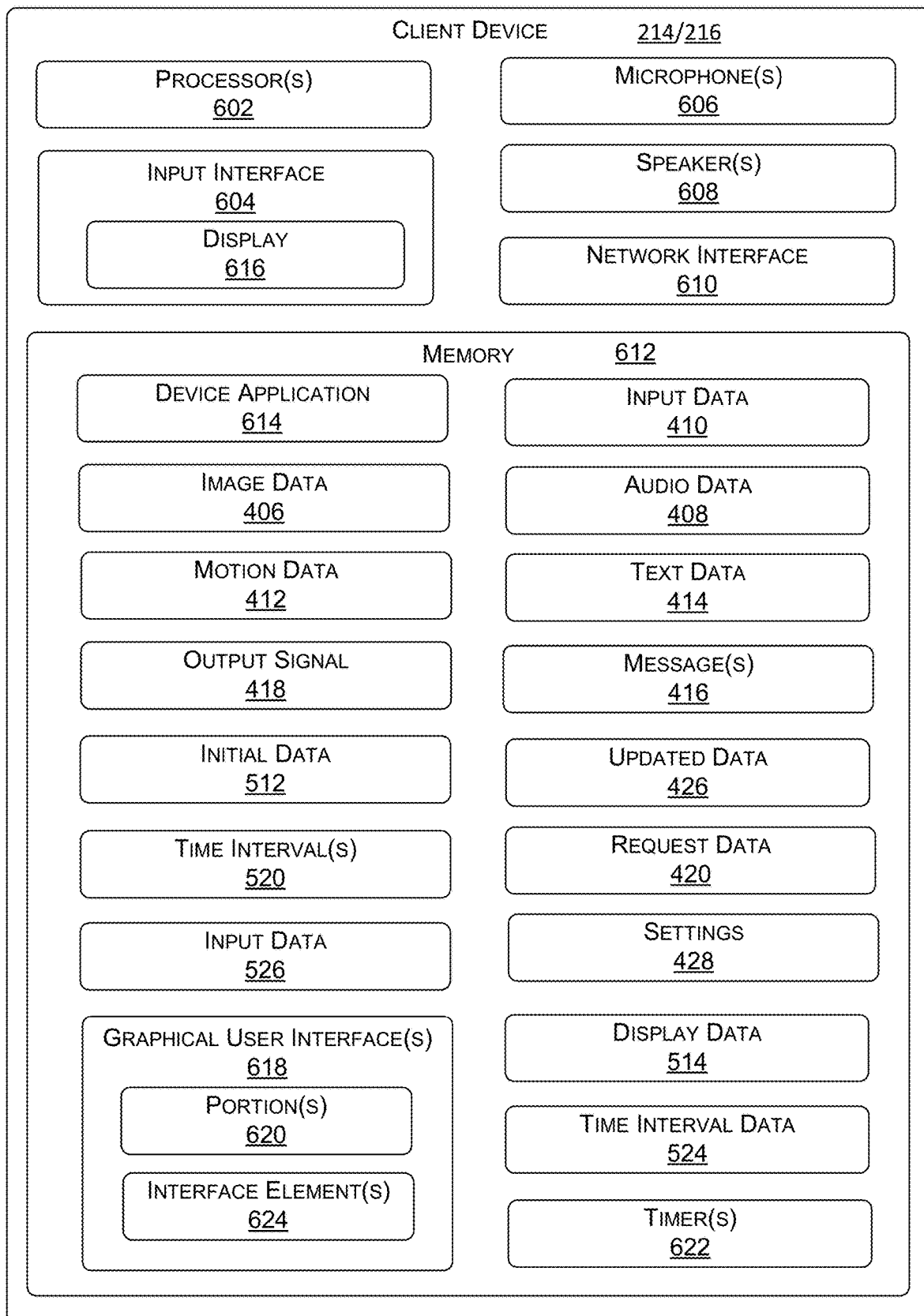
FIG. 6 is a functional block diagram illustrating one example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606 (which may be similar to, and/or include similar functionality as, the microphone(s) 328), speaker(s) 608 (which may be similar to, and/or include similar functionality as, the speaker(s) 330), a network interface 610 (which may be similar to, and/or include similar functionality as, the network interface 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may include instructions that cause the processor(s) 602 to receive input(s) to the input interface 604 (e.g., inputs for viewing graphical user interface(s) (GUI(s)) 618, inputs selecting portions of GUI(s) 618, etc.). In addition, the device application 614 may include instructions that cause the processor(s) 602 to receive, using the network interface 610, the input data 410, the image data 406, the audio data 408, the output signal 418, the messages 416, and/or the updated data 426 from one or more of the A/V device 210, the hub device 202, or the server(s) 224.

With further reference to FIG. 6, the input interface 604 may include a display 616. The display 616 may include a touchscreen, such that the user of the client device 214, 216 may provide inputs directly to the display 616 (e.g., inputs for viewing GUI(s) 618, inputs selecting portions of GUIs 618, etc.). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may include instructions that cause the processor(s) 602 to display the message 416 on the display 616. The message 416 may indicate that an A/V device 210 detected motion, detected the presence of an object, received a touch input (e.g., at the button 306), detected an event, etc. While displaying the message 416, the input interface 604 may receive input from the user to answer the message 416. In response, the device application 614 may include instructions cause the processor(s) 602 to display image(s) and/or video footage represented by the image data 406 on the display 616.

In some examples, the client device 214, 216 may receive, using the input interface 604, an input associated with displaying a GUI 618 associated with an application (e.g., the device application 614). Based on the input, the client device 214, 216 may display the GUI 618 using the display 616. The GUI 618 may include portion(s) 620, where each portion 620 is associated with a respective A/V device 210. For example, each portion 620 of the GUI 618 may include content related to the respective A/V device 210. In some examples, the GUI 618 may correspond to and/or include a dashboard. In some examples, each of the portion(s) 620 may correspond to and/or include a respective tile of the dashboard. In such examples, each tile of the dashboard may include content related to the respective A/V device 210.

The client device 214, 216 may arrange the portions 620 of the GUI 618 using one or more patterns. For a first example, the client device 214, 216 may arrange the portions 620 of the GUI 618 using a grid pattern (e.g., see FIG. 8). For a second example, the client device 214, 216 may arrange the portions 620 of the GUI 618 using a list pattern (e.g., see FIG. 9). Still, for a third example, the client device 214, 216 may arrange the portions 620 of the GUI using any other pattern, such as a scroll through list pattern, a globe pattern (e.g., tiles on a 3D rotatable globe), a slide show pattern, etc.

In some examples, the client device 214, 216 may arrange the portions 620 of the GUI 618 based on user input. For example, the client device 214, 216 may receive, using the input interface 604, input indicating a respective location for each of the portions 620 of the GUI 618. Based on the input, the client device 214, 216 may arrange the portions 620 of the GUI 618. In some examples, the client device 214, 216 may arrange the portions 620 of the GUI 618 based on recency of the content being displayed by the portions 620. For example, the client device 214, 216 may receive first image data 406 generated by a first A/V device 210 at 8:00, second image data 406 generated by a second A/V device 210 at 8:01, third image data 406 generated by a third A/V device 210 at 8:02, and fourth image data 406 generated by a fourth A/V device 210 at 8:03. The client device 214, 216 may then cause a first portion 620 of the GUI 618 that includes an image represented by the fourth image data 604 to be displayed in a first position (e.g., in the top-left of the grid pattern, at the top of the list), cause a second portion 620 of the GUI 618 that includes an image represented by the third image data 604 to be displayed in a second position (e.g., in the top-right of the grid pattern, below the first portion 620 in the list, etc.), cause a third portion 620 of the GUI 618 that includes an image represented by the second image data 604 to be displayed in a third position (e.g., middle-left of the grid pattern, below the second portion 620 in the list, etc.), and cause a fourth portion 620 of the GUI 618 that includes an image represented by the first image data 604 to be displayed in a fourth position (e.g., middle-right of the grid pattern, below the third portion 620 in the list, etc.).

In some examples, the client device 214, 216 may arrange the portions 620 of the GUI 618 based on a respective number of events associated with each A/V device 210. For example, a first A/V device 210 may be associated with one event, a second A/V device 210 may be associated with two events, a third A/V device 210 may be associated with three events, and a fourth A/V device 210 may be associated with four events. The client device 214, 216 may then cause a first portion 620 of the GUI 618 that includes content associated with the fourth A/V device 210 to be displayed in the first position, cause a second portion 620 of the GUI 618 that includes content associated with the third A/V device 210 to be displayed in the second position, cause a third portion 620 of the GUI 618 that includes content associated with the second A/V device 210 to be displayed in the third position, and cause a fourth portion 620 of the GUI 618 that includes content associated with the first A/V device 210 to be displayed in the fourth position.

Still, in some examples, the client device 214, 216 may display the portions 620 of the GUI 618 based on one or more other factors. The one or more other factors may include, but are not limited to, locations of the A/V devices 210, a respective type (e.g., security cameras 210(*a*), light cameras 210(*b*) (e.g., floodlight cameras, spotlight cameras, etc.), A/V doorbells 210(*c*), etc.) of each of the A/V devices 210, and/or the like.

In some examples, the client device 214, 216 may store initial data 512. As discussed herein, the initial data 512 may represent content that the client device 214, 216 was displaying when the client device 214, 216 last displayed the GUI 618. In examples where the client device 214, 216 stores the initial data 512, the client device 214, 216 may display the content represented by the initial data 512 using the GUI 618. For example, the initial data 512 may represent content associated with a first A/V device 210, such as an image represented by image data 406 that was previously generated by the first A/V device 210, and content associated with a second A/V device 210, such as an image represented by image data 406 that was previously generated by the second A/V device 210. In such an example, the client device 214, 216 may use the initial data 512 to display the content (e.g., the image) associated with the first A/V device 210 using a first portion 620 of the GUI 618 and display the content (e.g., the image) associated with the second A/V device 210 using a second portion 620 of the GUI 618.

Additionally to, or alternatively from, the client device 214, 216 storing and/or using the initial data 512, the client device 214, 216 may transmit, using the network interface 610, data (e.g., display data 514) to the network device(s), where the display data 514 indicates that the client device 214, 216 is displaying the GUI 618 (and/or that the client device 214, 216 opened the GUI 618). In some examples, the display data 514 may further include identifier(s) associated with A/V device(s) 210 that the client device 214, 216 is requesting image data 406 (and/or an indication for image data 406 generated by all of the A/V device(s) 210), command(s) for the image data 406, and/or request(s) for image data 406 representing a single image or image data 406 representing image(s) (e.g., image data representing a video feed). In response, the client device 214, 216 may receive, using the network interface 610, data (e.g., initial data 512, updated data 426, image data 406, etc.) from the network device(s). The client device 214, 216 may then display content represented by the data using the GUI 620. For example, the data may represent content associated with a first A/V device 210, such as an image represented by image data 406 that was generated by the first A/V device 210, and content associated with a second A/V device 210, such as an image represented by image data 406 that was generated by the second A/V device 210. In such an example, the client device 214, 216 may use the data to display the content (e.g., the image) associated with the first A/V device 210 using a first portion 620 of the GUI 618 and display the content (e.g., the image) associated with the second A/V device 210 using a second portion 620 of the GUI 618.

In some examples, the initial data 512 may include timestamp(s) indicating when the image data 406 representing the image(s) were generated by the A/V device(s) 210 (e.g., when the image(s) were captured by the A/V device(s) 210). In such examples, the client device 214, 216 may determine whether to request new image(s) using the timestamp(s). In some examples, the client device 214, 216 may determine that a locally stored image (e.g., from the stored initial data 512) should be updated based on comparing a timestamp for the locally stored image to a timestamp received from the server(s) 224 (e.g., a timestamp associated with the most recent image stored for that A/V device on the server(s) 224). If the client device 314, 216 determines that the received timestamp indicates that an image stored by the server(s) 224 was generated after the locally stored image, then the client device 214, 216 may determine that the locally stored image should be updated. In some examples, the client device 214, 216 may determine that a locally stored image should be updated by using the received timestamp to determine how long ago the locally stored image was generated. The client device 214, 216 may then determine that the locally stored image was generated over a threshold period of time ago (e.g., ten seconds, thirty seconds, one minute, five minutes, thirty minutes, one day, etc.). Based on the determination, the client device 214, 216 may determine that the locally stored image should be updated.

In either example, based on determining that an image should be updated, the client device 214, 216 may transmit, using the network interface 708, data (e.g., request data 420) to the server(s) 224, where the request data 420 includes a request for an updated image. The client device 214, 216 may then receive, using the network interface 708, image data 406 represented by the updated image from the server(s) 224. The client device 214, 216 may then update the image being presented using the GUI 618 with the updated image.

In some examples, while the client device 214, 216 continues to display the GUI 618, the client device 214, 216 may continue to receive data (e.g., image data 506, updated data 426, etc.) from the network device(s) and then use the data to update the content being presented by the GUI 618. In some examples, the client device 214, 216 receives the data at the elapse of time interval(s) 520. For example, each time a time interval 520 associated with an A/V device 210 elapses, the client device 214, 216 may receive data (e.g., image data 506, updated data 426, etc.) associated with the A/V device 210. The client device 214, 216 may then update the portion 620 of the GUI 618 that is associated with the A/V device 210 by replacing content that is being displayed using the portion 620 of the GUI 618 with the content represented by the received data. Additionally, client device 214, 216 may also perform similar processes and/or techniques to update the GUI 618 using data (e.g., image data 506, updated data 426, etc.) associated with each of the other A/V device(s) 210.

In some examples, at the elapse of the time interval(s) 520, the client device 214, 216 may generate and then transmit, using the network interface 610, data (e.g., time interval data 524) to the network device(s), where the time interval data 524 indicates that the time intervals(s) 520 elapsed. In some examples, at the elapse of the time interval(s) 520, the client device 214, 216 may generate and then transmit, using the network interface 610, data (e.g., display data 514) to the network device(s), where the display data 514 indicates that the client device 214, 216 is still displaying the GUI 618. Still, in some examples, the client device 214, 216 may generate and then transmit the display data 514 to the network device(s) continuously, at the elapse of different time intervals (e.g., every second, minute, etc.), and/or the like.

In some examples, the client device 214, 216 may use timer(s) 622 to determine when the time interval(s) 520 elapse. For example, based on updating content associated with an A/V device 210, the client device 214, 216 may start a timer 622 for the A/V device 210. The client device 214, 216 may then determine that the time interval 520 for the A/V device 210 elapse when the timer 622 reaches the time interval 520. For example, if the time interval 520 is thirty seconds, the client device 214, 216 may determine that the time interval 520 elapse when the timer 622 reaches thirty seconds.

In some examples, the client device 214, 216 may receive, using the input interface 604, input selecting a portion 620 of the GUI 618. Based on the input, the client device 214, 216 may transmit, using the network interface 610, data (e.g., input data 526) to the network device(s), where the input data 526 indicates the selection of the portion 620 of the GUI 618. The client device 214, 216 may then receive, using the network interface 610, data (e.g., image data 506, updated data 426, etc.) from the network device(s), where the data is generated by the A/V device 210 that is associated with the portion 620 of the GUI 618. Using the data, the client device 214, 216 may update the content being displayed within the portion 620 of the GUI 618 with content represented by the data. In some examples, the client device 214, 216 may continue to receive the data (e.g., image data 406) from the network device(s). In such examples, the content may include images (e.g., a video feed) represented by the image data 406.

In some examples, the client device 214, 216 may receive, using the input interface 604, a second input selecting the portion 620 of the GUI 618. Based on the second input, the client device 214, 216 may transmit, using the network interface 610, data (e.g., input data 526) to the network device(s), where the input data 526 indicates the second selection of the portion 620 of the GUI 618. The client device 214, 216 may then display a second GUI 618 that includes the content from the portion 620 of the GUI 618. In some examples, the portion 620 of the GUI 618 may include a first area and the content being presented in the second GUI 618 may include a second, larger area. In some examples, the second GUI 618 may not include any of the other portions 620 from the GUI 618 (e.g., the second GUI may only include content associated with the A/V device 210).

As further illustrated in FIG. 6, the GUI 618 may include interface element(s) 624. In some examples, the interface element(s) 620 may allow a user of the client device 214, 216 to control one or more actions of the A/V device(s) 210. For example, the interface element(s) 624 associated with an A/V device 210 may include, but are not limited to, a first interface element 624 for causing the A/V device 210 to activate lights 304 (e.g., if the A/V device 210 includes the lights 304), a second interface element 624 for causing the A/V device 210 to output a sound (e.g., activate a siren), a third interface element 624 for causing the A/V device 210 (and/or the client device 214, 216) to no longer provide notifications (e.g., messages 416) when the A/V device 210 detects an object (and/or motion), a fourth interface element 624 indicating that the A/V device 210 is operating in a baby monitoring mode, a fifth interface element 624 indicating that the A/V device 210 is operating in a package protection mode, a sixth interface element 624 indicating that the A/V device 210 is operating in a vehicle/parked car mode, a seventh icon 624 indicating that the A/V device 210 is operating as a "bridge" device, an eighth icon 624 indicating that a locking mechanism being controlled by the A/V device 210 is locked or unlocked, a ninth icon 624 indicating whether a light emitter 232 being controlled by the A/V device 210 is activated or deactivated, and/or the like. While displaying the GUI 618, the client device 214, 216 may receive, using the input interface 604, an input associated with selecting one of the interface elements 624 associated with the A/V device 210. Based on the input, the client device 214, 216 may generate and then transmit, using the network interface 610, data (e.g., input data 526) indicating the selection of the interface element 624 to the network device(s), where the input data 526 causes the A/V device 210 to perform the action. For example, if the input includes selecting the first interface element 624 associated with activating the lights 304, the input data 526 may cause the A/V device 210 to activate (e.g., turn on, provide power to, etc.) the lights 304.

Additionally, or alternatively, in some examples, the interface element(s) 620 may allow a user of the client device 214, 216 to control one or more operations of the security system. For example, the interface element(s) 624 associated with the security system may include, but are not limited to, a first interface element 624 for disarming the security system (e.g., a disarmed mode 530), a second interface element 624 for causing the security system to enter a first armed mode 530 (e.g., a home mode 530), a third interface element 624 for causing the security system to enter a second armed mode 530 (e.g., an away mode 530), and so forth. While displaying the GUI 618, the client device 214, 216 may receive, using the input interface 604, an input associated with selecting one of the interface elements 624 associated with the security system. Based on the input, the client device 214, 216 may generate and then transmit, using the network interface 610, data (e.g., input data 526) indicating the selection of the interface element 624 to the network device(s), where the input data 526 causes the network device(s) to operate the security system according to the selected mode 530. For example, if the input includes selecting the first interface element 624 associated with disarming the security system, the input data 526 may cause the network device(s) to disarm the security system.

In some examples, the client device 214, 216 may cease displaying the GUI 618. The client device 214, 216 may then store data (e.g., initial data 512, updated data 426, image data 406, etc.) that represents the content that was being presented by the client device 214, 216 at the time the client device 214, 216 ceased displaying the GUI 618. In some examples, the server(s) 224 may store the data as initial data 512 that the client device 214, 216 may once again use when the client device 214, 216 displays the GUI 618.

It should be noted that, in some examples, the client device 214, 216 may update the initial data 512 each time the client device 214, 216 receives updated data 426 from the server(s) 224 and/or the A/V device(s) 210. For example, the client device 214, 216 may, within the initial data 512, store one image for each A/V device 210. As such, when the client device 214, 216 receive updated data 426 (e.g., image data 406), the client device 214, 216 may update (e.g., replace) the stored image with a new image generated by the A/V device 210. Additionally, the client device 214, 216 may update (e.g., replace) to the stored timestamp for the stored image with the timestamp for the new image.

Figure 7:
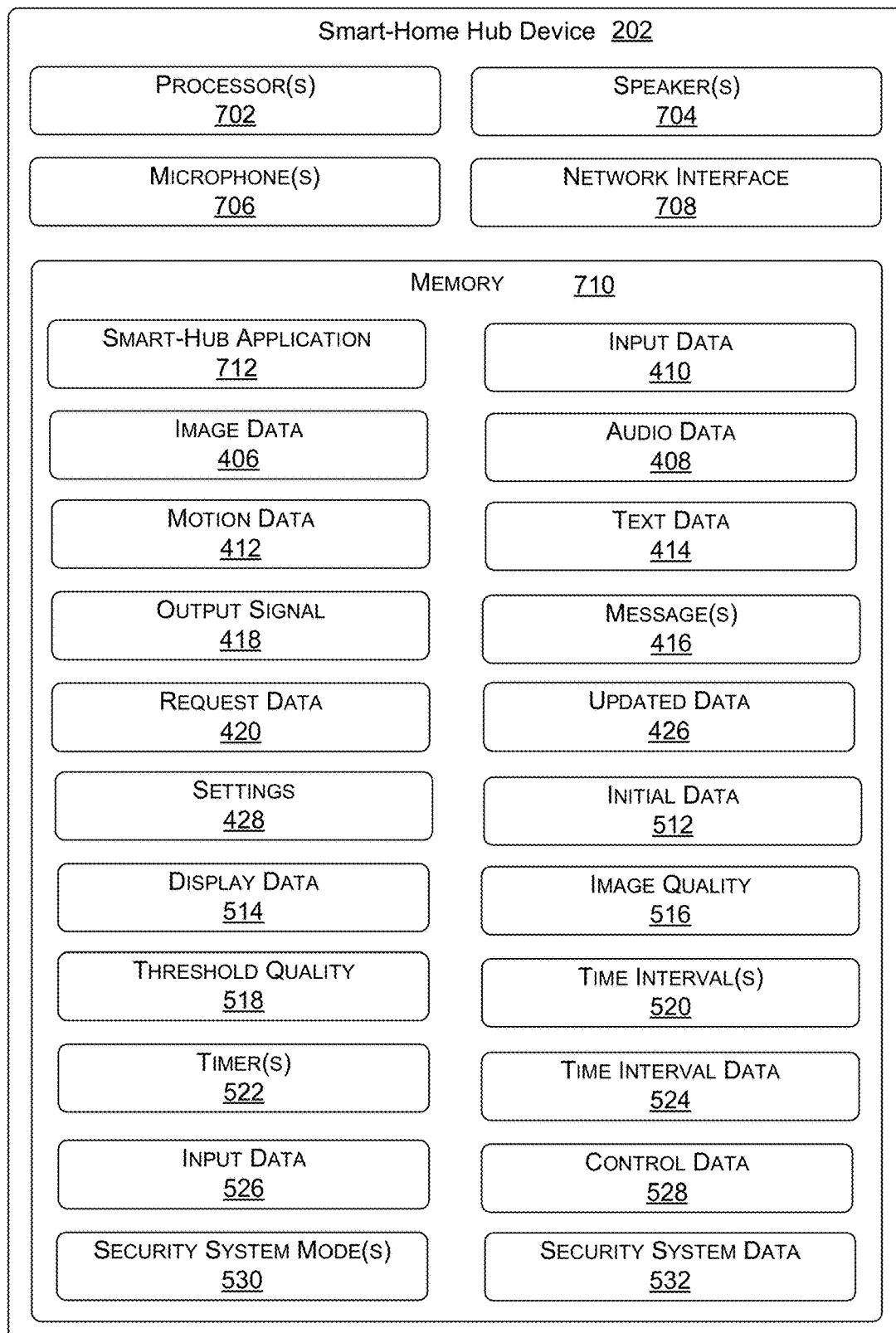
FIG. 7 is a functional block diagram illustrating one example embodiment of a hub device, according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704 (which may be similar to, and/or include similar functionality as, the speaker(s) 330), microphone(s) 706 (which may be similar to, and/or include similar functionality as, the microphone(s) 328), a network interface 708 (which may be similar to, and/or include similar functionality as, the network interface 310), and memory 710 (which may be similar to, and/or include similar functionality as, the memory 402). In some embodiments, the hub device 202 may further comprise a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may include instructions that cause the processor(s) 702 to receive sensor data from the sensors 204, the automation devices 206, the A/V devices 210, and/or other electronic devices (e.g., the electronic devices 230). As discussed herein, in some examples, the sensor data may include a current state (e.g., opened/closed for door and window sensors, motion detected for motion sensors, living room lights on/off for a lighting automation system, etc.) of each of the sensors 204, the automation devices 206, and/or other electronic devices. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204, the automation devices 206, and/or other electronic devices, as well as any updates to the current state based on sensor triggers.

With further reference to FIG. 7, the smart-home hub application 712 may include instructions that cause the processor(s) 702 to receive the audio data 408, the text data 414, the image data 406, the motion data 412, the input data 410, the messages 416, and/or the updated data 426 from the A/V device 210 (in some embodiments, via the server(s) 224) using the network interface 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server(s) 224 in response to motion being detected by the A/V device 210. The smart-hub application 712 may further include instructions that cause the processor(s) 702 to transmit, using the network interface 708, the audio data 408, the text data 414, the image data 406, the motion data 412, the input data 410, the messages 416, and/or the updated data 426 to the client device 214, 216, the server(s) 224, and/or an additional electronic device.

As described herein, at least some of the processes of the A/V device 210, the server(s) 224, and/or the client device 214, 216 may be executed by the hub device 202. For example, based on receiving display data 514 indicating that the client device 214, 216 is displaying the GUI 618, the hub device 202 may transmit, using the network interface 708, initial data 512 and/or updated data 426 (which the hub device 202 may receive from the A/V device(s) 210) to the client device 214, 216 (which may be via the server(s) 224). Additionally, based on determining that the time interval(s) 520 have elapsed and/or determining that the client device 214, 216 is still displaying the GUI 618, the hub device 202 may transmit, using the network interface 708, updated data 426 (which the hub device 202 may receive from the A/V device(s) 210) to the client device 214, 216 (which may be via the server(s) 224). In some examples, the hub device 202 may determine when the time interval(s) 520 elapse. In some examples, the hub device may receive, using the network interface 708, data (e.g., time interval data 524) from the A/V device 210 and/or the server(s) 224, where the time interval data 524 indicates when the time interval(s) 520 elapse.

In some examples, the hub device 202 may receive, using the network interface 708, data (e.g., input data 526) from the client device 214, 216, where the input data 526 indicates a selection of a portion 620 of the GUI 618 that is associated with an A/V device 210. Based on the input data 526, the hub device may transmit, using the network interface 708, data (e.g., image data 406, updated data 426, etc.) to the client device 214, 216 (which may be via the server(s) 224), where the data is associated with the A/V device 210. Additionally, in some examples, the hub device 202 may receive, using the network interface 708, data (e.g., input data 526) from the client device 214, 216, where the input data 526 indicates a selection of an interface element 624 associated with an A/V device 210. Based on the input data 526, the hub device may transmit, using the network interface 708, data (e.g., control data 528) to the A/V device 210 (which may be via the server(s) 224), where the control data 528 causes the A/V device 210 to perform an action associated with the interface element 624. Furthermore, in some examples, the hub device 202 may receive, using the network interface 708, data (e.g., input data 526) from the client device 214, 216, where the input data 526 indicates a selection of an interface element 624 associated with the security system. Based on the input data 526, the hub device may cause the security system to operate in the mode 530 associated with the interface element 624 and/or transmit, using the network interface 708, data (e.g., security system data 532) to an electronic device (which may be via the server(s) 224), where the security system data 532 causes the electronic device to operate the security system in the mode 530 associated with the interface element 624.

Figure 8:
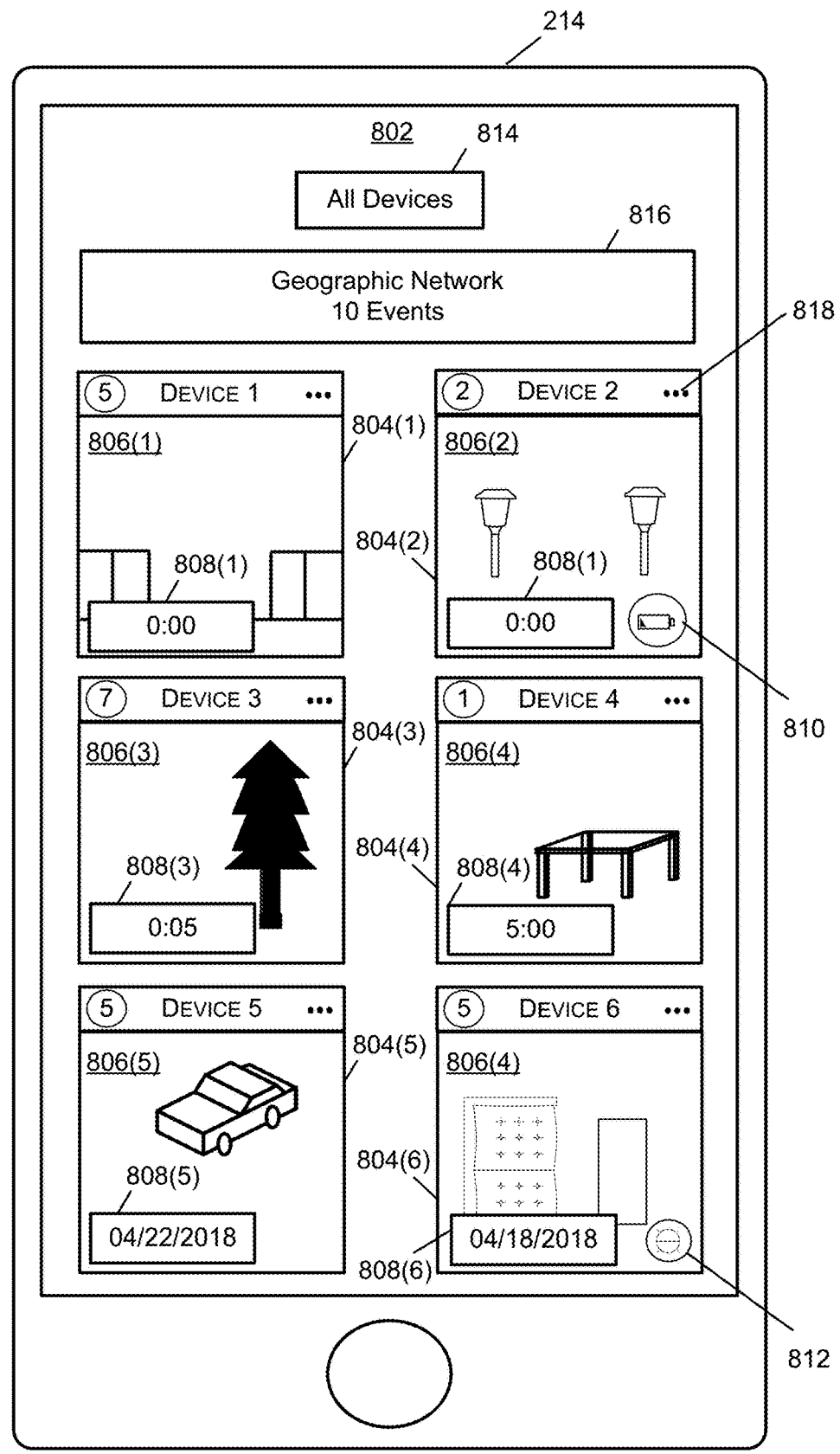
FIG. 8 illustrates an example of a graphical user interface that is displaying content associated with A/V devices using a grid pattern, according to various aspects of the present disclosure.

FIG. 8 illustrates an example of a graphical user interface (GUI) 802 (which may represent one of the GUIs 618) that is displaying content associated with A/V devices 210 using a grid pattern, according to various aspects of the present disclosure. For example, as illustrated in FIG. 8, a first portion 804(1) of the GUI 802 may be associated with a first A/V device 210 and display a first image 806(1) represented by first image data 406 generated by the first A/V device 210. The first portion 804(1) may further include a first graphical element 808(1) indicating how long ago the first A/V device 210 generated the first image data 406. For example, the first graphical element 808(1) indicates that the first A/V device 210 generated the first image data 406 zero minutes ago. A second portion 804(2) of the GUI 802 may be associated with a second A/V device 210 and display a second image 806(2) represented by second image data 406 generated by the second A/V device 210. The second portion 804(2) may further include a second graphical element 808(2) indicating how long ago the second A/V device 210 generated the second image data 406. For example, the second graphical element 808(2) indicates that the second A/V device 210 generated the second image data 406 zero minutes ago. The second portion 802(2) further includes a graphical element 810 indicating that a battery 342 of the second A/V device 210 is low (e.g., the power of the battery 342 is below a threshold level).

A third portion 804(3) of the GUI 802 may be associated with a third A/V device 210 and display a third image 806(3) represented by third image data 406 generated by the third A/V device 210. The third portion 804(3) may further include a third graphical element 808(3) indicating how long ago the third A/V device 210 generated the third image data 406. For example, the third graphical element 808(3) indicates that the third A/V device 210 generated the third image data 406 five minutes ago. A fourth portion 804(4) of the GUI 802 may be associated with a fourth A/V device 210 and display a fourth image 806(4) represented by fourth image data 406 generated by the fourth A/V device 210. The fourth portion 804(4) may further include a fourth graphical element 808(4) indicating how long ago the fourth A/V device 210 generated the fourth image data 406. For example, the fourth graphical element 808(4) indicates that the fourth A/V device 210 generated the fourth image data 406 five hours ago.

A fifth portion 804(5) of the GUI 802 may be associated with a fifth A/V device 210 and display a fifth image 806(5) represented by fifth image data 406 generated by the fifth A/V device 210. The fifth portion 804(5) may further include a fifth graphical element 808(5) indicating how long ago the fifth A/V device 210 generated the fifth image data 406. For example, the fifth graphical element 808(5) indicates that the fifth A/V device 210 generated the fifth image data 406 on Jun. 22, 2018. Finally, a sixth portion 804(6) of the GUI 802 may be associated with a sixth A/V device 210 and display a sixth image 806(6) represented by sixth image data 406 generated by the sixth A/V device 210. The sixth portion 804(6) may further include a sixth graphical element 808(6) indicating how long ago the sixth A/V device 210 generated the sixth image data 406. For example, the sixth graphical element 808(6) indicates that the sixth A/V device 210 generated the sixth image data 406 on Jun. 18, 2018. The sixth portion 802(6) further includes a graphical element 812 indicating that lights 304 of the sixth A/V device 210 are activated (e.g., turned on, receiving power, emitting light, etc.).

As shown, the portions 804(1)-(6) of the GUI 802 are arranged in a grid pattern, using three rows and two columns. However, this is just an example, and in other examples, the grid pattern may include any number of rows and/or columns. Additionally, although the portions 804(1)-(6) are arranged according to recency, such that the first portion 804(1) that includes the most recent image 806(1) is first, the second portion 804(2) that includes the second most recent image 806(2) is second, and so forth, in other examples, the portions 804(1)-(6) may be arranged using one or more other prioritization techniques. For example, the portions 804(1)-(6) may be arranged according to user input, number of events, locations of the A/V devices 210, types of the A/V devices 210, order or setup/association with the user account, and/or the like.

As further illustrated in FIG. 8, the GUI 802 includes an interface element 814 that the user may use to select which A/V devices 210 include content being displayed by the GUI 802. In the example of FIG. 8, the GUI 802 is displaying content for all of the A/V devices 210. However, in some examples, the user may only want to the GUI 802 to display content for the first A/V device 210 and the second A/V device 210 (and/or any other combination of the A/V devices 210). In such an example, the GUI 802 may only include the first portion 804(1) associated with the first A/V device 210 and the second portion 804(2) associated with the second A/V device 210.

As further illustrated in FIG. 8, the GUI 802 may include an interface element 814 for viewing events that occur within a geographic network. For example, while displaying the GUI 802, the client device 214 may receive an input selecting the interface element 814. Based on the input, the client device 214 may display at least a portion of the events using the GUI 802 and/or using a different GUI.

As further illustrated in FIG. 8, each portion 804(1)-(6) of the GUI 802 includes a respective interface element 818 (although only one is labeled for clarity reasons) for updating settings associated with the each of the A/V devices 210. For example, the client device 214 may receive an input selecting the graphical element 818. Based on the input, the client device 214 may display settings associated with the second A/V device 210 using the GUI 802 and/or another GUI. The user may then use the client device 214 to update the settings of the second A/V device 210 (e.g., to adjust motion sensitivity settings, to create motion zones within the FOV of the second A/V device 210, to put the second A/V device 210 into one or more modes, such as baby monitoring mode, package protection mode, etc., to turn on or off alerts for motion and/or inputs to the button, to adjust the tones associated with the motion alerts and/or the alerts for inputs to the button, to view the device health, such as the signal strength of the device, the battery level, etc., to put the device into a snooze to deactivate the notifications and/or motion sensing/object detection, to add one or more shared users for the second A/V device 210, to connect the second A/V device 210 to one or more sensors and/or automation devices, etc.).

Figure 9:
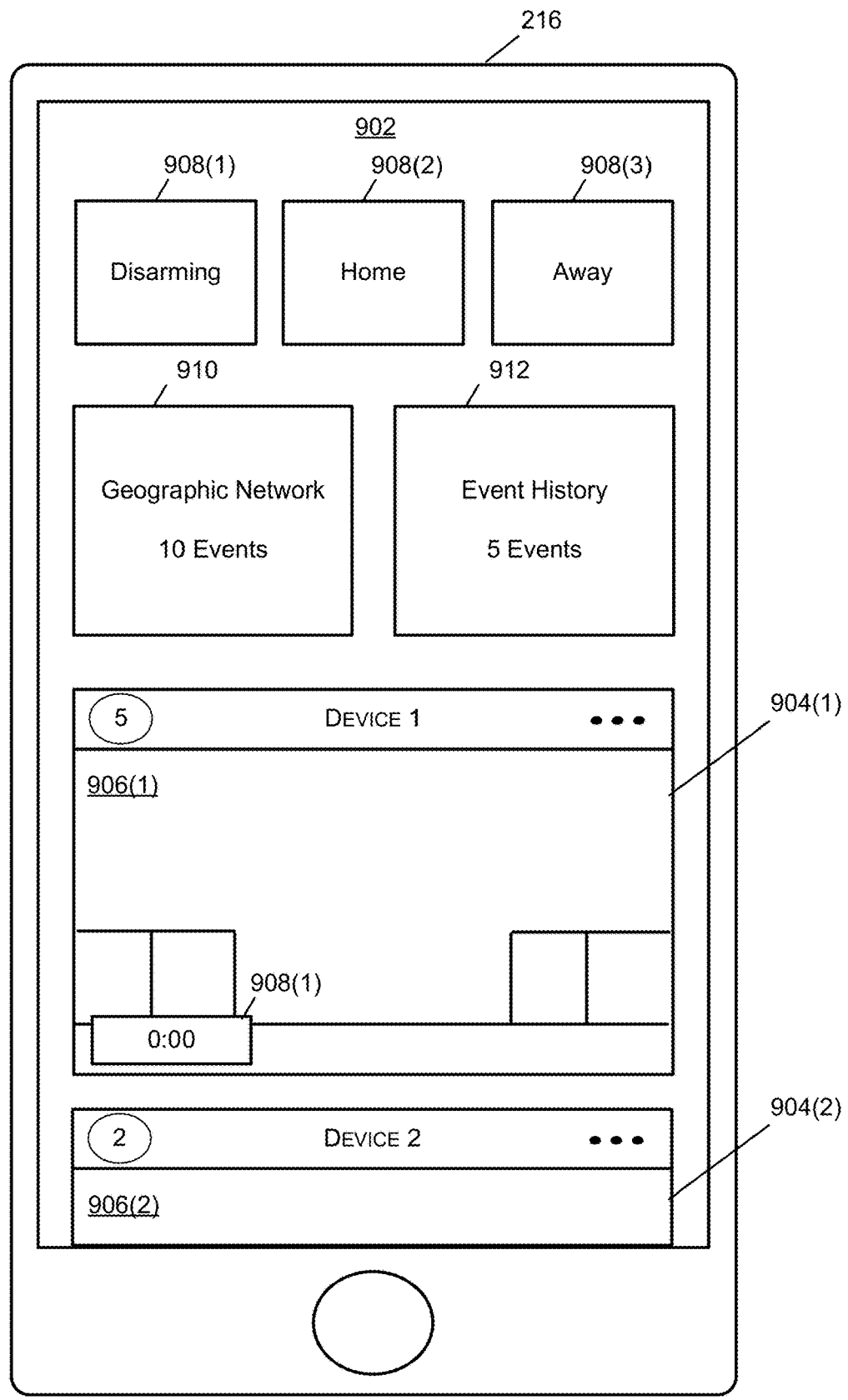
FIG. 9 illustrates an example of a graphical user interface that is displaying content associated with A/V devices using a list pattern, according to various aspects of the present disclosure.

FIG. 9 illustrates an example of a graphical user interface (GUI) 902 (which may represent one of the GUIs 618) that is displaying content associated with A/V devices 210 using a list pattern, according to various aspects of the present disclosure. For example, as illustrated in FIG. 9, a first portion 904(1) of the GUI 902 may be associated with a first A/V device 210 and display a first image 906(1) represented by first image data 406 generated by the first A/V device 210. The first portion 904(1) may further include a first graphical element 908(1) indicating how long ago the first A/V device 210 generated the first image data 406. For example, the first graphical element 908(1) indicates that the first A/V device 210 generated the first image data 406 zero minutes ago. A second portion 904(2) of the GUI 902 may be associated with a second A/V device 210 and display a second image 906(2) represented by second image data 406 generated by the second A/V device 210.

As further illustrated in FIG. 9, the GUI 902 further includes interface elements 908(1)-(3) associated with operating the security system. For example, a first interface element 908(1) may be associated with disarming the security system (e.g., a disarmed mode 530), a second interface element 908(2) may be associated with causing the security system to enter a first armed mode 530 (e.g., a home mode 530), and a third interface element 908(3) may be associated with causing the security system to enter a second armed mode 530 (e.g., an away mode 530. For instance, the client device 214 may receive an input selecting the first interface element 908(1). Based on the input, the client device 214 may transmit data (e.g., input data 526) to the network device(s), where the input data 526 indicates the selection of the first interface element. The network device(s) may then cause the security system to operate in the disarmed mode 530.

As further illustrated in FIG. 9, the GUI 902 may include an interface element 910 for viewing events that occur within a geographic network. Additionally, the GUI 902 may include an interface element 912 for viewing events associated with the A/V devices 210. For example, the client device 214 may receive an input selecting the interface element 912. Based on the input, the client device 214 may display at least a portion of the events associated with the A/V devices 210 using the GUI 902 and/or using a different GUI.

Figure 10:
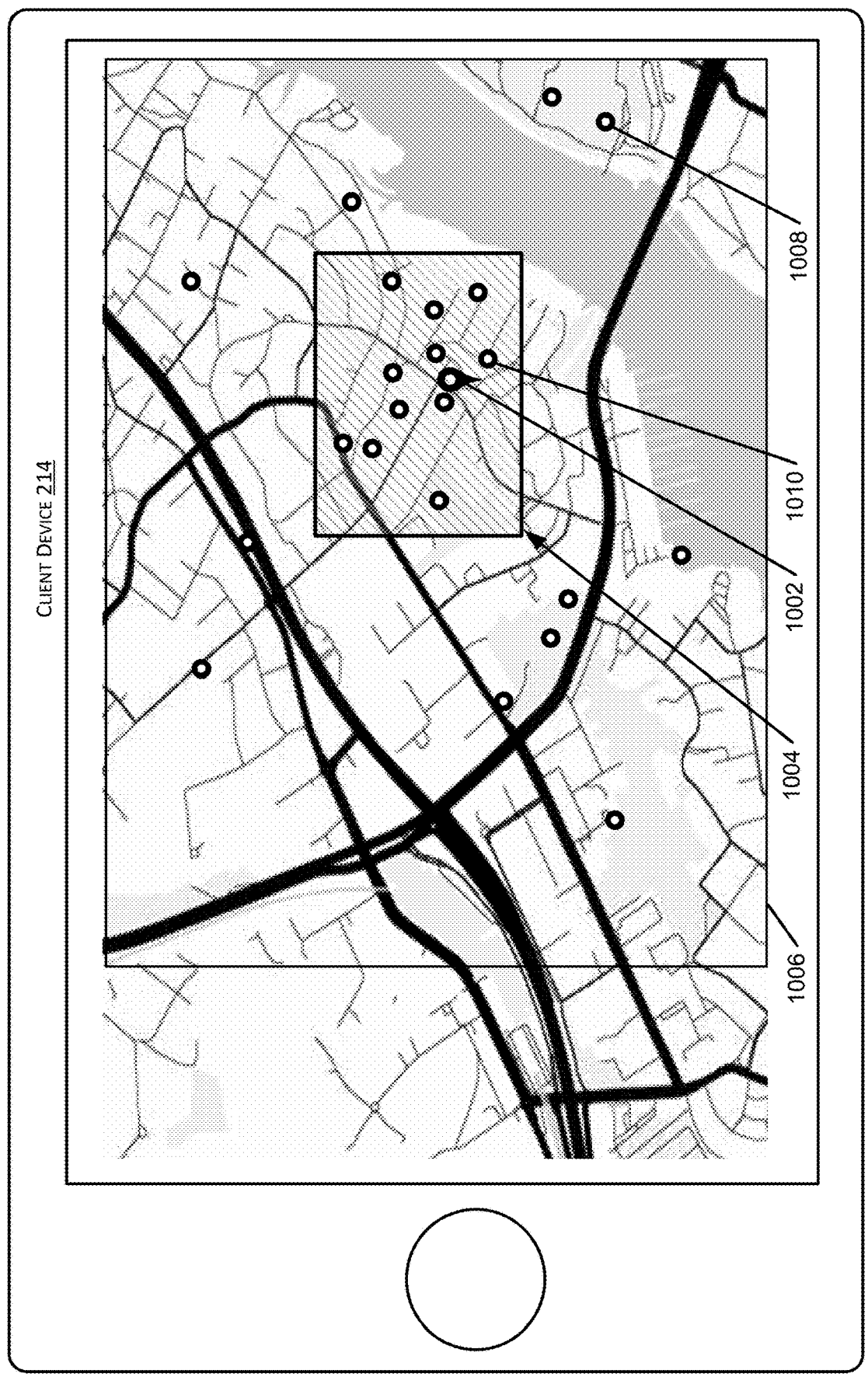
FIG. 10 illustrates an example of a geographic network, according to various aspects of the present disclosure.

FIG. 10 illustrates an example of a geographic network of users, according to various aspects of the present disclosure. In some examples, a geographic network may be executed by a geographic network platform, such as a geographic network platform operating on the server(s) 224 and/or one or more other or additional components of the network of servers/backend devices 220. As such, the server(s) 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods®, Neighbors, or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data (e.g., image data 406), audio data (e.g., audio data 408), text data (e.g., text data 414), input data (e.g., input data 410), motion data (e.g., motion data 412), and/or other data from the user's A/V device (e.g., the A/V device 210) and/or the user's client device (e.g., the client device(s) 214, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. In some examples, the client device may transmit the consent data to the geographic network platform to register. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the server(s) 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allows a user of the geographic network to post videos, photos, text, and/or other data to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the server(s) 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 10, a portion of the geographic network is shown. With reference to FIG. 10, and during a setup or registration process with the geographic network, the geographic location 1002 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), based on location data, etc.). In some examples, the user may then be associated with the geographic area 1004 (which may represent one of the geographic areas) of the geographic network, such as based on the neighborhood, town, city, zip code, state, country, or other area that the user is located. In one example, the geographic area 1004 may be the town that the geographic location 1002 associated with the user is located. In other examples, the user may define, on the map 1006, the geographic area 1004 of the geographic network that the user wishes to have access to content, which may include the geographic location 1002 associated with the user. To define the geographic area 1004, the user may overlay a predefined shape on the map 1006 (e.g., a rectangle, as shown, a circle, a triangle, a square, a polygon, etc.), may position any number of vertices to define a polygon on the map 1006, may define a radius about the geographic location 1002 associated with the user, may draw the geographic area 1004 on the map, etc. The geographic network may limit the size of the geographic area 1004 for the user. The size may be limited to a maximum distance in any direction from the geographic location 1002 (e.g., a radius) associated with the user of less than, for example and without limitation, two miles, five miles, ten miles, fifteen miles, fifty miles, or the like.

Although the geographic area 1004 includes the geographic area 1004 of the geographic network that the user may desire to view content from, the content shared by the user may be shared with a larger, smaller, and/or different geographic area of the geographic network than the geographic area 1004. For example, the geographic area 1004 may include the geographic area that the user can view content in, but any users located within the entire portion of the map 1006 displayed on the client device 214 may be able to view content shared by the user of the client device 214 (e.g., depending on the geographic areas defined by and/or associated with the other users located within the portion of the map 1006). For example, users of the geographic network having associated geographic location(s) 1008 outside of the geographic area 1004 may be able to view the content shared by the user of the client device 214, but the user of the client device 214 may not be able to view, or may choose not to view (e.g., by defining the geographic area 1004 that does not include the geographic locations 1008), the content shared by the user(s) associated with the geographic location(s) 1008. In other examples, the geographic area 1004 that the user of the client device 214 desires to view content from may also be the same geographic area 1004 that users can view content shared by the user of the client device 214. For example, where the geographic area 1004 is a town, each of the users located within the town may only be able to view and share content with each other user located in the town. As another example, where the geographic area 1004 is defined by the user of the client device 214, the user of the client device 214 may only be able to view content by the users who are located within the geographic area 1004 and the users within the geographic area 1004 may be the only users that can view content shared by the user of the client device 214.

With further reference to FIG. 10, and during use of the geographic network platform by the user of the client device 214, the user may access a GUI (e.g., a GUI 618) on the client device 214 (e.g., within a mobile or web application). The user may desire to view shared content from users of the geographic area 1004 of the geographic network. In some examples, each time content is shared by a user, the client device 214 may indicate that an event occurred with the geographic network. As such, the icons (e.g., graphical elements) illustrating the geographic locations 1010 may be included within the geographic area 1004 because data generated by client devices and/or A/V devices of users associated with the geographic locations 1010 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the server(s) 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 1006.

Each of the processes described herein, including the processes 1100, 1200, 1300, 1400, 1500, 1600, and 1700 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 11A:
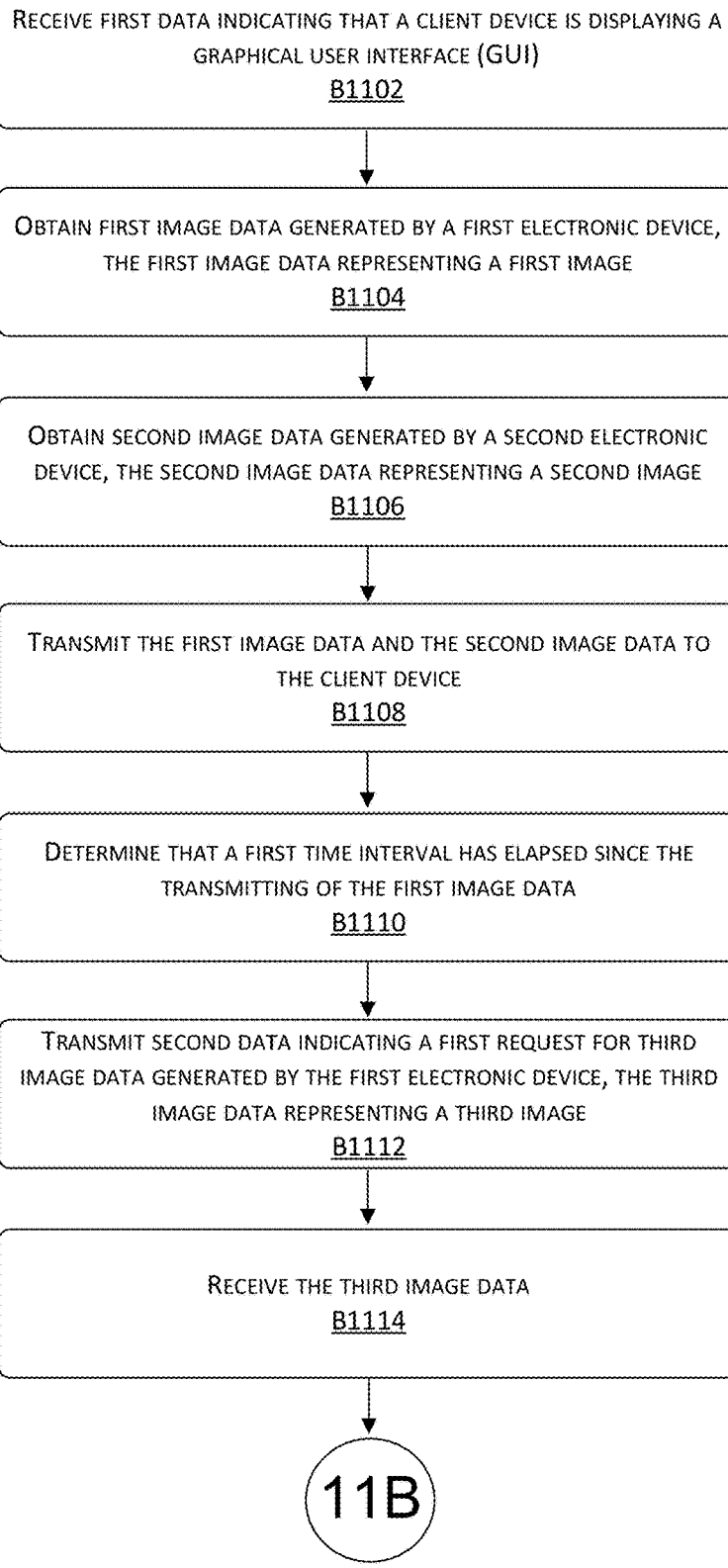
FIGS. 11A-11B are a flowchart illustrating an example process for updating content being displayed using a graphical user interface, according to various aspects of the present disclosure.
Figure 11B:
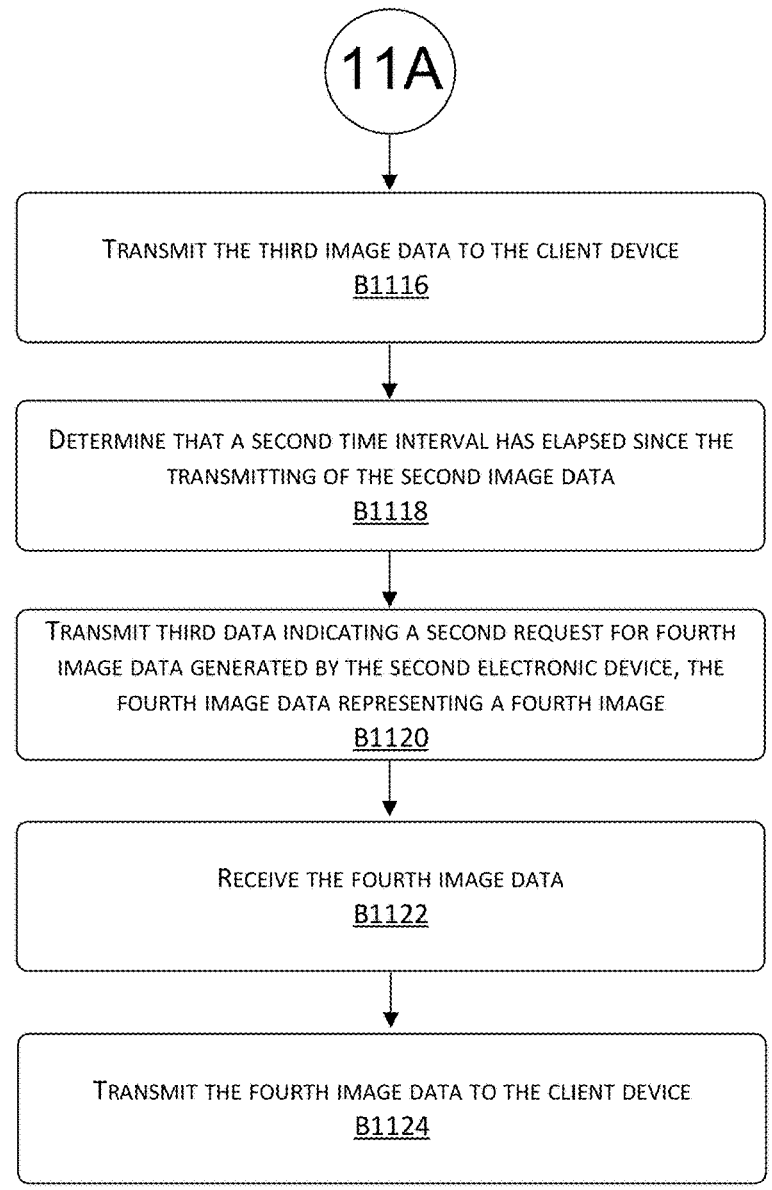

FIG. 11A-11B are a flowchart illustrating an example process 1100 for updating content being displayed using a graphical user interface, according to various aspects of the present disclosure. The process 1100, at block B1102, includes receiving first data indicating that a client device is displaying a graphical user interface (GUI). For example, the server(s) 224 (and/or the hub device 202) may receive display data 514 from the client device 214, 216, where the display data 514 indicates that the client device 214, 216 is displaying a GUI 618. In some examples, the server(s) 224 (and/or the hub device 202) may receive the display data 514 in response to the client device 214, 216 receiving input associated with displaying the GUI 618. In some examples, the server(s) 224 (and/or the hub device 202) may receive the display data 514 in response to the client device 214, 216 initially displaying the GUI 618.

The process 1100, at block B1104, includes obtaining first image data generated by a first electronic device, the first image data representing a first image. For example, the server(s) 224 (and/or the hub device 202) may obtain first image data 406 (and/or first initial data 512) generated by a first A/V device 210, the first image data 406 representing a first image. In some examples, such as when the server(s) 224 (and/or the hub device 202) are storing the first image data 406 (and/or the first initial data 512), the server(s) 224 (and/or the hub device 202) may obtain the first image data 406 (and/or the first initial data 512) by retrieving the first image data 406 (and/or the first initial data 512) from memory. In some examples, to obtain the first image data 406 (and/or the first initial data 512), the server(s) 224 (and/or the hub device 202) may transmit request data 420 to the first A/V device 210, where the request data 420 includes a request for the first image data 406 (and/or the first initial data 512). The server(s) 224 (and/or the hub device 202) may then receiving the first image data 406 (and/or the first initial data 512) from the first A/V device 210.

The process 1100, at block B1106, includes obtaining second image data generated by a second electronic device, the second image data representing a second image. For example, the server(s) 224 (and/or the hub device 202) may obtain second image data 406 (and/or second initial data 512) generated by a second A/V device 210, the second image data 406 representing a second image. In some examples, such as when the server(s) 224 (and/or the hub device 202) are storing the second image data 406 (and/or the second initial data 512), the server(s) 224 (and/or the hub device 202) may obtain the second image data 406 (and/or the second initial data 512) by retrieving the second image data 406 (and/or the second initial data 512) from memory. In some examples, to obtain the second image data 406 (and/or the second initial data 512), the server(s) 224 (and/or the hub device 202) may transmit request data 420 to the second A/V device 210, where the request data 420 includes a request for the second image data 406 (and/or the second initial data 512). The server(s) 224 (and/or the hub device 202) may then receiving the second image data 406 (and/or the second initial data 512) from the second A/V device 210.

The process 1100, at block B1108, includes transmitting the first image data and the second image data to the client device. For example, the server(s) 224 (and/or the hub device 202) may transmit the first image data 406 (and/or the first initial data 512) and the second image data 406 (and/or the second initial data 512) to the client device 214, 216. In some examples, the transmitting of the first image data 406 (and/or the first initial data 512) and the second image data 406 (and/or the second initial data 512) may cause the client device 214, 216 to display at least the first image using a first portion 620 of the GUI 618 and the second image using a second portion 620 of the GUI 618.

The process 1100, at block B1110, includes determining that a first time interval has elapsed since the transmitting of the first image data. For example, the server(s) 224 (and/or the hub device 202) may determine that a first time interval 520 has elapsed since the transmitting of the first image data 406 to the client device 214, 216. In some examples, the server(s) 224 (and/or the hub device 202) may determine that the first time interval 520 has elapsed based on a timer 522 reaching the first time interval 520. In some examples, the server(s) 224 (and/or the hub device 202) may determine that the first time interval 520 has elapsed based on receiving time interval data 524 from the client device 214, 216, where the time interval data 524 indicates that the first time interval 520 has elapsed. Still, in some examples, the server(s) 224 (and/or the hub device 202) may determine that the client device 214, 236 is still displaying the GUI 618 at the elapse of the first time interval 520, such as by receiving display data 514 from the client device 214, 216, where the display data 514 indicates that the client device 214, 216 is still displaying the GUI 618.

The process 1100, at block B1112, includes transmitting second data indicating a first request for third image data generated by the first electronic device, the third image data representing a third image. For example, the server(s) 224 (and/or the hub device 202) may transmit request data 420 to the first A/V device 210, where the request data 420 includes a first request for third image data 406 representing a third image. The server(s) 224 (and/or the hub device 202) may transmit the request data 420 based on determining that the first time interval 520 has elapsed and/or based on determining that the client device 214, 216 is still displaying the GUI 618.

The process 1100, at block B1114, includes receiving the third image data. For example, the server(s) 224 (and/or the hub device 202) may receive the third image data 406 from the first A/V device 210.

The process 1100, at block B1116, includes transmitting the third image data to the client device. For example, the server(s) 224 (and/or the hub device 202) may transmit the third image data 406 to the client device 214, 216. In some examples, the transmitting of the third image data 406 may cause the client device 214, 216 to display the third image, instead of the first image, using the first portion 620 of the GUI 618.

The process 1100, at block B1118, includes determining that a second time interval has elapsed since the transmitting of the second image data. For example, the server(s) 224 (and/or the hub device 202) may determine that a second time interval 520 has elapsed since the transmitting of the second image data 406 to the client device 214, 216. In some examples, the server(s) 224 (and/or the hub device 202) may determine that the second time interval 520 has elapsed based on a timer 522 reaching the second time interval 520. In some examples, the server(s) 224 (and/or the hub device 202) may determine that the second time interval 520 has elapsed based on receiving time interval data 524 from the client device 214, 216, where the time interval data 524 indicates that the second time interval 520 has elapsed. Still, in some examples, the server(s) 224 (and/or the hub device 202) may determine that the client device 214, 236 is still displaying the GUI 618 at the elapse of the first time interval 520, such as by receiving display data 514 from the client device 214, 216, where the display data 514 indicates that the client device 214, 216 is still displaying the GUI 618.

In some examples, the first time interval 520 may be similar to the second time interval 520. In other examples, the first time interval 520 may be different than the second time interval 520.

The process 1100, at block B1120, includes transmitting third data indicating a third request for fourth image data generated by the second electronic device, the fourth image data representing a fourth image. For example, the server(s) 224 (and/or the hub device 202) may transmit request data 420 to the second A/V device 210, where the request data 420 includes a second request for fourth image data 406 representing a fourth image. The server(s) 224 (and/or the hub device 202) may transmit the request data 420 based on determining that the second time interval 520 has elapsed and/or based on determining that the client device 214, 216 is still displaying the GUI 618.

The process 1100, at block B1122, includes receiving the fourth image data. For example, the server(s) 224 (and/or the hub device 202) may receive the fourth image data 406 from the second A/V device 210.

The process 1100, at block B1124, includes transmitting the fourth image data to the client device. For example, the server(s) 224 (and/or the hub device 202) may transmit the fourth image data 406 to the client device 214, 216. In some examples, the transmitting of the fourth image data 406 may cause the client device 214, 216 to display the fourth image, instead of the second image, using the second portion 620 of the GUI 618.

Figure 12:
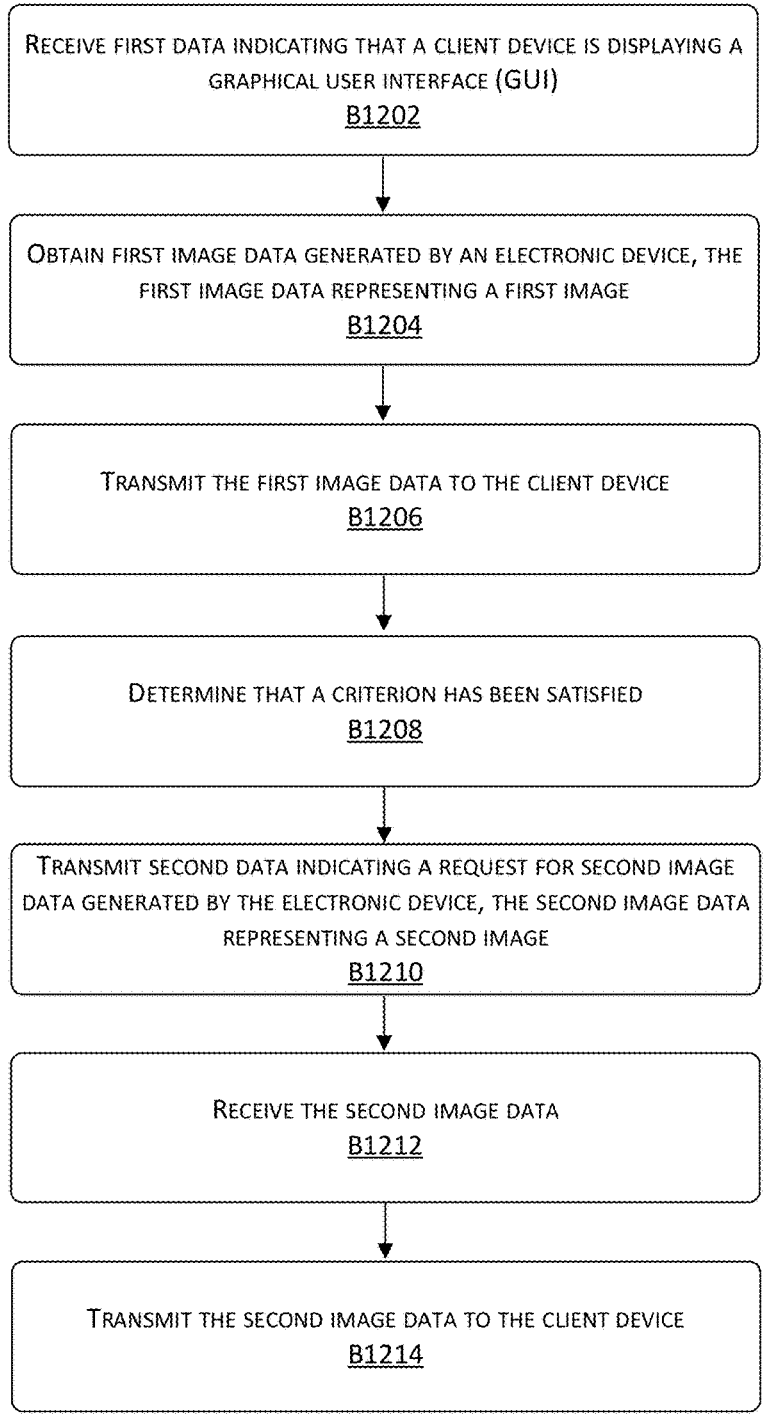
FIG. 12 is a flowchart illustrating an example process for updating content associated with an A/V device that is being displayed by a client device, according to various aspects of the present disclosure.

FIG. 12 is a flowchart illustrating an example process 1200 for updating content associated with an A/V device that is being displayed by a client device, according to various aspects of the present disclosure. The process 1200, at block B1202, includes receiving first data indicating that a client device is displaying a graphical user interface (GUI). For example, the server(s) 224 (and/or the hub device 202) may receive display data 514 from the client device 214, 216, where the display data 514 indicates that the client device 214, 216 is displaying a GUI 618 and/or the client device 214, 216 opened an application associated with the GUI 618. In some examples, the server(s) 224 (and/or the hub device 202) may receive the display data 514 in response to the client device 214, 216 receiving input associated with displaying the GUI 618. In some examples, the server(s) 224 (and/or the hub device 202) may receive the display data 514 in response to the client device 214, 216 initially displaying the GUI 618.

The process 1200, at block B1204, includes obtaining first image data generated by an electronic device, the first image data representing a first image. For example, the server(s) 224 (and/or the hub device 202) may obtain first image data 406 (and/or initial data 512) generated by an A/V device 210, the first image data 406 representing a first image. In some examples, such as when the server(s) 224 (and/or the hub device 202) are storing the first image data 406 (and/or the initial data 512), the server(s) 224 (and/or the hub device 202) may obtain the first image data 406 (and/or the initial data 512) by retrieving the first image data 406 (and/or the initial data 512) from memory. In some examples, to obtain the first image data 406 (and/or the initial data 512), the server(s) 224 (and/or the hub device 202) may transmit request data 420 to the first A/V device 210, where the request data 420 includes a request for the first image data 406 (and/or the initial data 512). The server(s) 224 (and/or the hub device 202) may then receiving the first image data 406 (and/or the initial data 512) from the first A/V device.

The process 1200, at block B1206, includes transmitting the first image data to the client device. For example, the server(s) 224 (and/or the hub device 202) may transmit the first image data 406 (and/or the first initial data 512) to the client device 214, 216. In some examples, the transmitting of the first image data 406 (and/or the first initial data 512) may cause the client device 214, 216 to display at least the first image using the GUI 618.

The process 1200, at block B1208, includes determining that a criterion has been satisfied. For example, the server(s) 224 (and/or the hub device 202) may determine that a criterion is satisfied. In some examples, the criterion may be associated with a time interval 520. In such examples, the server(s) 224 (and/or the hub device 202) may determine that the criterion is satisfied based on the time interval 520 elapsing since the transmitting of the first image data 406 to the client device 214, 216. In some examples, the server(s) 224 (and/or the hub device 202) may determine that the time interval 520 has elapsed based on a timer 522 reaching the time interval 520. In some examples, the server(s) 224 (and/or the hub device 202) may determine that the time interval 520 has elapsed based on receiving time interval data 524 from the client device 214, 216, where the time interval data 524 indicates that the time interval 520 has elapsed.

Additionally, or alternatively, in some examples, the criterion may be associated with the client device 214, 216 continuing to display the GUI 618. In such examples, the server(s) 224 (and/or the hub device 202) may determine that the criterion is satisfied based on determining that the client device 214, 216 is still displaying the GUI 618 (and/or determining that the application is still open on the client device 214, 216). In some examples, the server(s) 224 (and/or the hub device 202) may determine that the client device 214, 216 is still displaying the GUI 618 based on receiving, from the client device 214, 216, display data 514 indicating that the client device 214, 216 is still displaying the GUI 618.

Additionally, or alternatively, in some examples, the criterion may be associated with the client device 214, 216 detecting an object (and/or motion). In such examples, the server(s) 224 (and/or the hub device 202) may determine that the criterion is satisfied based on receive data (e.g., a message 416, motion data 412, image data 406, etc.) from the client device 214, 216, where the data indicates that the client device 214, 216 detected the object (and/or motion).

The process 1200, at block B1210, includes transmitting second data indicating a request for second image data generated by the electronic device, the second image data representing a second image. For example, the server(s) 224 (and/or the hub device 202) may transmit request data 420 to the A/V device 210, where the request data 420 includes a request for second image data 406 representing a second image. The server(s) 224 (and/or the hub device 202) may transmit the request data 420 based on determining that the criterion is satisfied, such as when the criterion in is associated with the time interval 520 elapsing and/or when the criterion is associated with the client device 214, 216 still displaying the GUI 618. However, in some examples, such as when the criterion is associated with the client device 214, 216 detecting an object (and/or motion), the process 1200 may not include block B1210.

The process 1200, at block B1212, includes receiving the second image data. For example, the server(s) 224 (and/or the hub device 202) may receive the second image data 406 from the A/V device 210.

The process 1200, at block B1214, includes transmitting the second image data to the client device. For example, the server(s) 224 (and/or the hub device 202) may transmit the second image data 406 to the client device 214, 216. In some examples, the transmitting of the second image data 406 may cause the client device 214, 216 to display the second image, instead of the first image, using the GUI 618.

Figure 13A:
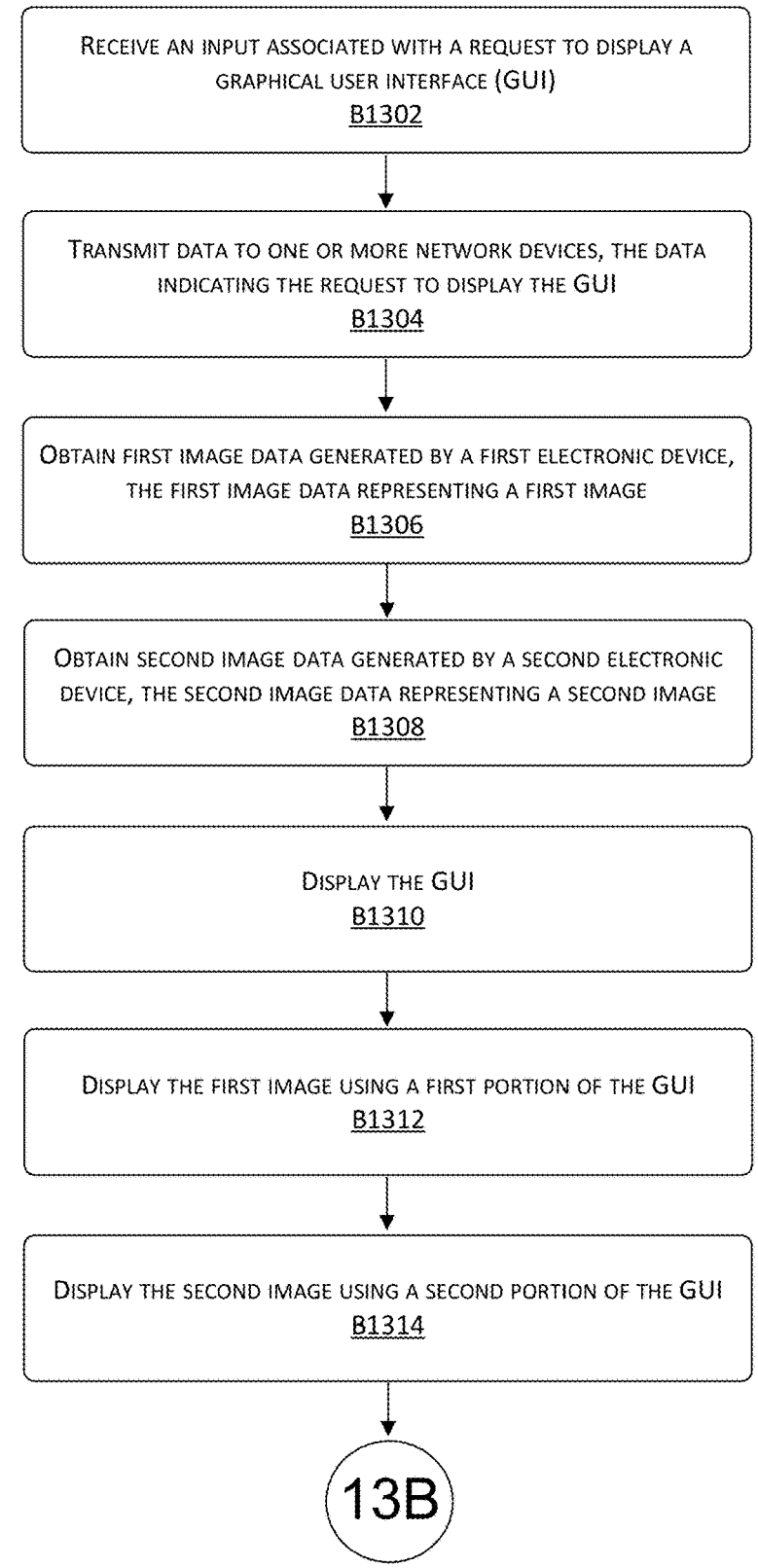
FIGS. 13A-13B are a flowchart illustrating an example process for displaying a GUI that includes content associated with A/V devices, according to various aspects of the present disclosure.
Figure 13B:
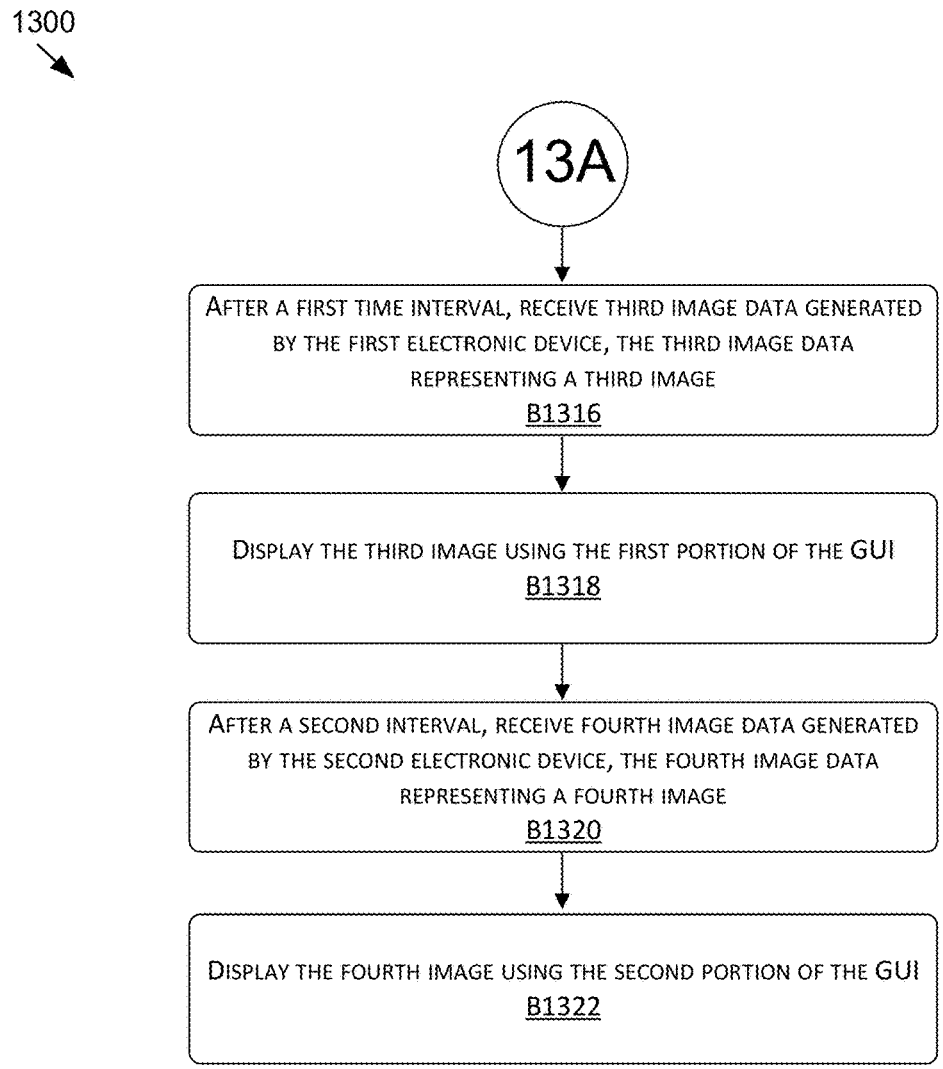

FIGS. 13A-13B are a flowchart illustrating an example process 1300 for displaying a GUI that includes content associated with A/V devices, according to various aspects of the present disclosure. The process 1300, at block B1302, includes receiving an input associated with a request to display a graphical user interface (GUI). For example, the client device 214, 216 may receive an input associated with a request to display a GUI 618. In some instances, receiving the request may include the client device 214, 216 receiving an input associated with opening an application associated with the GUI 618.

The process 1300, at block B1304, includes transmitting data to one or more network devices, the data indicating the request to display the GUI. For example, the client device 214, 216 may transmit display data 514 to the network device(s), wherein the display data 514 indicates the request to display the GUI 618 (and/or indicates that the client device 214, 216 opened the application). In some examples, the client device 214, 216 may transmit the display data 514 in response to the input. In some examples, the client device 214, 216 may transmit the display data 514 in response to displaying the GUI 618.

The process 1300, at block B1306, includes obtaining first image data generated by a first electronic device, the first image data representing a first image. For example, the client device 214, 216 may obtain first image data 406 (and/or first initial data 512) generated by a first A/V device 210, the first image data 406 representing a first image. In some examples, such as when the client device 214, 216 is storing the first image data 406 (and/or the first initial data 512) in the memory 612, the client device 214, 216 may obtain the first image data 406 (and/or the first initial data 512) by retrieving the first image data 406 (and/or the first initial data 512) from the memory 612. In some examples, to obtain the first image data 406 (and/or the first initial data 512), the client device 214, 216 may receive the first image data 406 (and/or the first initial data 512) from the network device(s).

The process 1300, at block B1308, includes obtaining second image data generated by a second electronic device, the second image data representing a second image. For example, the client device 214, 216 may obtain second image data 406 (and/or second initial data 512) generated by a second A/V device 210, the second image data 406 representing a second image. In some examples, such as when the client device 214, 216 is storing the second image data 406 (and/or the second initial data 512) in the memory 612, the client device 214, 216 may obtain the second image data 406 (and/or the second initial data 512) by retrieving the second image data 406 (and/or the second initial data 512) from the memory 612. In some examples, to obtain the second image data 406 (and/or the second initial data 512), the client device 214, 216 may receive the second image data 406 (and/or the second initial data 512) from the network device(s).

The process 1300, at block B1310, includes displaying the GUI. For example, the client device 214, 216 may display the GUI 618 using the display 616. The GUI 618 may include a first portion 620 (e.g., first tile) associated with the first A/V device 210. For example, the first portion 620 may be configured to display content associated with the first A/V device 210. The GUI 618 may further include a second portion 620 (e.g., a second tile) associated with the second A/V device 210. For example, the second portion 620 may be configured to display content associated with the second A/V device 210. In some examples, the GUI 618 may further include interface element(s) 624.

The process 1300, at block B1312, includes displaying the first image using a first portion of the GUI. For example, the client device 214, 216 may display the first image using the first portion 620 of the GUI 624. In some examples, the client device 214, 216 may further display, using the first portion 620 of the GUI 618, an identity of the first A/V device 210, an indication of when the first image data 406 was generated by the first A/V device 210, an indication of a number of events captured by the first A/V device 210, an indication of (e.g., a graphical element indicating) a battery level associated with the first A/V device 210 (e.g., if the first A/V device 210 includes a battery 342), an indication of (e.g., a graphical element indicating) whether lights 304 of the first A/V device 210 are activated (e.g., if the first A/V device 210 includes the lights 304), an indication of (e.g., a graphical element indicating) whether the first A/V device 210 is operating in a mode in which notifications are deactivated (e.g., a snooze mode), and/or the like.

The process 1300, at block B1314, includes displaying the second image using a second portion of the GUI. For example, the client device 214, 216 may display the second image using the second portion 620 of the GUI 624. In some examples, the client device 214, 216 may further display, using the second portion 620 of the GUI 618, an identity of the second A/V device 210, an indication of when the second image data 406 was generated by the second A/V device 210, an indication of a number of events captured by the second A/V device 210, an indication of (e.g., a graphical element indicating) a battery level associated with the second A/V device 210 (e.g., if the second A/V device 210 includes a battery 342), an indication of (e.g., a graphical element indicating) whether lights 304 of the second A/V device 210 are activated (e.g., if the second A/V device 210 includes the lights 304), an indication of (e.g., a graphical element indicating) whether the second A/V device 210 is operating in a mode in which notifications are deactivated (e.g., a snooze mode), and/or the like.

The process 1300, at block B1316, includes, after a first time interval, receiving third image data generated by the first electronic device, the third image data representing a third image. For example, the client device 214, 216 may receive, after a first time interval 520, third image data 406 generated by the first A/V device 210, where the third image data 406 represents a third image. In some examples, the client device 214, 216 may receive the third image data 406 from the network device(s). In some examples, the client device 214, 216 may receive the third image data 406 in response to transmitting time interval data 524 to the network device(s), where the time interval data 524 indicates the elapse of the first time interval 520. Additionally, or alternatively, in some examples, the client device 214, 216 may receive the third image data 406 in response to transmitting display data 514 to the network device(s), where the display data 514 indicates that the client device 214, 216 is still displaying the GUI 618 (and/or indicates that the application is still open on the client device 214, 216).

The process 1300, at block B1318, includes displaying the third image using the first portion of the GUI. For example, the client device 214, 216 may display the third image, instead of the first image, using the first portion 620 of the GUI 618. In some examples, the client device 214, 216 may further display, within the first portion 620, an indication of when the third image data 406 was generated by the first A/V device 210.

The process 1300, at block B1320, includes, after a second time interval, receiving fourth image data generated by the second electronic device, the fourth image data representing a fourth image. For example, the client device 214, 216 may receive, after a second time interval 520, fourth image data 406 generated by the second A/V device 210, where the fourth image data 406 represents a fourth image. In some examples, the client device 214, 216 may receive the fourth image data 406 from the network device (s). In some examples, the client device 214, 216 may receive the fourth image data 406 in response to transmitting time interval data 524 to the network device(s), where the time interval data 524 indicates the elapse of the second time interval 520. Additionally, or alternatively, in some examples, the client device 214, 216 may receive the fourth image data 406 in response to transmitting display data 514 to the network device(s), where the display data 514 indicates that the client device 214, 216 is still displaying the GUI 618.

The process 1300, at block B1322, includes displaying the fourth image using the second portion of the GUI. For example, the client device 214, 216 may display the fourth image, instead of the second image, using the second portion 620 of the GUI 618. In some examples, the client device 214, 216 may further display, within the second portion 620, an indication of when the fourth image data 406 was generated by the second A/V device 210.

Figure 14A:
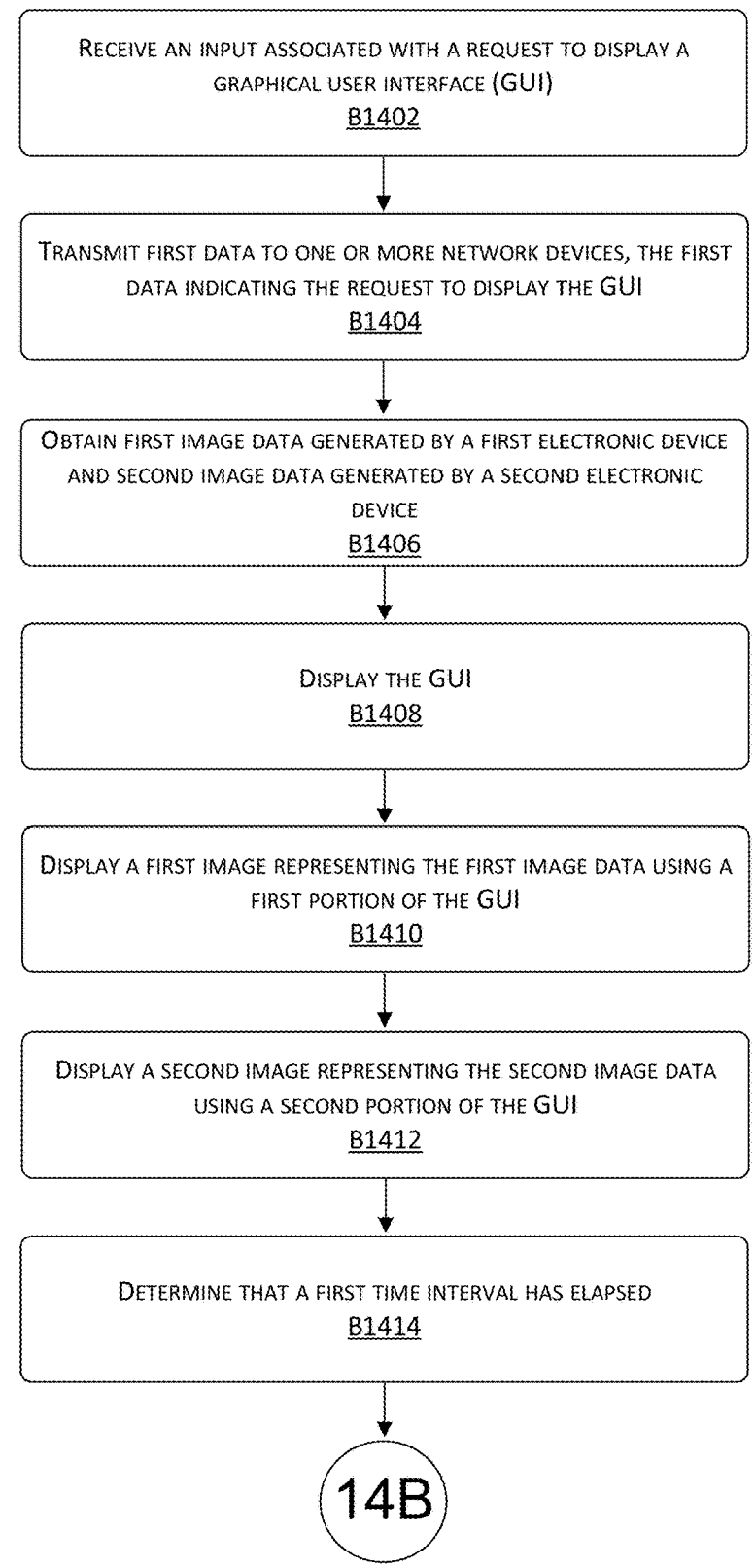
FIGS. 14A-14B are a flowchart illustrating an example process for displaying a GUI that includes content associated with A/V devices, according to various aspects of the present disclosure.
Figure 14B:
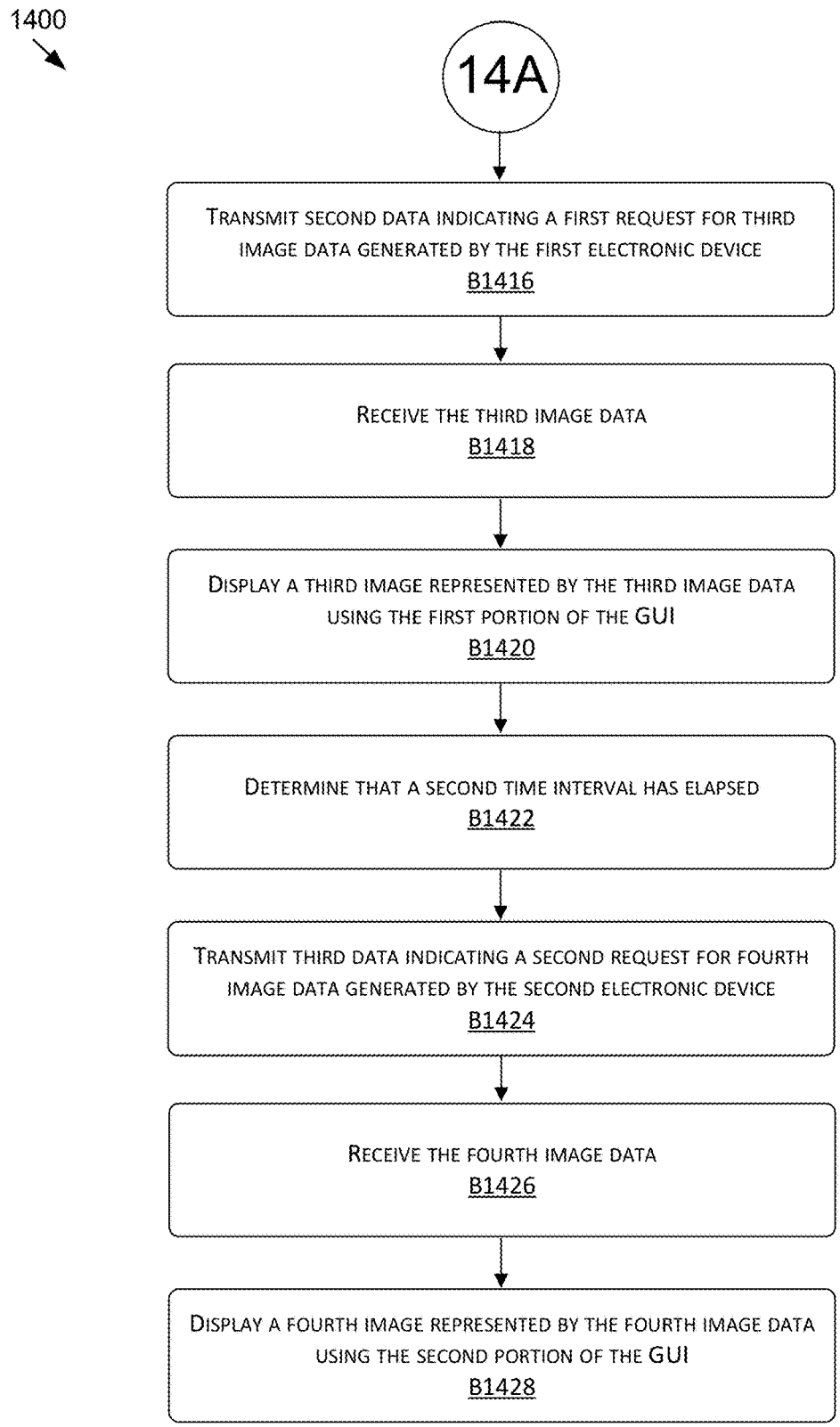

FIGS. 14A-14B are a flowchart illustrating an example process 1400 for displaying a GUI that includes content associated with A/V devices, according to various aspects of the present disclosure. The process 1400, at block B1402, includes receiving an input associated with a request to display a graphical user interface (GUI). For example, the client device 214, 216 may receive an input associated with a request to display a GUI 618.

The process 1400, at block B1404, includes transmitting first data to one or more network devices, the first data indicating the request to display the GUI. For example, the client device 214, 216 may transmit display data 514 to the network device(s), wherein the display data 514 indicates the request to display the GUI 618. In some examples, the client device 214, 216 may transmit the display data 514 in response to the input. In some examples, the client device 214, 216 may transmit the display data 514 in response to displaying the GUI 618.

The process 1400, at block B1406, includes obtaining first image data generated by a first electronic device and second image data generated by a second electronic device. For example, the client device 214, 216 may obtain first image data 406 (and/or first initial data 512) generated by a first A/V device 210 and second image data 406 (and/or second initial data 512) generated by a second A/V device 210. In some examples, such as when the client device 214, 216 is storing the first image data 406 (and/or the first initial data 512) and/or the second image data 406 (and/or second initial data 512) in the memory 612, the client device 214, 216 may obtain the first image data 406 (and/or the first initial data 512) and/or the second image data 406 (and/or second initial data 512) by retrieving the first image data 406 (and/or the first initial data 512) and/or the second image data 406 (and/or second initial data 512) from the memory 612. In some examples, to obtain the first image data 406 (and/or the first initial data 512) and/or the second image data 406 (and/or second initial data 512), the client device 214, 216 may receive the first image data 406 (and/or the first initial data 512) and/or the second image data 406 (and/or second initial data 512) from the network device(s).

The process 1400, at block B1408, includes displaying the GUI. For example, the client device 214, 216 may display the GUI 618 using the display 616. The GUI 618 may include a first portion 620 (e.g., first tile) associated with the first A/V device 210. For example, the first portion 620 may be configured to display content associated with the first A/V device 210. The GUI 618 may further include a second portion 620 (e.g., a second tile) associated with the second A/V device 210. For example, the second portion 620 may be configured to display content associated with the second A/V device 210. In some examples, the GUI 618 may further include interface element(s) 624.

The process 1400, at block B1410, includes displaying a first image representing by the first image data using a first portion of the GUI. For example, the client device 214, 216 may display a first image represented by the first image data 406 using the first portion 620 of the GUI 624. In some examples, the client device 214, 216 may further display, using the first portion 620 of the GUI 618, an identity of the first A/V device 210, an indication of when the first image data 406 was generated by the first A/V device 210, an indication of a number of events captured by the first A/V device 210, an indication of (e.g., a graphical element indicating) a battery level associated with the first A/V device 210 (e.g., if the first A/V device 210 includes a battery 342), an indication of (e.g., a graphical element indicating) whether lights 304 of the first A/V device 210 are activated (e.g., if the first A/V device 210 includes the lights 304), an indication of (e.g., a graphical element indicating) whether the first A/V device 210 is operating in a mode in which notifications are deactivated (e.g., a snooze mode), and/or the like.

The process 1400, at block B1412, includes displaying a second image represented by the second image data using a second portion of the GUI. For example, the client device 214, 216 may display a second image represented by the second image data 406 using the second portion 620 of the GUI 624. In some examples, the client device 214, 216 may further display, using the second portion 620 of the GUI 618, an identity of the second A/V device 210, an indication of when the second image data 406 was generated by the second A/V device 210, an indication of a number of events captured by the second A/V device 210, an indication of (e.g., a graphical element indicating) a battery level associated with the second A/V device 210 (e.g., if the second A/V device 210 includes a battery 342), an indication of (e.g., a graphical element indicating) whether lights 304 of the second A/V device 210 are activated (e.g., if the second A/V device 210 includes the lights 304), an indication of (e.g., a graphical element indicating) whether the second A/V device 210 is operating in a mode in which notifications are deactivated (e.g., a snooze mode), and/or the like.

The process 1400, at block B1414, includes determining that a first time interval has elapsed. For example, the client device 214, 216 may determine that a first time interval 520 has elapsed. In some example, to determine that the first time interval 520 has elapsed, the client device 214, 216 may start a timer 622 when the client device 214, 216 received the input, displayed the GUI 618, and/or displayed the first image. The client device 234, 216 may then determine that the timer 622 reached the first time interval 520.

The process 1400, at block B1416, includes transmitting second data indicating a first request for third image data generated by the first electronic device. For example, based on determining that the first time interval 520 has elapsed, the client device 214, 216 may transmit time interval data 524 to the network device(s), where the time interval data 524 indicates that the first time interval 520 has elapsed and/or indicates a request for third image data 406 generated by the first A/V device 210.

The process 1400, at block B1418, includes receiving the third image data. For example, the client device 214, 216 may receive the third image data 406 generated by the first A/V device 210. In some examples, the client device 214, 216 may receive the third image data 406 from the network device(s). In some examples, the client device 214, 216 may receive the third image data 406 in response to the transmitting of the time interval data 524 to the network device(s).

The process 1400, at block B1420, includes displaying a third image represented by the third image data using the first portion of the GUI. For example, the client device 214, 216 may display the third image, instead of the first image, using the first portion 620 of the GUI 618. In some examples, the client device 214, 216 may further display, within the first portion 620, an indication of a time at which the third image data 406 was generated by the first A/V device 210.

The process 1400, at block B1422, includes determining that a second time interval has elapsed. For example, the client device 214, 216 may determine that a second time interval 520 has elapsed. In some example, to determine that the second time interval 520 has elapsed, the client device 214, 216 may start a timer 622 when the client device 214, 216 received the input, displayed the GUI 618, and/or displayed the second image. The client device 234, 216 may then determine that the timer 622 reached the second time interval 520. In some examples, the first time interval 520 is similar to (e.g., the same as) the second time interval 520. In some examples, the first time interval 520 is different than the second time interval 520.

The process 1400, at block B1424, includes transmitting third data indicating a second request for fourth image data generated by the second electronic device. For example, based on determining that the second time interval 520 has elapsed, the client device 214, 216 may transmit time interval data 524 to the network device(s), where the time interval data 524 indicates that the second time interval 520 has elapsed and/or indicates a request for fourth image data 406 generated by the second A/V device 210.

The process 1400, at block B1426, includes receiving the fourth image data. For example, the client device 214, 216 may receive the fourth image data 406 generated by the second A/V device 210. In some examples, the client device 214, 216 may receive the fourth image data 406 from the network device(s). In some examples, the client device 214, 216 may receive the fourth image data 406 in response to the transmitting of the time interval data 524 to the network device(s).

The process 1400, at block B1428, includes displaying a fourth image represented by the fourth image data using the second portion of the GUI. For example, the client device 214, 216 may display the fourth image, instead of the second image, using the second portion 620 of the GUI 618. In some examples, the client device 214, 216 may further display, within the second portion 620, an indication of when the fourth image data 406 was generated by the second A/V device 210.

Although the above description for the example process 1400 includes the client device 214, 216 communicating with the network device(s) to receive image data 406, in other example, the client device 214, 216 may transmit data including requests for the image data 406 directly to the A/V device(s) 210 and/or receive the image data 406 directly from the A/V device(s) 210.

Figure 15:
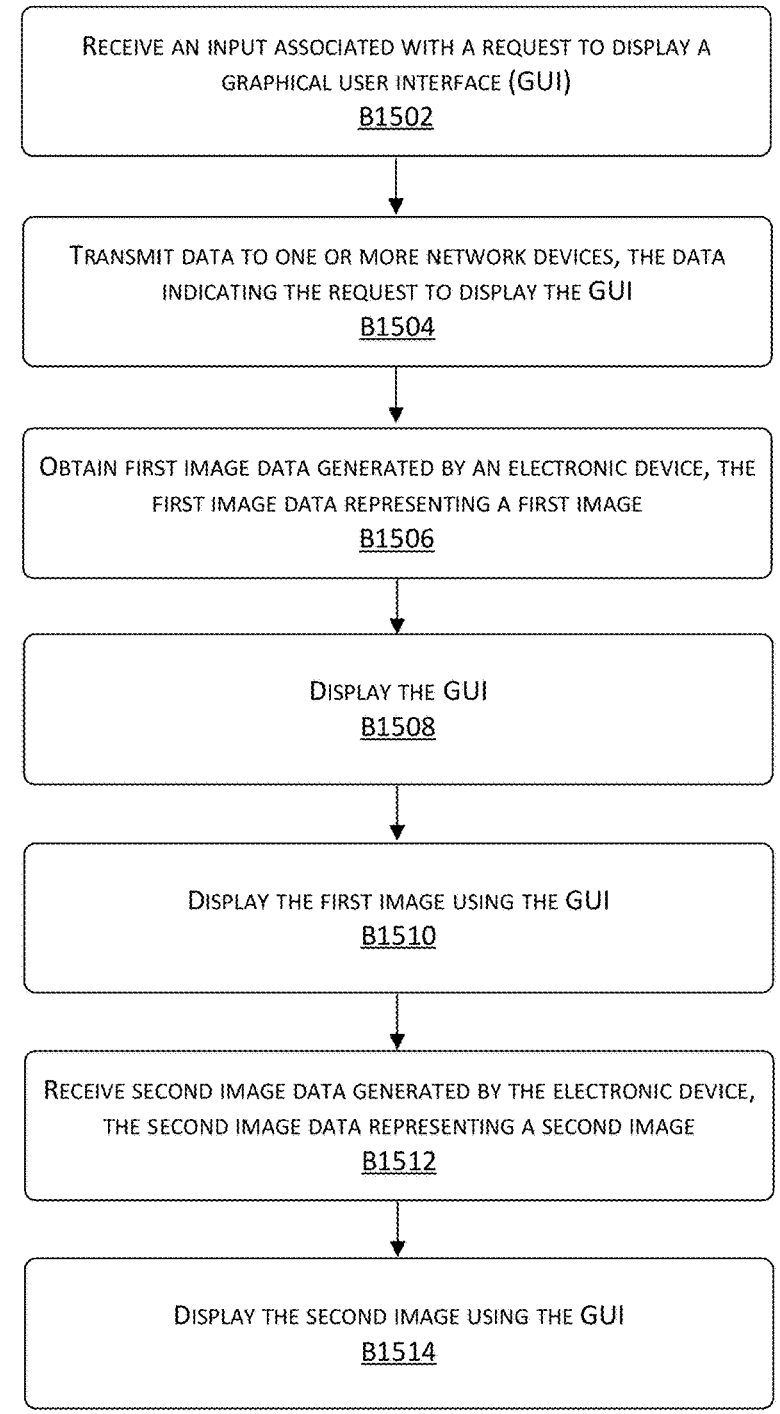
FIG. 15 is a flowchart illustrating an example process for displaying a GUI that includes content associated with at least one A/V device, according to various aspects of the present disclosure.

FIG. 15 is a flowchart illustrating an example process 1500 for displaying a GUI that includes content associated with at least one A/V device, according to various aspects of the present disclosure. The process 1500, at block B1502, includes receiving an input associated with a request to display a graphical user interface (GUI). For example, the client device 214, 216 may receive an input associated with a request to display a GUI 618.

The process 1500, at block B1504, includes transmitting data to one or more network devices, the data indicating the request to display the GUI. For example, the client device 214, 216 may transmit display data 514 to the network device(s), wherein the display data 514 indicates the request to display the GUI 618. In some examples, the client device 214, 216 may transmit the display data 514 in response to the input. In some examples, the client device 214, 216 may transmit the display data 514 in response to displaying the GUI 618.

The process 1500, at block B1506, includes obtaining first image data generated by an electronic device, the first image data representing a first image. For example, the client device 214, 216 may obtain first image data 406 (and/or first initial data 512) generated by an A/V device 210, the first image data 406 representing a first image. In some examples, such as when the client device 214, 216 is storing the first image data 406 (and/or the first initial data 512) in the memory 612, the client device 214, 216 may obtain the first image data 406 (and/or the first initial data 512) by retrieving the first image data 406 (and/or the first initial data 512) from the memory 612. In some examples, to obtain the first image data 406 (and/or the first initial data 512), the client device 214, 216 may receive the first image data 406 (and/or the first initial data 512) from the network device(s).

In some examples, the client device 214, 216 may first receive data (e.g., first initial data 512) indicating a timestamp associated with an image being stored by the network device(s). The client device 214, 216 may then determine, based on the timestamp, whether to request the image and/or a new image generated by the electronic device. For a first example, if the client device 214, 216 determines, based on the timestamp, that the image was generated longer than a threshold period of time ago, then the client device 214, 216 may determine to request a new image generated by the A/V device 210. In such an example, the client device 214, 216 may receive image data 406 (and/or first initial data 512) representing the new image from the network device(s). For a second example, if the client device 214, 216 determines, based on the timestamp, that a locally stored image generated by the A/V device 210 is older than the time stored by the network device(s), then the client device 214, 216 may determine to request the image stored by the network device(s). In such an example, the client device 214, 216 may receive image data 406 (and/or first initial data 512) representing the image from the network device(s).

The process 1500, at block B1508, includes displaying the GUI. For example, the client device 214, 216 may display the GUI 618 using the display 616. The GUI 618 may be configured to display content associated with the A/V device 210. In some examples, the GUI 618 may further include interface element(s) 624.

The process 1500, at block B1510, includes displaying the first image using the GUI. For example, the client device 214, 216 may display the first image using the GUI 624. In some examples, the client device 214, 216 may further display, using the GUI 618, an identity of the A/V device 210, an indication of when the first image data 406 was generated by the A/V device 210, an indication of a number of events captured by the A/V device 210, an indication of (e.g., a graphical element indicating) a battery level associated with the A/V device 210 (e.g., if the A/V device 210 includes a battery 342), an indication of (e.g., a graphical element indicating) whether lights 304 of the A/V device 210 are activated (e.g., if the A/V device 210 includes the lights 304), an indication of (e.g., a graphical element indicating) whether the A/V device 210 is operating in a mode in which notifications are deactivated (e.g., a snooze mode), and/or the like.

The process 1500, at block B1512, includes, receiving second image data generated by the electronic device, the second image data representing a second image. For example, the client device 214, 216 may receive second image data 406 generated by the A/V device 210, where the second image data 406 represents a second image. In some examples, the client device 214, 216 may receive the second image data 406 at the elapse of a time interval 520 after the client device 214, 216 displayed the GUI 618 and/or displayed the first image. In some examples, the client device 214, 216 may receive the second image data 406 from the network device(s). In some examples, the client device 214, 216 may receive the second image data 406 in response to transmitting time interval data 524 to the network device(s), where the time interval data 524 indicates the elapse of the time interval 520. Additionally, or alternatively, in some examples, the client device 214, 216 may receive the second image data 406 in response to transmitting display data 514 to the network device(s), where the display data 514 indicates that the client device 214, 216 is still displaying the GUI 618.

The process 1500, at block B1514, includes displaying the second image using the GUI. For example, the client device 214, 216 may display the second image, instead of the first image, using the GUI. In some examples, the client device 214, 216 may further display, using the GUI 618, an indication of when the second image data 406 was generated by the A/V device 210.

Figure 16A:
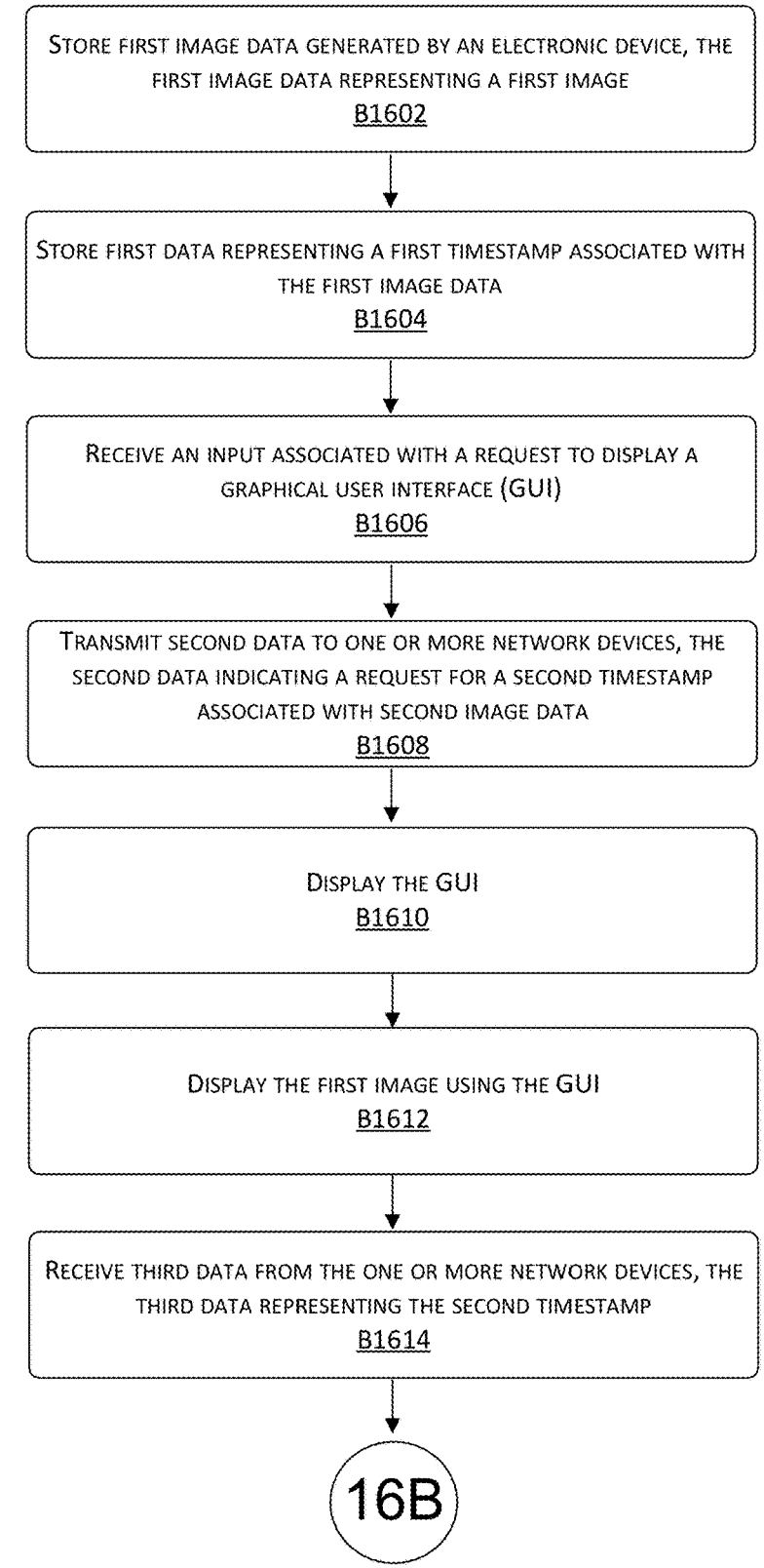
FIGS. 16A-16B are a flowchart illustrating an example process for updating content of a GUI based on timestamps, according to various aspects of the present disclosure.
Figure 16B:
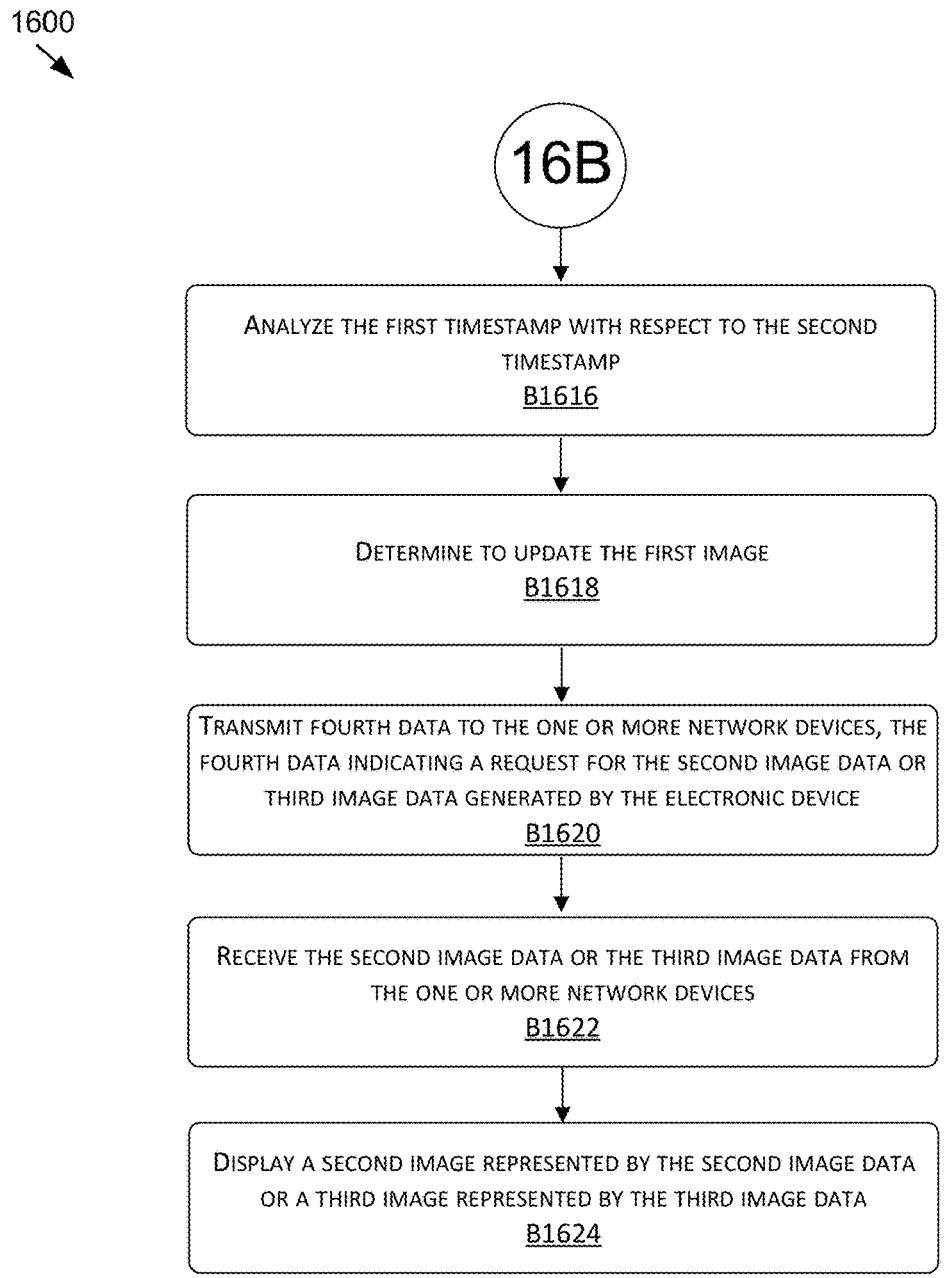
Figure 17A:
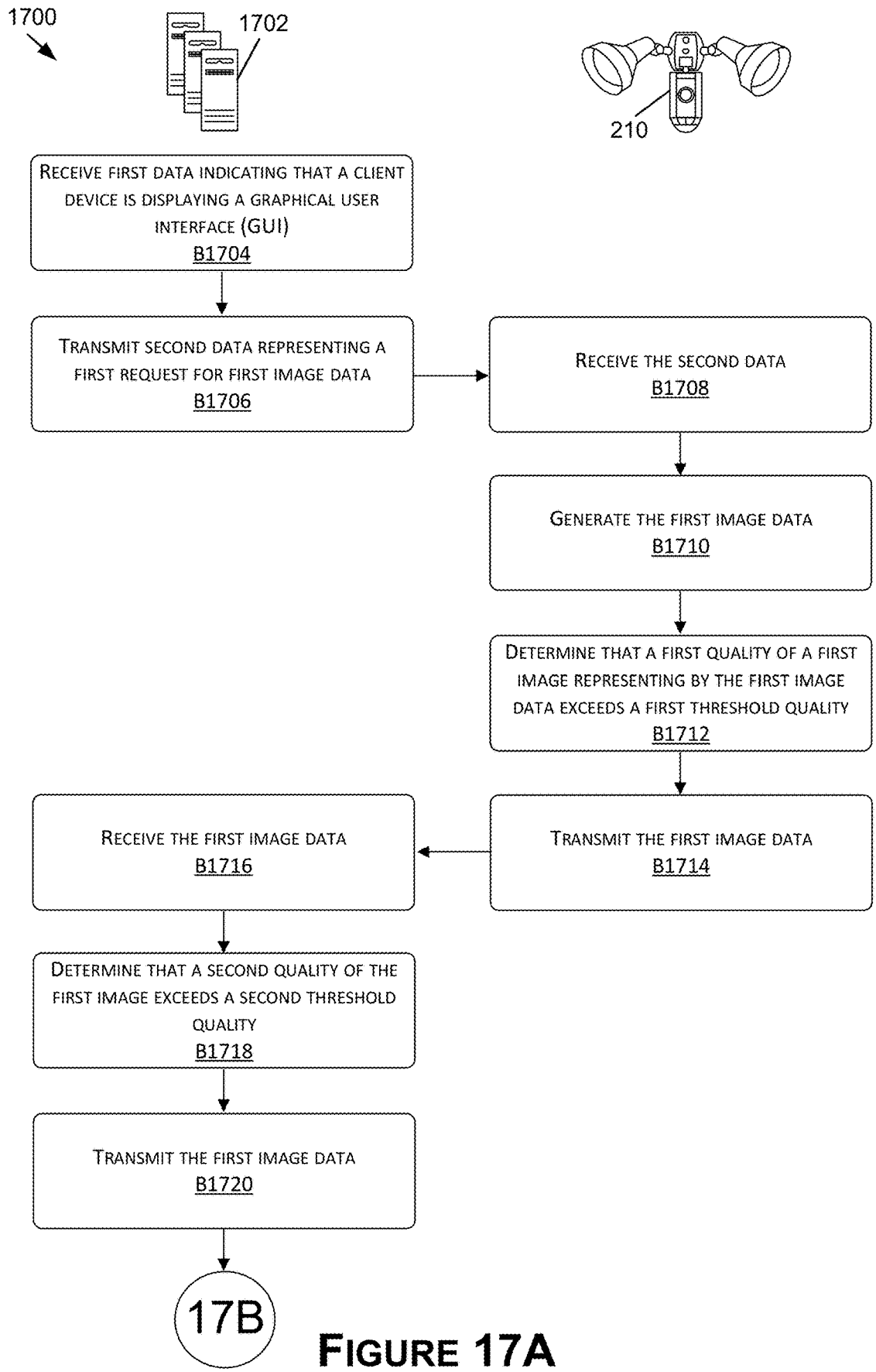
FIGS. 17A-17B are a flowchart illustrating an example process that a system may perform in order to provide content that is displayed by a client device using a graphical user interface, according to various aspects of the present disclosure.
Figure 17B:
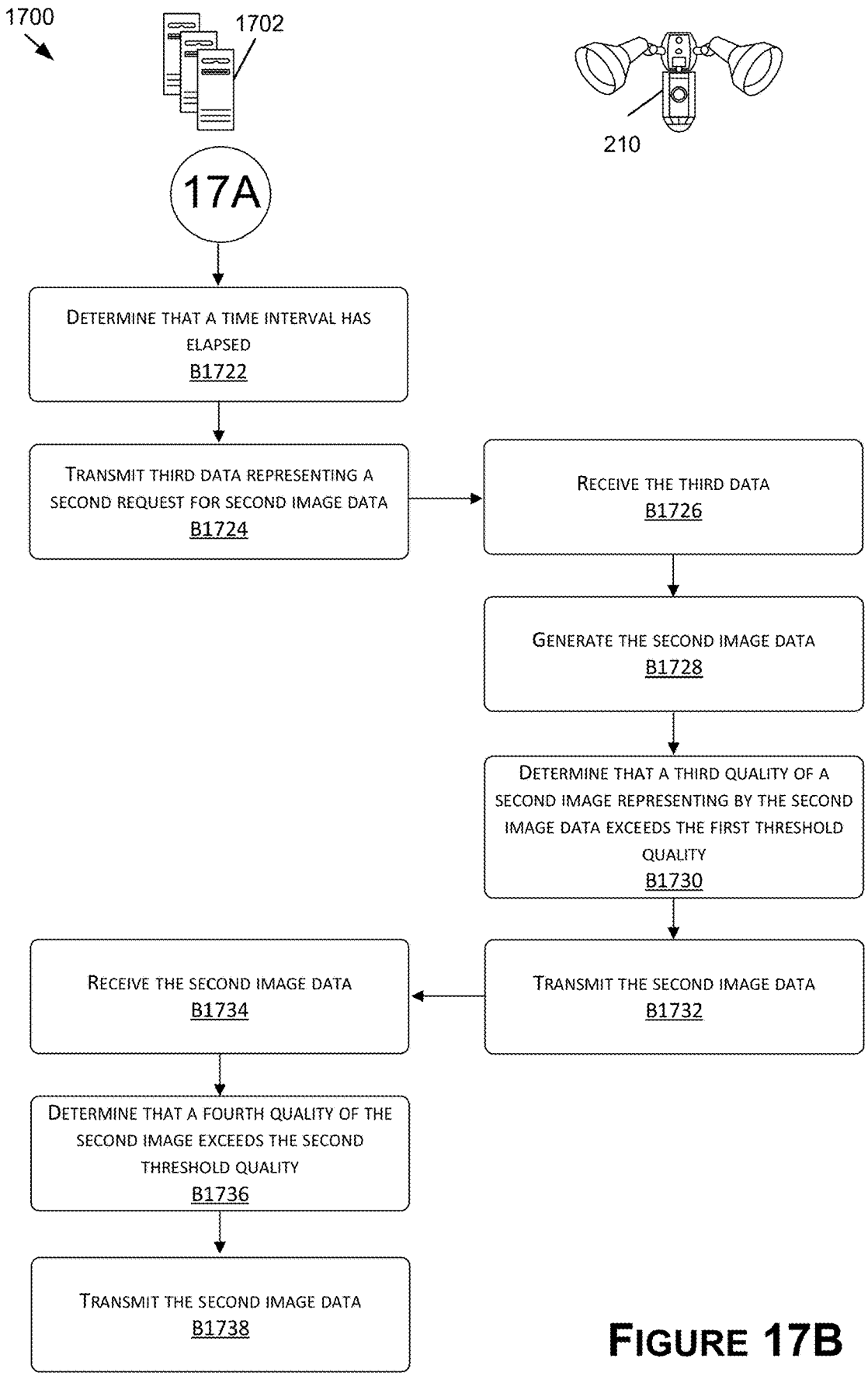

FIGS. 16A-16B are a flowchart illustrating an example process 1600 for updating content of a GUI based on timestamps, according to various aspects of the present disclosure. For example, the process 1600, at block B1602, includes first image data generated by an electronic device, the first image data representing a first image. For example, the client device 214, 216 may store first image data 406 generated by the A/V device 210, the first image data 406 representing a first image.

The process 1600, at block B1604, includes storing first data representing a first timestamp associated with the first image data. For example, the client device 214, 216 may store initial data 512 representing a first timestamp associated with the first image data 406. The first timestamp may indicate a first time at which the A/V device 210 generated by the first image data 406.

The process 1600, at block B1606, includes receiving an input associated with a request to display a graphical user interface (GUI). For example, the client device 214, 216 may receive an input associated with a request to display a GUI 618.

The process 1600, at block B1608, includes transmitting second data to one or more network devices, the second data indicating a request for a second timestamp associated with second image data. For example, based on the input, the client device 214, 216 may transmit request data 420 to the network device(s), where the request data 420 indicates a request for a second timestamp associated with second image data 406. The second timestamp may indicate a second time at which the A/V device 210 generated the second image data 406.

The process 1600, at block B1610, includes displaying the GUI. For example, the client device 214, 216 may display the GUI 618 using the display 616. The GUI 618 may be configured to display content associated with the A/V device 210. In some examples, the GUI 618 may further include interface element(s) 624.

The process 1600, at block B1612, includes displaying the first image using the GUI. For example, the client device 214, 216 may display the first image using the GUI 624. In some examples, the client device 214, 216 may further display, using the GUI 618, an identity of the A/V device 210, an indication of when the first image data 406 was generated by the A/V device 210 (e.g., the first timestamp), an indication of a number of events captured by the A/V device 210, an indication of (e.g., a graphical element indicating) a battery level associated with the A/V device 210 (e.g., if the A/V device 210 includes a battery 342), an indication of (e.g., a graphical element indicating) whether lights 304 of the A/V device 210 are activated (e.g., if the A/V device 210 includes the lights 304), an indication of (e.g., a graphical element indicating) whether the A/V device 210 is operating in a mode in which notifications are deactivated (e.g., a snooze mode), and/or the like.

The process 1600, at block B1614, includes receiving third data from the one or more network device, the third data representing the second timestamp. For example, the client device 214, 216 may receive updated data 426 from the network device(s), the updated data 426 representing the second timestamp.

The process 1600, at block 1616, includes analyzing the first timestamp with respect to the second timestamp. For example, the client device 214, 216 may analyze the first timestamp with respect to the second timestamp. In some examples, the analyzing may include comparing the first timestamp to the second timestamp. For a first example, the client device 214, 216 may determine a time difference between the first time indicated by the first timestamp and the second time indicated by the second timestamp. The client device 214, 216 may then determine whether the time difference exceeds a threshold time difference (e.g., five seconds, thirty seconds, one minute, etc.). In some examples, the client device 214, 216 performs such an analysis when the A/V device 210 is powered using an external power source. For a second example, the client device 214, 216 may determine whether the second time indicated by the second timestamp is later than the first time indicated by the first timestamp. In some examples, the client device 214, 216 may perform such an analysis when the client device 214, 216 is powered using the battery 347.

In other examples, the client device 214, 216 may not transmit the request for the second timestamp and/or receive the second timestamp. In such examples, the client device 214, 216 may use the first timestamp to determine whether to update the first image. For a first example, the client device 214, 216 may compare first time indicated by the first timestamp to one of the time(s) indicated by the settings 428. Based on the comparison, the client device 214, 216 may determine if the A/V device 210 has generated new image data 406 since the A/V device 210 generated the first image data 406. For example, the client device 214, 216 may determine that the A/V device 210 generated the new image data 406 based on the first time being earlier than a time indicated by the settings 428, where the time indicated by the settings 428 is earlier than a current time. For a second example, the client device 214, 216 may analyze first time indicated by the first timestamp to determine if a time difference between a current time and the first time. The client device 214, 216 may then determine if the time difference exceeds the threshold time difference.

The process 1600, at block B1618, includes determining to update the first image. For example, the client device 214, 216 may determine to update the first image based on the analysis. For a first example, the client device 214, 216 may determine to update the first image based on the time difference between the first time indicated by the first timestamp and the second time indicated by the second timestamp exceeding the threshold time difference. In some examples, if a time difference between a current time and the second time indicated by second timestamp is within the threshold time difference, then the client device 214, 216 may determine to update the first image using the second image data. However, in other examples, if the time difference exceeds the threshold time difference, then the client device 214, 216 may determine to update the first image using third image data generated by the A/V device 210. For a second example, the client device 214, 216 may determine to update the first image based on the second time indicated by the second timestamp being later than the first time indicated by the first timestamp. In some examples, if the second time indicated by the second timestamp is before the a time indicated by the settings 428, where the time indicated by the settings 428 is earlier than a current time, then the client device 214, 216 may determine to update the first image using third image data generated by the A/V device 210. However, if the second time indicated by the second timestamp is after the time indicated by the settings 428, then the client device 214, 216 may determine to update the first image using the second image data.

For a third example, the client device 214, 216 may determine to update the first image based on the A/V device 210 generating new image data 406 after the A/V device 210 generated the first image data 406. The new image data 406 may include the second image data 406 stored by the network device(s) and/or the third image data. Still, for a fourth example, the client device 214, 216 may determine to update the first image based on the time difference between the first time indicated by the first timestamp and the current time exceeding the threshold time difference.

The process 1600, at block B1620, includes transmitting fourth data to the one or more network device, the fourth data indicating a request for the second image data or third image data generated by the electronic device. For example, the client device 214, 216 may transmit request data 420 to the network device(s), where the request data 420 includes a request for the second image data 406 or the third image data 406 generated by the A/V device 210.

The process 1600, at block B1622, includes receiving the second image data from the network device(s). For example, the client device 214, 216 may receive the second image data 406 or the third image data 406 from the network device(s).

The process 1600, at block B1624, includes displaying a second image represented by the second image data or a third image represented by the third image data. For example, the client device 214, 216 may display a second image representing by the second image data 406 or a third image represented by the third image data. In some examples, the client device 214, 216 displays the second image or the third image by replacing the first image with the second image or the third image.

FIGS. 16A-16B are a flowchart illustrating an example process 1700 that a system may perform in order to provide content that is displayed by a client device using a graphical user interface, according to various aspects of the present disclosure. In some examples, the blocks on the left may be performed by network device(s) 1702 (e.g., the server(s) 224, the hub device 202, the VA device 208, etc.) and the blocks on the right may be performed by an A/V device 210. The process 1700, at block B1704, includes receiving first data indicating that a client device is displaying a graphical user interface (GUI). For example, the network device(s) 1702 may receive display data 514 indicating that the client device 214, 216 is displaying a GUI 618.

The process 1700, at block B1706, includes transmitting second data representing a first request for first image data. For example, the network device(s) 1702 may transmit request data 420 to the A/V device 210, where the request data 420 includes a first request for first image data 406. In some examples, the network device(s) 1702 transmit the request data 420 in response to receiving the display data 514.

The process 1700, at block B1708, includes receiving the second data. For example, the A/V device 210 may receive the request data 514 from the network device(s) 1702.

The process 1700, at block B1710, includes generating the first image data. For example, the A/V device 210 may generate the first image data 406. In some examples, the A/V device 210 generates the first image data 406 in response to receiving the request data 420.

The process 1700, at block B1712, includes determining that a first quality of a first image represented by the first image data exceeds a first threshold quality. For example, the A/V device 210 may analyze the first image data 406 to determine an image quality 422 associated with the first image. In some examples, the A/V device 210 may determine the image quality 422 based on one or more characteristics associated with the first image, such as, but not limited to, sharpness, noise, dynamic range, tone reproduction, contrast, color accuracy, distortion, vignetting, exposure accuracy, lateral chromatic aberration, lens flare, color moire, and/or artifacts. The A/V device 210 may then determine that the image quality 522 exceeds a threshold quality 424.

The process 1700, at block B1714, includes transmitting the first image data. For example, the A/V device 210 may transmit the first image data 406 to the network device(s) 1702. In some examples, the A/V device 210 transmits the first image data 406 based on determining that the image quality 522 exceeds the threshold quality 424.

The process 1700, at block B1716, includes receiving the first image data. For example, the network device(s) 1702 may receive the first image data 406 from the A/V device 210.

The process 1700, at block B1718, includes determining that a second quality of the first image exceeds a second threshold quality. For example, the network device(s) 1702 may analyze the first image data 406 to determine an image quality 516 associated with the first image. In some examples, the A/V device 210 may determine the image quality 516 based on one or more characteristics associated with the first image, such as, but not limited to, sharpness, noise, dynamic range, tone reproduction, contrast, color accuracy, distortion, vignetting, exposure accuracy, lateral chromatic aberration, lens flare, color moire, and/or artifacts.

The network device(s) 1702 may then determine that the image quality 516 exceeds a threshold quality 518.

The process 1700, at block B1720, includes transmitting the first image data. For example, the network device(s) 1702 may transmit the first image data 406 to the client device 214, 216. In some examples, the network device(s) 1702 transmit the first image data 406 based on determining that the image quality 516 exceeds the threshold quality 518.

The process 1700, at block B1722, includes determining that a time interval has elapsed. For example, the network device(s) 1702 may determine that a time interval 520 has elapsed since the transmitting of the first image data 406. In some examples, the network device(s) 1702 make the determination based on a timer 522 reaching the time interval 520. In some examples, the network device(s) 1702 make the determination based on receiving time interval data 524 from the client device 214, 216, where the time interval data 524 indicates that the time interval 520 elapsed.

The process 1700, at block B1724, includes transmitting third data representing a second request for second image data. For example, the network device(s) 1702 may transmit request data 420 to the A/V device 210, where the request data 420 includes a second request for second image data 406. In some examples, the network device(s) 1702 transmit the request data 420 in response to determining that the time interval 520 elapsed.

The process 1700, at block B1726, includes receiving the third data. For example, the A/V device 210 may receive the request data 514 from the network device(s) 1702.

The process 1700, at block B1728, includes generating the second image data. For example, the A/V device 210 may generate the second image data 406. In some examples, the A/V device 210 generates the second image data 406 in response to receiving the request data 420.

The process 1700, at block B1730, includes determining that a third quality of a second image represented by the second image data exceeds the first threshold quality. For example, the A/V device 210 may analyze the second image data 406 to determine an image quality 422 associated with the second image. In some examples, the A/V device 210 may determine the image quality 422 based on one or more characteristics associated with the second image, such as, but not limited to, sharpness, noise, dynamic range, tone reproduction, contrast, color accuracy, distortion, vignetting, exposure accuracy, lateral chromatic aberration, lens flare, color moire, and/or artifacts. The A/V device 210 may then determine that the image quality 522 exceeds the threshold quality 424.

The process 1700, at block B1732, includes transmitting the second image data. For example, the A/V device 210 may transmit the second image data 406 to the network device(s) 1702. In some examples, the A/V device 210 transmits the second image data 406 based on determining that the image quality 522 exceeds the threshold quality 424.

The process 1700, at block B1734, includes receiving the second image data. For example, the network device(s) 1702 may receive the second image data 406 from the A/V device 210.

The process 1700, at block B1736, includes determining that a fourth quality of the second image exceeds the second threshold quality. For example, the network device(s) 1702 may analyze the second image data 406 to determine an image quality 516 associated with the second image. In some examples, the A/V device 210 may determine the image quality 516 based on one or more characteristics associated with the second image, such as, but not limited to, sharpness, noise, dynamic range, tone reproduction, contrast, color accuracy, distortion, vignetting, exposure accuracy, lateral chromatic aberration, lens flare, color moire, and/or artifacts. The network device(s) 1702 may then determine that the image quality 516 exceeds the threshold quality 518.

The process 1700, at block B1738, includes transmitting the second image data. For example, the network device(s) 1702 may transmit the second image data 406 to the client device 214, 216. In some examples, the network device(s) 1702 transmit the second image data 406 based on determining that the image quality 516 exceeds the threshold quality 518.

In some examples, the network device(s) 1702 and the A/V device 210 may continue to perform blocks B1722-B1738 while the client device 214, 216 is displaying the GUI 618. In such examples, the client device 214, 216 may continue to update the image being displayed using the GUI 618 each time the time interval 520 elapses. In some examples, the process 1700 may not include one or more of blocks B1712, B1718, B1730, and B1736.

The processes described herein allow the client device 214, 216 to display a GUI 618 that includes content associated with A/V device(s) 210, where the content is updated at the elapse of time interval(s) 520. For example, image(s) represented by image data 406 that is generated by the A/V device(s) 210 may be updated at the elapse of the time interval(s) 520. A user associated with the A/V device(s) 210 may then use the image(s) to monitor the A/V device(s) 210. By updating the content at the elapse of the time interval(s) 520, the client device 214, 216 is able to provide a user with updated content (e.g., image(s)) even if a network connectivity of the client device 214, 216 includes a low data rate. Additionally, if at least one A/V device 210 is powered using a battery 342, the battery 342 of the A/V device 210 will last for a longer duration since the A/V device 210 may generate and/or transmit data (e.g., image data 406) each time a time interval 520 elapses, but not continuously.

Figure 18:
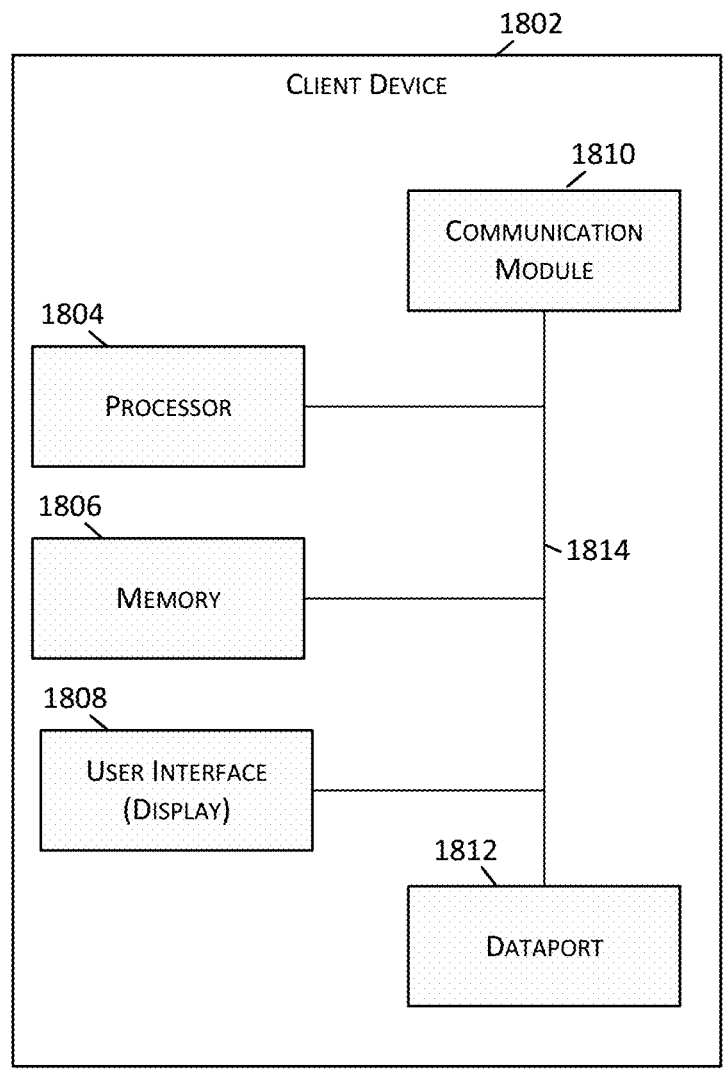
FIG. 18 is a functional block diagram of a client device on which the present embodiments may be implemented according to various aspects of the present disclosure.

FIG. 18 is a functional block diagram of a client device 1802 on which the present embodiments may be implemented according to various aspects of the present disclosure. The client device(s) 214, 216 described with reference to FIG. 2 may include some or all of the components and/or functionality of the client device 1802. The client device 1802 may comprise, for example, a smartphone.

With reference to FIG. 18, the client device 1802 includes a processor 1804, a memory 1806, a user interface 1808, a communication module 1810, and a dataport 1812. These components are communicatively coupled together by an interconnect bus 1814. The processor 1804 may include any processor used in smartphones and/or portable computing devices, such as an ARM processor (a processor based on the RISC (reduced instruction set computer) architecture developed by Advanced RISC Machines (ARM). In some embodiments, the processor 2004 may include one or more other processors, such as one or more conventional microprocessors, and/or one or more supplementary co-processors, such as math co-processors.

The memory 1806 may include both operating memory, such as random-access memory (RAM), as well as data storage, such as read-only memory (ROM), hard drives, flash memory, or any other suitable memory/storage element. The memory 1806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1804 and the memory 1806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1804 may be connected to the memory 1806 via the dataport 1812.

The user interface 1808 may include any user interface or presentation elements suitable for a smartphone and/or a portable computing device, such as a keypad, a display screen, a touchscreen, a microphone, and a speaker. The communication module 1810 is configured to handle communication links between the client device 1802 and other, external devices or receivers, and to route incoming/outgoing data appropriately. For example, inbound data from the dataport 1812 may be routed through the communication module 1810 before being directed to the processor 1804, and outbound data from the processor 1804 may be routed through the communication module 1810 before being directed to the dataport 1812. The communication module 1810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1812 may be any type of connector used for physically interfacing with a smartphone and/or a portable computing device, such as a mini-USB port or an IPHONE®/IPOD® 30-pin connector or LIGHTNING® connector. In other embodiments, the dataport 1812 may include multiple communication channels for simultaneous communication with, for example, other processors, servers, and/or client terminals.

The memory 1806 may store instructions for communicating with other systems, such as a computer. The memory 1806 may store, for example, a program (e.g., computer program code) adapted to direct the processor 1804 in accordance with the present embodiments. The instructions also may include program elements, such as an operating system. While execution of sequences of instructions in the program causes the processor 1804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
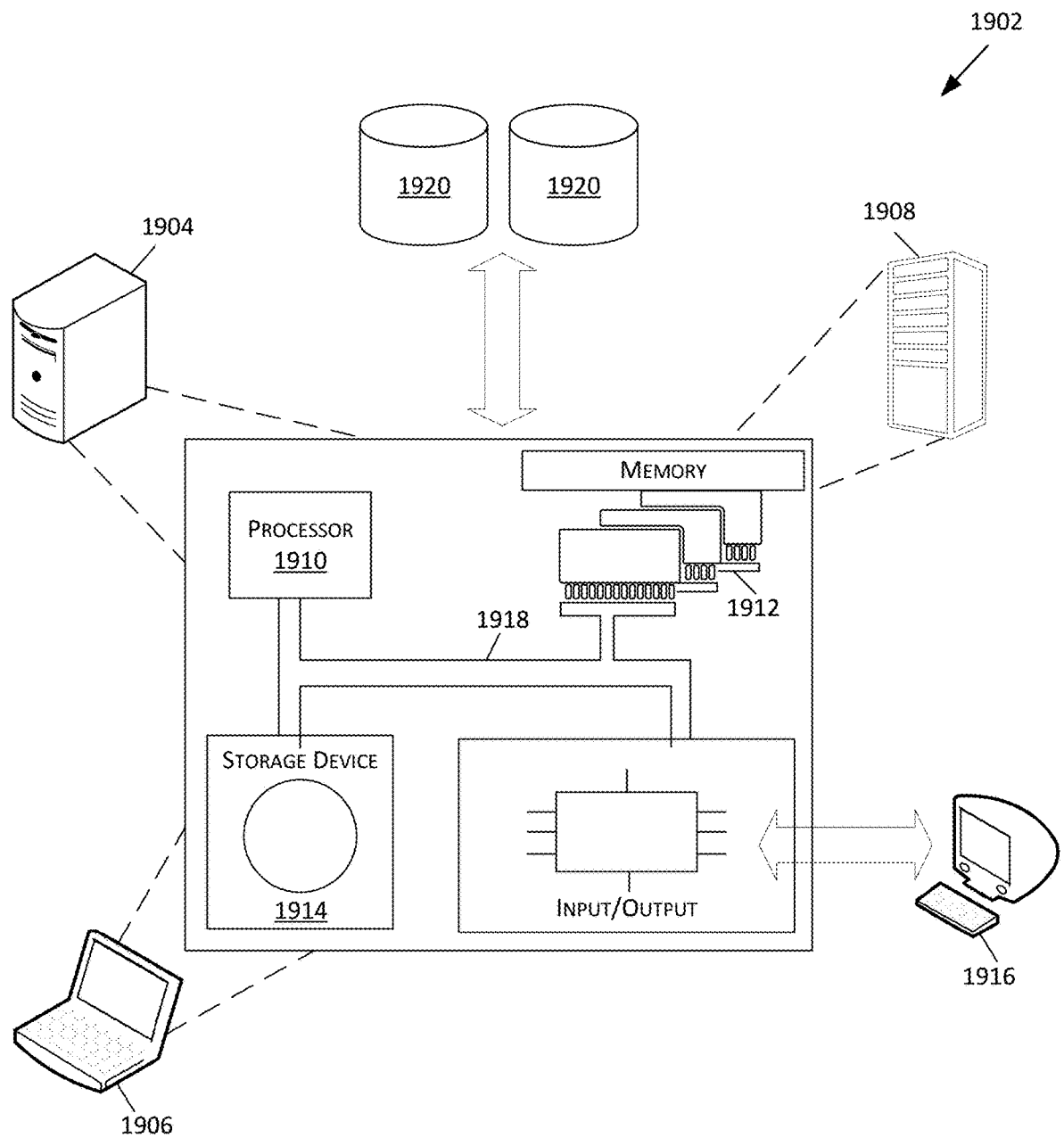
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of the present disclosure. The computer system 1902 may be embodied in at least one of a personal computer (also referred to as a desktop computer) 1904, a portable computer (also referred to as a laptop or notebook computer) 1906, and/or a server 1908 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1902 may execute at least some of the operations described above. The computer system 1902 may include at least one processor 1910, memory 1912, at least one storage device 1914, and input/output (I/O) devices 1916. Some or all of the components 1910, 1912, 1914, 1916 may be interconnected via a system bus 1918. The processor 1910 may be single- or multi-threaded and may have one or more cores. The processor 1910 execute instructions, such as those stored in the memory 1912 and/or in the storage device 1914. Information may be received and output using one or more I/O devices 1916.

The memory 1912 may store information, and may be a computer-readable medium, such as volatile or non-volatile memory. The storage device(s) 1914 may provide storage for the system 1902 and, in some embodiments, may be a computer-readable medium. In various aspects, the storage device(s) 1914 may be a flash memory device, a hard disk device, an optical disk device, a tape device, or any other type of storage device.

The I/O devices 1916 may provide input/output operations for the system 1902. The I/O devices 1916 may include a keyboard, a pointing device, and/or a microphone. The I/O devices 1916 may further include a display unit for displaying graphical user interfaces, a speaker, and/or a printer. External data may be stored in one or more accessible external databases 1920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method comprises: storing first image data generated by a first audio/video (A/V) device, the first image data representing a first image; storing second image data generated by a second A/V device, the second image data representing a second image; receiving, using the network device, first data from a client device, the first data indicating that the client device is displaying a dashboard associated with an application; based at least in part on the first data, transmitting the first image data and the second image data to the client device; receiving, using the network device and after a first time interval has elapsed since the transmitting of the first image data, second data from the client device, the second data indicating that the client device is still displaying the dashboard associated with the application; based at least in part on the second data, transmitting third data to the first A/V device, the third data indicating a first request for third image data representing a third image; receiving the third image data from the first A/V device; transmitting the third image data to the client device such that the client device displays the third image, instead of the first image, using the dashboard; receiving, using the network device and after a second time interval has elapsed since the transmitting of the second image data, fourth data from the client device, the fourth data indicating that the client device is still displaying the dashboard associated with the application; based at least in part on the fourth data, transmitting fifth data to the second A/V device, the fifth data indicating a second request for fourth image data representing a fourth image; receiving the fourth image data from the second A/V device; and transmitting the fourth image data to the client device such that the client device displays the fourth image, instead of the second image, using the dashboard.

In an embodiment of the first aspect, the transmitting of the first image data and the second image data causes the client device to display the first image using a first portion of the dashboard and display the second image using a second portion of the dashboard; the transmitting of the third image data causes the client device to display the third image, instead of the first image, using the first portion of the dashboard; and the transmitting fourth image data causes the client device to display the fourth image, instead of the second image, using the second portion of the dashboard.

In another embodiment of the first aspect, the transmitting of the first image data and the second image data causes the client device to display the first image using a first tile of the dashboard and display the second image using a second tile of the dashboard; the transmitting of the third image data causes the client device to display the third image, instead of the first image, using the first tile of the dashboard; and the transmitting fourth image data causes the client device to display the fourth image, instead of the second image, using the second tile of the dashboard.

In another embodiment of the first aspect, the method further comprises: generating sixth data indicating a first time at which the first image data was generated and a second time at which the second image data was generated; and transmitting the sixth data to the client device such that the client device displays a first indication of the first time and a second indication of the second time.

In another embodiment of the first aspect, the method further comprises: determining that the client device is no longer displaying the GUI; storing the third image data generated by the first A/V device; storing sixth data indicating a first time at which the third image data was generated by the first A/V device; storing the fourth image data generated by the second A/V device; and storing seventh data indicating a second time at which the fourth image data was generated by the second A/V device.

In another embodiment of the first aspect, the method further comprises: receiving sixth data indicating a battery level of the first A/V device; determining that the battery level is below a threshold battery level; generating sixth data indicating that the battery level for the first A/V device is below the threshold battery level; and transmitting the sixth data to the client device such that the client device displays an indication that the battery level for the first A/V device is below the threshold battery level.

In another embodiment of the first aspect, the method further comprises: receiving, after a third time interval has elapsed since the transmitting of the third image data, sixth data from the client device, the sixth data indicating that the client device is still displaying the dashboard associated with the application, the first time interval is different than the third time interval; based at least in part on the sixth data, transmitting seventh data to the first A/V device, the seventh data indicating a third request for fifth image data representing a fifth image; receiving the fifth image data from the first A/V device; and transmitting the fifth image data to the client device such that the client device displays the fifth image, instead of the third image, using the dashboard.

In another embodiment of the first aspect, the method further comprises: receiving sixth data indicating that the first A/V device detected an object; based at least in part on the sixth data, receiving fifth image data from the first A/V device, the fifth image data representing at least a fifth image; and transmitting the fifth image data to the client device such that the client device displays at least the fifth image, instead of the third image and the fourth image, using the dashboard.

In another embodiment of the first aspect, the method further comprises: receiving sixth data representing a selection of a portion of the dashboard corresponding to the first A/V device; based at least in part on the sixth data, transmitting seventh data to the first A/V device, the seventh data indicating a third request for fifth image data representing at least a fifth image; receiving the fifth image data from the first A/V device; and transmitting the fifth image data to the client device such that the client device displays at least the fifth image, instead of the third image and the fourth image, using the dashboard.

In another embodiment of the first aspect, the method further comprises: receiving sixth data from an electronic device, the sixth data representing a current mode of a security system; and transmitting, to the client device, seventh data representing the current mode of the security system such that the client device displays the current mode of the security system using the dashboard.

In another embodiment of the first aspect, the method further comprises: receiving sixth data from the client device, the sixth data representing a selection of an interface element associated with the dashboard, the interface element associated with causing a security system to enter a mode; and transmitting, to an electronic device, seventh data representing the mode of the security system such that the electronic device causes the security system to enter the mode.

In another embodiment of the first aspect 1, the method further comprises: generating sixth data indicating a first number of events associated with the first A/V device and a second number of events associated with the second A/V device; and transmitting the sixth data to the client device such that the client device displays a first indication of the first number of events and a second indication of the second number of events.

In a second aspect, one or more network devices comprises: one or more network interfaces; one or more processors; and one or more computer-readable media storing instructions that, when executed by the one or more processors, cause the one or more processors to perform operations comprising: receiving, using the one or more network devices, first data from a client device, the first data indicating that the client device is displaying a graphical user interface (GUI) associated with an application; based at least in part on the first data, receiving, using the one or more network interfaces, first image data generated by a first audio/video (A/V) device, the first image data representing a first image; based at least in part on the first data, receiving, using the one or more network interfaces, second image data generated by a second A/V device, the second image data representing a second image; transmitting, using the one or more network interfaces, the first image data to the client device such that the client device displays the first image using the GUI; transmitting, using the one or more network interface, the second image data to the client device such that the client device displays the second image using the GUI; determining that a first time interval has elapsed since the transmitting of the first image data; based at least in part on the first time interval elapsing, transmitting, using the network interface, second data to the first A/V device, the second data indicating a first request for third image data representing a third image; receiving, using the one or more network interfaces, the third image data from the first A/V device; transmitting, using the one or more network interfaces, the third image data to the client device such that the client device displays the third image, instead of the first image, using the GUI; determining that a second time interval has elapsed since the transmitting of the second image data; based at least in part on the second time interval elapsing, transmitting, using the one or more network interfaces, third data to the second A/V device, the third data indicating a second request for fourth image data representing a fourth image; receiving, using the one or more network interfaces, the fourth image data from the second A/V device; and transmitting, using the one or more network interfaces, the fourth image data to the client device such that the client device displays the fourth image, instead of the second image, using the GUI.

In an embodiment of the second aspect, the transmitting of the first image data and the second image data causes the client device to display the first image using a first portion of the GUI and display the second image using a second portion of the GUI; the transmitting of the third image data causes the client device to display the third image, instead of the first image, using the first portion of the GUI; and the transmitting fourth image data causes the client device to display the fourth image, instead of the second image, using the second portion of the GUI.

In another embodiment of the second aspect, the transmitting of the first image data and the second image data causes the client device to display the first image using a first tile of the GUI and display the second image using a second tile of the GUI; the transmitting of the third image data causes the client device to display the third image, instead of the first image, using the first tile of the GUI; and the transmitting fourth image data causes the client device to display the fourth image, instead of the second image, using the second tile of the GUI.

In another embodiment of the second aspect, the one or more computer-readable media storing further instructions that, when executed by the one or more processors, cause the one or more processors to perform operations comprising: generating fourth data indicating a first time at which the first image data was generated and a second time at which the second image data was generated; and transmitting, using the one or more network interface, the fourth data to the client device such that the client device displays a first indication of the first time and a second indication of the second time.

In another embodiment of the second aspect, the one or more computer-readable media storing further instructions that, when executed by the one or more processors, cause the one or more processors to perform operations comprising: determining that the client device is still displaying the GUI at the elapse of the first time interval, the transmitting of the second data is further based at least in part on the client device still displaying the GUI at the elapse of the first time interval; and determining that the client device is still displaying the GUI at the elapse of the second time interval, the transmitting of the third data is further based at least in part on the client device still displaying the GUI at the elapse of the second time interval.

In another embodiment of the second aspect, the one or more computer-readable media storing further instructions that, when executed by the one or more processors, cause the one or more processors to perform operations comprising: receiving, using the one or more network interfaces, fourth data indicating that the client device is still displaying the GUI, the transmitting of the second data is further based at least in part on the fourth data; and receiving, using the one or more network interfaces, fifth data indicating that the client device is still displaying the GUI, the transmitting of the third data is further based at least in part on the fifth data.

In another embodiment of the second aspect, the one or more computer-readable media storing further instructions that, when executed by the one or more processors, cause the one or more processors to perform operations comprising: determining that the client device is no longer displaying the GUI; storing the third image data generated by the first A/V device; and storing the fourth image data generated by the second A/V device.

In another embodiment of the second aspect, the one or more computer-readable media storing further instructions that, when executed by the one or more processors, cause the one or more processors to perform operations comprising: receiving, using the one or more network interfaces, fourth data indicating a battery level of the first A/V device; determining that the battery level is below a threshold battery level; generating fifth data indicating that the battery level for the first A/V device is below the threshold battery level; and transmitting, using the one or more network interfaces, the fifth data to the client device such that the client device displays an indication that the battery level for the first A/V device is below the threshold battery level.

In another embodiment of the second aspect, the one or more computer-readable media storing further instructions that, when executed by the one or more processors, cause the one or more processors to perform operations comprising: determining a third time interval has elapsed since the transmitting of the third image data, the third time interval is different than the first time interval; based at least in part on the third time interval elapsing, transmitting, using the one or more network interfaces, fourth data to the first A/V device, the fourth data indicating a third request for fifth image data representing a fifth image; receiving, using the one or more network interfaces, the fifth image data from the first A/V device; transmitting, using the one or more network interfaces, the fifth image data to the client device such that the client device displays the fifth image, instead of the third image, using the GUI.

In another embodiment of the second aspect, the one or more computer-readable media storing further instructions that, when executed by the one or more processors, cause the one or more processors to perform operations comprising: receiving, using the one or more network interfaces, fourth data indicating that the first A/V device detected an object; based at least in part on the fourth data, receiving, using the one or more network interfaces, fifth image data from the first A/V device, the fifth image data representing at least a fifth image; and transmitting, using the one or more network interfaces, the fifth image data to the client device such that the client device displays at least the fifth image, instead of the third image and the fourth image, using the GUI.

In another embodiment of the second aspect, the one or more computer-readable media storing further instructions that, when executed by the one or more processors, cause the one or more processors to perform operations comprising: generating fourth data indicating a first number of events associated with the first A/V device and a second number of events associated with the second A/V device; and transmitting, using the one or more network interfaces, fourth data to the client device such that the client device displays a first indication of the first number of events and a second indication of the second number of events using the GUI.

In another embodiment of the second aspect, the one or more computer-readable media storing further instructions that, when executed by the one or more processors, cause the one or more processors to perform operations comprising: receiving, using the one or more network interfaces, fourth data representing a selection of a portion of the GUI corresponding to the first A/V device; based at least in part on the fourth data, transmitting, using the one or more network interfaces, fifth data to the first A/V device, the fifth data indicating a third request for fifth image data representing at least a fifth image; receiving, using the one or more network interfaces, the fifth image data from the first A/V device; transmitting, using the one or more network interfaces, the fifth image data to the client device such that the client device displays the at least the fifth image, instead of the third image and the fourth image, using the GUI.

In another embodiment of the second aspect, the one or more computer-readable media storing further instructions that, when executed by the one or more processors, cause the one or more processors to perform operations comprising: receiving, using the one or more network interfaces, fourth data from the client device, the fourth data indicating that the first time interval has elapsed, the determining that the first time interval has elapsed is based at least in part on the fourth data; and receiving, using the one or more network interfaces, fifth data from the client device, the fifth data indicating that the second time interval has elapsed, the determining that the second time interval has elapsed is based at least in part on the fourth data.

In another embodiment of the second aspect, the first time interval is similar to the second time interval.

In another embodiment of the second aspect, the first time interval is different than the second time interval.

In a third aspect, a method comprises: receiving first data from a client device, the first data indicating that the client device is displaying a graphical user interface (GUI); based at least in part on the first data, transmitting second data to an electronic device, the second data indicating a first request for first image data representing a first image; receiving the first image data from the electronic device; transmitting the first image data to the client device; receiving, after a time interval has elapsed since the transmitting of the first image data, third data from the client device, the third data indicating that the client device is still displaying the GUI; based at least in part on the third data, transmitting fourth data to the electronic device, the fourth data indicating a second request for second image data representing a second image; receiving the second image data from the electronic device; and transmitting the second image data to the client device.

In an embodiment of the third aspect, the transmitting of the second image data to the client device comprises transmitting the second image data to the client device such that the client device displays the second image, instead of the first image, using the GUI.

In another embodiment of the third aspect, the transmitting of the first image data to the client device comprises transmitting the first image data the client device such that the client device displays first image using a portion of the GUI; and the transmitting of the second image data to the client device comprises transmitting the second image data to the client device such that the client device displays the second image, instead of the first image, using the portion of the GUI.

In another embodiment of the third aspect, the transmitting of the first image data to the client device comprises transmitting the first image data to the client device such that the client device displays the first image using a tile of the GUI; and the transmitting of the second image data to the client device comprises transmitting the second image data to the client device such that the client device displays the second image, instead of the first image, using the tile of the GUI.

In another embodiment of the third aspect, the method further comprises: storing third image data generated by an additional electronic device, the third image data representing a third image; and based at least in part on the first data, transmitting the third image data to the client device.

In another embodiment of the third aspect, the method further comprises: based at least in part on the first data, transmitting fifth data to an additional electronic device, the fifth data indicating a third request for third image data representing a third image; receiving the third image data from the additional electronic device; and transmitting the third image data to the client device;

In another embodiment of the third aspect, the method further comprises: transmitting fifth data to the client device, the fifth data indicating a first time at which the first image data was generated by the electronic device; and transmitting sixth data to the client device, the sixth data indicating a second time at which the second image data was generated by the electronic device.

In another embodiment of the third aspect, the method further comprises: determining that the client device is no longer displaying the GUI; storing the second image data generated by the electronic device; and storing fifth data indicating a time at which the second image data was generated by the electronic device.

In another embodiment of the third aspect, the method further comprises: receiving fifth data indicating a battery level of the electronic device; determining that the battery level is below a threshold battery level; and transmitting, to the client device, sixth data indicating that the battery level for the electronic device is below the threshold battery level.

In another embodiment of the third aspect, the method further comprises: receiving, after an additional time interval has elapsed since the transmitting of the second image data, fifth data from the client device, the fifth data indicating that the client device is still displaying the GUI, the time interval is different than the additional time interval; based at least in part on the fifth data, transmitting sixth data to the electronic device, the sixth data indicating a third request for third image data representing a third image; receiving the third image data from the electronic device; and transmitting the third image data to the client device.

In another embodiment of the third aspect, the method further comprises: receiving fifth data indicating that the electronic device detected an object; based at least in part on the fifth data, receiving third image data from the electronic device, the third image data representing at least a third image; and transmitting the third image data to the client device.

In another embodiment of the third aspect, the method further comprises transmitting fifth data to the client device, the fifth data indicating a number of events associated with the electronic device.

In another embodiment of the third aspect, the method further comprises: receiving fifth data representing a selection of a portion of the GUI corresponding to the electronic device; based at least in part on the fifth data, transmitting sixth data to the electronic device, the sixth data indicating a third request for third image data representing at least a third image; receiving the third image data from the electronic device; and transmitting the third image data to the client device.

In another embodiment of the third aspect, the transmitting of the second image data to the client device comprises transmitting the second image to the client device such that the client device displays the second image using a portion of the GUI, and the method further comprises: receiving fifth data representing a first selection of the portion of the GUI; based at least in part on the fifth data, transmitting sixth data to the electronic device, the sixth data indicating a third request for third image data representing at least a third image; receiving the third image data from the electronic device; transmitting the third image data to the client device such that the client device displays the at least the third image using the portion of the GUI; receiving, from the electronic device, the fourth image data representing at least a fourth image; receiving seventh data representing a second selection of the portion of the GUI; based at least in part on the seventh data, transmitting the fourth image data to the client device such that the client device displays the at least the fourth image data using an additional GUI.

In another embodiment of the third aspect, the method further comprises: receiving fifth data from an additional electronic device, the fifth data representing a current mode of a security system; and transmitting, to the client device, sixth data representing the current mode of the security system such that the client device displays the current mode of the security system using the GUI.

In another embodiment of the third aspect, the method further comprises: receiving fifth data representing a selection of an interface element of the GUI, the interface element being associated with a mode of a security system; and transmitting, to an additional electronic device, sixth data representing the mode of the security system such that the additional electronic device causes the security system to operate in the mode.

In a fourth aspect, one or more network devices comprise: one or more network interfaces; one or more processors; and one or more computer-readable media storing instructions that, when executed by the one or more processors, cause the one or more processors to perform operations comprising: storing first image data generated by an electronic device, the first image data representing a first image; receiving, using the one or more network devices, first data from a client device, the first data indicating that the client device is displaying a graphical user interface (GUI); based at least in part on the first data, transmitting, using the one or more network interfaces, the first image data to the client device; determining that a criterion has been satisfied since the transmitting of the first image data; based at least in part on the criterion being satisfied, transmitting, using the one or more network interfaces, second data to the electronic device, the second data indicating a request for second image data representing a second image; receiving, using the one or more network interfaces, the second image data from the electronic device; transmitting, using the one or more network interfaces, the second image data to the client device.

In an embodiment of the fourth aspect, the determining that the criterion has been satisfied since the transmitting of the first image data comprises determining that a time interval has elapsed since the transmitting of the first image data.

In another embodiment of the fourth aspect, the one or more computer-readable media storing further instructions that, when executed by the one or more processors, cause the one or more processors to perform operations comprising: determining an additional time interval has elapsed since the transmitting of the second image data, the additional time interval is different than the time interval; based at least in part on the additional time interval elapsing, transmitting, using the one or more network interfaces, third data to the electronic device, the third data indicating an additional request for third image data representing a third image; receiving, using the one or more network interfaces, the third image data from the electronic device; transmitting, using the one or more network interfaces, the third image data to the client device.

In another embodiment of the fourth aspect, the determining that the criterion has been satisfied since the transmitting of the first image data comprises receiving, using the one or more network interfaces, third data indicating that the electronic device detected an object.

In another embodiment of the fourth aspect, the determining that the criterion has been satisfied since the transmitting of the first image data comprises receiving, from the client device, third data indicating that the client device is still displaying the GUI.

In another embodiment of the fourth aspect, the one or more computer-readable media storing further instructions that, when executed by the one or more processors, cause the one or more processors to perform operations comprising: based at least in part on the first data, attempting to transmit third data to the electronic device, the third data indicating an additional request for third image data representing a third image; and determining that the one or more network devices are unable to transmit the third data to the electronic device, the transmitting of the first image data to the client device is further based at least in part on the one or more network devices being unable to transmit the third data to the electronic device.

In another embodiment of the fourth aspect, the one or more computer-readable media storing further instructions that, when executed by the one or more processors, cause the one or more processors to perform operations comprising: based at least in part on the first data, transmitting third data to the electronic device, the third data indicating an additional request for third image data representing a third image; receiving the third image data from the electronic device; and determining that a quality associated with the third image is below a threshold quality, the transmitting of the first image data to the client device is further based at least in part on the quality associated with the third image being below the threshold quality.

In another embodiment of the fourth aspect, the electronic device is a first electronic device, and the one or more computer-readable media store further instructions that, when executed by the one or more processors, cause the one or more processors to perform operations comprising: storing third image data generated by a second electronic device, the third image data representing a third image; and based at least in part on the first data, transmitting, using the one or more network interfaces, the third image data to the client device.

In another embodiment of the fourth aspect, the electronic device is a first electronic device, and the one or more computer-readable media store further instructions that, when executed by the one or more processors, cause the one or more processors to perform operations comprising: based at least in part on the first data, transmitting, using the one or more network interfaces, third data to a second electronic device, the third data indicating an additional request for third image data representing a third image; receiving, using the one or more network interfaces, the third image data from the second electronic device; and transmitting, using the one or more network interfaces, the third image data to the client device.

In another embodiment of the fourth aspect, the transmitting of the first image data to the client device causes the client device to display the first image using a portion of the GUI; and the transmitting of the second image data to the client device causes the client device to display the second image, instead of the first image, using the portion of the GUI.

In another embodiment of the fourth aspect, the transmitting of the first image data to the client device causes the client device to display the first image using a tile of the GUI; and the transmitting of the second image data to the client device causes the client device to display the second image, instead of the first image, using the tile of the GUI.

In another embodiment of the fourth aspect, the one or more computer-readable media storing further instructions that, when executed by the one or more processors, cause the one or more processors to perform operations comprising transmitting, using the one or more network interfaces, third data to the client device, the third data indicating a time at which the first image data was generated by the electronic device.

In another embodiment of the fourth aspect, the one or more computer-readable media storing further instructions that, when executed by the one or more processors, cause the one or more processors to perform operations comprising: determining that the client device is still displaying the GUI, the transmitting of the second data to the electronic device is further based at least in part on the client device still displaying the GUI.

In another embodiment of the fourth aspect, the one or more computer-readable media storing further instructions that, when executed by the one or more processors, cause the one or more processors to perform operations comprising: determining that the client device is no longer displaying the GUI; storing the second image data generated by the electronic device; and storing third data indicating a time at which the second image data was generated by the electronic device.

In another embodiment of the fourth aspect, the one or more computer-readable media storing further instructions that, when executed by the one or more processors, cause the one or more processors to perform operations comprising: receiving, using the one or more network interfaces, third data indicating a battery level of the electronic device; determining that the battery level is below a threshold battery level; and transmitting, using the one or more network interfaces, fourth data to the client device, the fourth data indicating that the battery level for the electronic device is below the threshold battery level.

In another embodiment of the fourth aspect, the one or more computer-readable media storing further instructions that, when executed by the one or more processors, cause the one or more processors to perform operations comprising: receiving, using the one or more network interfaces, third data indicating that the electronic device detected an object; based at least in part on the third data, receiving, using the one or more network interfaces, third image data from the electronic device, the fifth image data representing at least a third image; and transmitting, using the one or more network interfaces, the third image data to the client device.

In another embodiment of the fourth aspect, the one or more computer-readable media storing further instructions that, when executed by the one or more processors, cause the one or more processors to perform operations comprising transmitting, using the one or more network interfaces, third data to the client device, the third data indicating a number of events associated with the electronic device.

In another embodiment of the fourth aspect, the one or more computer-readable media storing further instructions that, when executed by the one or more processors, cause the one or more processors to perform operations comprising: receiving, using the one or more network interfaces, third data representing a selection of a portion of the GUI corresponding to the electronic device; based at least in part on the third data, transmitting, using the one or more network interfaces, fourth data to the electronic device, the fourth data indicating an additional request for third image data representing at least a third image; receiving, using the one or more network interfaces, the third image data from the electronic device; and transmitting, using the one or more network interfaces, the third image data to the client device.

In another embodiment of the fourth aspect, the one or more computer-readable media storing further instructions that, when executed by the one or more processors, cause the one or more processors to perform operations comprising: receiving, using the one or more network interfaces, third data representing a first selection of a portion of the GUI corresponding to the electronic device; based at least in part on the third data, transmitting, using the one or more network interfaces, fourth data to the electronic device, the fourth data indicating an additional request for third image data representing at least a third image; receiving, using the one or more network interfaces, the third image data from the electronic device; transmitting, using the one or more network interfaces, the third image data to the client device; receiving, using the one or more network interfaces, fourth image data from the electronic device, the fourth image data representing at least a fourth image; receiving, using the one or more network interfaces, fifth data representing a second selection of the portion of the GUI corresponding to the electronic device; and based at least in part on the fifth data, transmitting, using the one or more network interfaces, the fourth image data to the client device such that the client device displays the at least the fourth image using an additional GUI.

In a fifth aspect, a method comprising: receiving an input associated with a request to display a dashboard associated with an application; based at least in part on the input, transmitting data to a network device, the data indicating the request to display the dashboard; receiving, from the network device, first image generated by a first audio/video (A/V) device, the first image data representing a first image; receiving, from the network device, second image data generated by a second A/V device, the second image data representing a second image; causing the dashboard to be displayed using a display; causing the first image to be displayed using a first portion of the dashboard; causing the second image to be displayed using a second portion of the dashboard; after a first time interval has elapsed and while the dashboard is still being displayed, receiving, from the network device, third image data generated by the first A/V device, the third image data representing a third image; causing the third image to be displayed, instead of the first image, using the first portion of the dashboard; after a second time interval has elapsed and while the dashboard is still being displayed, receiving, from the network device, fourth image data generated by the second A/V device, the fourth image data representing a fourth image; and causing the fourth image to be displayed, instead of the second image, using the second portion of the dashboard.

In an embodiment of the fifth aspect, the causing of the first image to be displayed using the first portion of the dashboard comprises causing the first image to be displayed using a first tile of the dashboard; the causing the second image to be displayed using the second portion of the dashboard comprises causing the second image to be displayed using a second tile of the dashboard; the causing of the third image to be displayed, instead of the first image, using the first portion of the dashboard comprises causing the third image to be displayed, instead of the first image, using the first tile of the dashboard; and the causing of the fourth image to be displayed, instead of the second image, using the second portion of the dashboard comprises causing the fourth image to be displayed, instead of the second image, using the second tile of the dashboard.

In another embodiment of the fifth aspect, the method further comprises displaying at least four tiles arranged a grid pattern using the dashboard, the first tile and the second tile are included in the at least four tiles.

In another embodiment of the fifth aspect, the data is first data, and the method further comprises: based at least in part on the first time interval elapsing, transmitting, to the network device, second data indicating that the client device is still displaying the dashboard, where the receiving of the third image data is based at least in part on the second data; and based at least in part on the second time interval elapsing, transmitting, to the network device, third data indicating that the client device is still displaying the dashboard, where the receiving of the fourth image data is based at least in part on the third data.

In another embodiment of the fifth aspect, the data is first data, and the method further comprises: receiving, from the network device, second data indicating a first time at which the first image data was generated by the first A/V device and a second time at which the second image data was generated by the second A/V device; causing a first indication representing the first time to be displayed within the first portion of the dashboard; and causing a second indication representing the second time to be displayed within the second portion of the dashboard.

In another embodiment of the fifth aspect, the data is first data, and the method further comprises: receiving, from the network device, second data indicating a first number of events associated with the first A/V device and a second number of events associated with the second A/V device; causing a first indication representing the first number of events to be displayed within the first portion of the dashboard; and causing a second indication representing the second number of events to be displayed within the second portion of the dashboard.

In another embodiment of the fifth aspect, the input is a first input and the data is first data, and the method further comprises: receiving a second input indicating a selection of the first portion of the dashboard; based at least in part on the second input, transmitting second data to the network device, the second data indicating the selection of the first portion of the dashboard; receiving, from the network interface, fifth image data generated by the first A/V device, the fifth image data representing at least a fifth image and causing the at least the fifth image to be displayed, instead of the third image and the fourth image, using the dashboard.

In another embodiment of the fifth aspect, the input is a first input and the data is first data, and the method further comprises: receiving a second input indicating a first selection of the first portion of the dashboard; based at least in part on the second input, transmitting second data to the network device, the second data indicating the first selection of the first portion of the dashboard; receiving, from the network interface, fifth image data generated by the first A/V device, the fifth image data representing at least a fifth image; causing the at least the fifth image to be displayed, instead of the third image, using the first portion of the dashboard; receiving a third input indicating a second selection of the first portion of the dashboard; based at least in part on the third input, transmitting third data to the network device, the third data indicating the second selection of the first portion of the dashboard; receiving, from the network interface, sixth image data generated by the first A/V device, the sixth image data representing at least a sixth image; causing a graphical user interface (GUI) to be displayed using the display; and causing the at least the sixth image to be displayed using the GUI.

In another embodiment of the fifth aspect, the input is a first input, and the method further comprises: receiving a second input indicating a selection of the first portion of the dashboard; and based at least in part on the second input, causing one or more settings associated with the first A/V device to be displayed using the display.

In another embodiment of the fifth aspect, the data is first data, and the method further comprises: receiving, from the network device, second data indicating that a battery of the first A/V device is below a threshold battery level; and based at least in part on the second data, causing an interface element to be displayed within the first portion of the dashboard, the interface element indicating that the battery of the first A/V device is below the threshold battery level.

In another embodiment of the fifth aspect, the method further comprises: determining that a light source associated with the first A/V device is activated; and based at least in part on the light source being activated, causing an interface element to be displayed within the first portion of the dashboard, the interface element indicating that the light source is activated.

In another embodiment of the fifth aspect, the method further comprises: after a third time interval has elapsed and while the dashboard is still being displayed, receiving, from the network device, fifth image data generated by the first A/V device, the fifth image data representing a fifth image; and causing the fifth image to be displayed, instead of the third image, using the first portion of the dashboard, the first time interval is different than the third time interval.

In a sixth aspect, a method comprises: receiving an input associated with a request to view a graphical user interface (GUI) associated with an application; based at least in part on the input, transmitting first data to a network device, the first data indicating the request to view the GUI; receiving, from the network device, first image data generated by a first audio/video (A/V) device, the first image data representing a first image; receiving, from the network device, second image data generated by a second A/V device, the second image data representing a second image; causing the GUI to be displayed using a display; causing the first image to be displayed using a first portion of the GUI; causing the second image to be displayed using a second portion of the GUI; while the GUI is still being displayed using the display, determining that a first time interval has elapsed; based at least in part on the first time interval elapsing, transmitting second data to the network device, the second data indicating that the GUI is still being displayed; based at least in part on the second data, receiving, from the network device, third image data generated by the first A/V device, the third image data representing a third image; causing the third image to be displayed, instead of the first image, using the first portion of the GUI; while the GUI is still being displayed using the display, determining that a second time interval has elapsed; based at least in part on the second time interval elapsing, transmitting third data to the network device, the third data indicating that the GUI is still being displayed based at least in part on the third data, receiving, from the network device, fourth image data generated by the second A/V device, the fourth image data representing a fourth image; and causing the fourth image to be displayed, instead of the second image, using the second portion of the GUI.

In a seventh aspect, method comprises: storing first image data generated by a first audio/video (A/V) device, the first image data representing a first image; storing second image data generated by a second A/V device, the second image data representing a second image; receiving an input associated with a request to view a graphical user interface (GUI) associated with an application; based at least in part on the input: causing the GUI to be displayed using a display; causing the first image to be displayed using a first portion of the GUI; causing the second image to be displayed using a second portion of the GUI; while the GUI is still being displayed using the display, receiving, from the network device, third image data generated by the first A/V device, the third image data representing a third image; causing the third image to be displayed, instead of the first image, using the first portion of the GUI; while the GUI is still being displayed using the display, receiving, from the network device, fourth image data generated by the second A/V device, the fourth image data representing a fourth image;

and causing the fourth image to be displayed, instead of the second image, using the second portion of the GUI.

In an embodiment of the seventh aspect, the method further comprises: determining that a first time interval has elapsed since the causing of the first image data to be displayed; based at least in part on the first time interval elapsing, transmitting, to the network device, first data indicating that the GUI is still being displayed; determining that a second time interval has elapsed since the causing of the second image data to be displayed; and based at least in part on the second time interval elapsing, transmitting, to the network device, second data indicating that the GUI is still being displayed, where the receiving of the third image data is based at least in part on the transmitting of the first data, and the receiving of the fourth image data is based at least in part on the transmitting of the second data.

In another embodiment of the seventh aspect, the method further comprises: determining that a first time interval has elapsed since the causing of the first image data to be displayed; based at least in part on the first time interval elapsing, transmitting, to the network device, first data representing a first request for the third image data; determining that a second time interval has elapsed since the causing of the second image data to be displayed; and based at least in part on the second time interval elapsing, transmitting, to the network device, second data representing a second request for the fourth image data.

In another embodiment of the seventh aspect, the causing of the first image to be displayed using the first portion of the GUI comprises causing the first image to be displayed using a first tile of the GUI; the causing the second image to be displayed using the second portion of the GUI comprises causing the second image to be displayed using a second tile of the GUI; the causing of the third image to be displayed, instead of the first image, using the first portion of the GUI comprises causing the third image to be displayed, instead of the first image, using the first tile of the GUI; and the causing of the fourth image to be displayed, instead of the second image, using the second portion of the GUI comprises causing the fourth image to be displayed, instead of the second image, using the second tile of the GUI.

In an eighth aspect, a method comprises: receiving an input associated with a request to display a graphical user interface (GUI); based at least in part on the input, causing the GUI to be displayed using a display; transmitting data to a network device, the data indicating the GUI is being displayed; based at least in part on the data, receiving, from the network device, first image data generated by an electronic device, the first image data representing a first image; causing the first image to be displayed using the GUI; after a time interval has elapsed and while the GUI is still being displayed, receiving, from the network device, second image data generated by the electronic device, the second image data representing a second image; and causing the second image to be displayed, instead of the first image data, using the GUI.

In an embodiment of the eighth aspect, the electronic device is a first electronic device and the time interval is a first time interval, and the method further comprises: based at least in part on the data, receiving, from the network device, third image generated by a second electronic device, the third image data representing a third image; causing the third image to be displayed using the GUI; after a second time interval has elapsed and while the GUI is still being displayed, receiving, from the network device, fourth image data generated by the second electronic device, the fourth image data representing a fourth image; and causing the fourth image to be displayed, instead of the third image, using the GUI.

In another embodiment of the eight aspect, the electronic device is a first electronic device and the time interval is a first time interval, and the method further comprises: storing third image generated by a second electronic device, the third image data representing a third image; based at least in part on the input, causing the third image to be displayed using the GUI; after a second time interval has elapsed and while the GUI is still being displayed, receiving, from the network device, fourth image data generated by the second electronic device, the fourth image data representing a fourth image; and causing the fourth image to be displayed, instead of the third image, using the GUI.

In another embodiment of the eight aspect, the data is first data, and the method further comprises: determining that the time interval has elapsed; and based at least in part on the time interval elapsing, transmitting second data to the client device, the second data indicating that the GUI is still be displayed, the receiving of the second image data is based at least in part on the second data.

In another embodiment of the eight aspect, the causing of the first image to be displayed using the GUI comprises causing the first image to be displayed using a portion of the GUI; and the causing of the second image to be displayed, instead of the first image, using the GUI comprises causing the second image to be displayed, instead of the first image, using the portion of the GUI.

In another embodiment of the eight aspect, the method further comprises: causing a plurality of tiles to be displayed using the GUI, the causing of the first image to be displayed using the GUI comprises causing the first image to be displayed using a tile of the plurality of tiles; and the causing of the second image to be displayed, instead of the first image, using the GUI comprises causing the second image to be displayed, instead of the first image, using the tile.

In another embodiment of the eight aspect, the causing the plurality of tiles to be displayed using the GUI comprises causing the plurality of tiles to be displayed in a grid pattern using the GUI.

In another embodiment of the eight aspect, the time interval is a first time interval, and the method further comprises: after a second time interval has elapsed and while the GUI is still being displayed, receiving, from the network device, third image data generated by the electronic device, the third image data representing a third image; and causing the third image to be displayed, instead of the second image data, using the GUI, the first time interval is different than the second time interval.

In another embodiment of the eight aspect, the data is first data, and the method further comprises: receiving, from the network device, second data indicating a first time at which the first image data was generated by the electronic device; causing a first indication representing the first time to be displayed along with the first image data; receiving, from the network device, third data indicating a second time at which the second image data was generated by the electronic device; and causing a second indication representing the second time to be displayed along with the second image data.

In another embodiment of the eight aspect, the data is first data, and the method further comprises: receiving, from the network device, second data indicating a first number of events associated with the electronic device; and causing an indication of the number of events to be displayed along with at least one of the first image or the second image.

In another embodiment of the eight aspect, the input is a first input and the data is first data, and the method further comprises: receiving a second input indicating a selection of a portion of the GUI that is associated with the electronic device; based at least in part on the second input, transmitting second data to the network device, the second data indicating the selection of the portion of the GUI; receiving, from the network interface, third image data generated by the electronic device, the third image data representing at least a third image; and causing the at least the third image to be displayed, instead of the second image, using the GUI.

In another embodiment of the eight aspect, the input is a first input, the data is first data, and the GUI is a first GUI, and the method further comprises: receiving a second input indicating a first selection of a portion of the first GUI that is associated with the electronic device; based at least in part on the second input, transmitting second data to the network device, the second data indicating the first selection of the portion of the first GUI; receiving, from the network interface, third image data generated by the electronic device, the third image data representing at least a third image; causing the at least the third image to be displayed, instead of the second image, using the first GUI; receiving a third input indicating a second selection of the portion of the first GUI; based at least in part on the third input, transmitting third data to the network device, the third data indicating the second selection of the portion of the first GUI; receiving, from the network interface, fourth image data generated by the electronic device, the fourth image data representing at least a fourth image; causing a second GUI to be displayed using the display; and causing the at least the fourth image to be displayed using the second GUI.

In another embodiment of the eight aspect, the input is a first input and the GUI is a first GUI, and the method further comprises: receiving a second input indicating a selection of a portion of the GUI that is associated with the electronic device; causing a second GUI to be displayed using the display; and based at least in part on the second input, causing one or more settings associated with the electronic device to be displayed using the second GUI.

In another embodiment of the eight aspect, the data is first data, and the method further comprises: receiving, from the network device, second data indicating that a battery of the electronic device is below a threshold battery level; and based at least in part on the second data, causing an interface element to be displayed along with at least one of the first image or the second image, the interface element indicating that the battery of the electronic device is below the threshold battery level.

In another embodiment of the eight aspect, the method further comprises: determining that a light source associated with the electronic device is activated; and based at least in part on the light source being activated, causing an interface element to be displayed along with at least one of the first image or the second image, the interface element indicating that the light source is activated.

In another embodiment of the eight aspect 80, the input is a first input and the data is first data, and the method further comprises: causing an interface element to be displayed along with at least one of the first image or the second image, the interface element being associated with activating a light source of the electronic device; receiving a second input indicating a selection of the interface element; and based at least in part on the second input, transmitting, to the network device, second data indicating the selection of the interface element.

In another embodiment of the eight aspect, the input is a first input and the data is first data, and the method further comprises: causing an interface element to be displayed along with at least one of the first image or the second image, the interface element being associated with causing a security system to operate in a mode; receiving a second input indicating a selection of the interface element; and based at least in part on the second input, transmitting, to the network device, second data indicating the selection of the interface element.

In a ninth aspect, a method comprising: storing first image data generated by an electronic device, the first image data representing a first image; receiving an input associated displaying a graphical user interface (GUI); based at least in part on the input: sending data to a network device, the data representing a request for second image data generated by the electronic device; causing the GUI to be displayed using a display; and causing the first image to be displayed using the GUI; while the GUI is still being displayed, receiving, from a network device, the second image data generated by the electronic device, the second image data representing a second image; and causing the second image to be displayed, instead of the first image, using the GUI.

In an embodiment of the ninth aspect, the electronic device is a first electronic device, and the method further comprises: storing third image data generated by a second electronic device, the third image data representing a third image; based at least in part on the input, causing the third image to be displayed along with the first image; while the GUI is still being displayed, receiving, from the network device, fourth image data generated by the second electronic device, the fourth image data representing a fourth image; and causing the fourth image to be displayed, instead of the third image, using the GUI.

In another embodiment of the ninth aspect, the electronic device is a first electronic device and the data is first data, and the method further comprises: transmitting, to the network device, second data indicating that the GUI is being displayed; receiving, from the network device, third image data generated by a second electronic device, the third image data representing a third image; causing the third image to be displayed along with the first image; after a time interval has elapsed and while the GUI is still being displayed, receiving, from the network device, fourth image data generated by the second electronic device, the fourth image data representing a fourth image; and causing the fourth image to be displayed, instead of the third image data, using the GUI.

In another embodiment of the ninth aspect, the data is first data, and the method further comprises: determining that a time interval has elapsed; based at least in part on the time interval elapsing, transmitting second data to the client device, the second data indicating that the GUI is still be displayed; receiving, from the network device, third image data generated by the electronic device, the third image data representing a third image; causing the third image to be displayed, instead of the second image, using the GUI.

In another embodiment of the ninth aspect, the causing of the first image to be displayed using the GUI comprises causing the first image to be displayed using a portion of the GUI; and the causing of the second image to be displayed, instead of the first image, using the GUI comprises causing the second image to be displayed, instead of the first image, using the portion of the GUI.

In another embodiment of the ninth aspect, the method further comprises: causing a plurality of tiles to be displayed using the GUI, the causing of the first image to be displayed using the GUI comprises causing the first image to be displayed using a tile of the plurality of tiles; and the causing of the second image to be displayed, instead of the first image, using the GUI comprises causing the second image to be displayed, instead of the first image, using the tile.

In another embodiment of the ninth aspect, the causing the plurality of tiles to be displayed using the GUI comprises causing the plurality of tiles to be displayed in a grid pattern using the GUI.

In another embodiment of the ninth aspect, the method further comprises: after a time interval has elapsed and while the GUI is still being displayed, receiving, from the network device, third image data generated by the electronic device, the third image data representing a third image; and causing the third image to be displayed, instead of the first image data, using the GUI, the first time interval is different than the second time interval.

In another embodiment of the ninth aspect, the data is first data, and the method further comprises: causing a first indication representing a first time to be displayed along with the first image, the first time indicating when the first image data was generated by the electronic device; receiving, from the network device, second data indicating a second time at which the second image data was generated by the electronic device; and causing a second indication representing the second time to be displayed along with the second image.

In another embodiment of the ninth aspect, the data is first data, and the method further comprises: receiving, from the network device, second data indicating a first number of events associated with the electronic device; and causing an indication of the number of events to be displayed along with at least one of the first image or the second image.

In another embodiment of the ninth aspect, the input is a first input and the data is first data, and the method further comprises: receiving a second input indicating a selection of a portion of the GUI that is associated with the electronic device; based at least in part on the second input, transmitting second data to the network device, the second data indicating the selection of the portion of the GUI; receiving, from the network interface, third image data generated by the electronic device, the third image data representing at least a third image; and causing the at least the third image to be displayed, instead of the second image, using the GUI.

In another embodiment of the ninth aspect, the input is a first input, the data is first data, and the GUI is a first GUI, and the method further comprises: receiving a second input indicating a first selection of a portion of the first GUI that is associated with the electronic device; based at least in part on the second input, transmitting second data to the network device, the second data indicating the first selection of the portion of the first GUI; receiving, from the network interface, third image data generated by the electronic device, the third image data representing at least a third image; causing the at least the third image to be displayed, instead of the second image, using the first GUI; receiving a third input indicating a second selection of the portion of the first GUI; based at least in part on the third input, transmitting third data to the network device, the third data indicating the second selection of the portion of the first GUI; receiving, from the network interface, fourth image data generated by the electronic device, the fourth image data representing at least a fourth image; causing a second GUI to be displayed using the display; and causing the at least the fourth image to be displayed using the second GUI.

In another embodiment of the ninth aspect, the input is a first input and the GUI is a first GUI, and the method further comprises: receiving a second input indicating a selection of a portion of the GUI that is associated with the electronic device; based at least in part on the second input, causing a second GUI to be displayed using the display; and causing one or more settings associated with the electronic device to be displayed using the second GUI.

In another embodiment of the ninth aspect, the input is a first input and the data is first data, and the method further comprises: causing an interface element to be displayed using the GUI, the interface element being associated with a mode of a security system; receiving a second input indicating a selection of the interface element; and based at least in part on the second input, transmitting, to the network device, second data indicating the selection of the interface element.

In a tenth aspect, a system comprises: one or more network devices configured to: receive first data from a client device, the first data indicating that the client device is displaying a graphical user interface (GUI); based at least in part on the first data, transmit first image data to the client device, the first image data generated by an audio/video (A/V) device and representing a first image; determine that a time interval has elapsed based at least in part on the time interval elapsing, transmit second data to the A/V device, the second data indicating a request for second image data representing a second image; receive the second image data from the A/V device; and transmit the second image data to the client device; and the A/V device configured to: receive the second data from the one or more network devices; and based at least in part on the second data, transmit the second image data to the one or more network devices.

In an embodiment of the tenth aspect, the A/V device is further configured to determine that a first quality associated with the second image exceeds a first threshold quality, and the one or more network devices are further configured to determine that a second quality associated with the second image exceeds a second threshold quality.

In another embodiment of the tenth aspect, the one or more network devices are further configured to: store the first image data; based at least in part on the first data, transmit third data to the A/V device, the third data indicating an additional request for third image data representing a third image; receive the third image data from the A/V device; and determine that a quality of the third image is below a threshold quality, the transmit of the first image data to the client device is further based at least in part on the quality of the third image being below the threshold quality.

In an eleventh aspect, a method comprises: storing first image data generated by an electronic device, the first image data representing a first image; storing a first timestamp associated with the first image data; receiving an input associated displaying a graphical user interface (GUI); based at least in part on the input: transmitting first data to a network device, the first data representing a first request for a second timestamp for second image data generated by the electronic device; causing the GUI to be displayed using a display; and causing the first image to be displayed using the GUI; while the GUI is still being displayed, receiving, from a network device, the second timestamp; comparing the second timestamp to the first timestamp; determining, based at least in part on the comparing the second timestamp to the first timestamp, that the first image should be updated; transmitting second data to the network device, the second data representing a second request for the second image data receiving the second image data from the network device, the second image data representing a second image; and causing the second image to be displayed, instead of the first image, using the GUI.

In an embodiment of the eleventh aspect, the comparing the second timestamp to first timestamp comprises determining a time difference between the second timestamp and the first timestamp, and the method further comprises: determining that the time difference exceeds a threshold length of time, the determining that the first image should be updated is based at least in part on the time difference exceeding the threshold length of time.

In another embodiment of the eleventh aspect, the method further comprises: determining that a time difference between a current time and the second timestamp; determining that the time difference is within a threshold time difference; and determining that the first image should be updated with the second image based at least in part on the time difference being within the threshold time difference.

In another embodiment of the eleventh aspect, the method further comprises: determining that the second time indicated by the second timestamp occurs after a third time indicated by settings associated with the electronic device; and determining that the first image should be updated with the second image based at least in part on the second time occurring after the third time.

In another embodiment of the eleventh aspect, the method further comprises: after a time interval has elapsed and while still displaying the GUI, receiving, from the network device, third image data generated by the electronic device, the third image data representing a third image; and causing the third image to be displayed, instead of the second image, using the GUI.

In a twelfth aspect, a method comprises: receiving, by a client device, a request to open an application; causing the application to be opened; causing a graphical user interface (GUI) associated with the application to be displayed on a display of the client device; transmitting first data to a network device, the first data including a first request for first image data generated by an electronic device; receiving, from the network device, the first image data generated by the electronic device, the first image data representing a first image; causing the first image to be displayed on the display of the client device; receiving, from the network device, second data indicating a first time at which the first image data was generated by the electronic device; causing a first indication associated with the first time to be displayed on the display of the client device along with the first image; determining that a time interval has elapsed; after determining that the time interval has elapsed, transmitting third data to the network device, the third data including a second request for second image data generated by the electronic device; receiving, from the network device, the second image data generated by the electronic device, the second image data representing a second image; causing the second image to be displayed, instead of the first image, on the display of the client device; receiving, from the network device, fourth data indicating a second time at which the second image data was generated by the electronic device; and causing a second indication associated with the second time to be displayed on the display of the client device along with the second image.

In an embodiment of the twelfth aspect, the method further comprising: receiving, from the network device, third image data generated by an additional electronic device, the third image data representing a third image; causing the third image to be displayed on the display of the client device along with the first image; receiving, from the network device, fifth data indicating a third time at which the third image data was generated by the additional electronic device; causing a third indication associated with the third time to be displayed on the display of the client device along with the third image; determining that an additional time interval has elapsed; after determining that the additional time interval has elapsed, transmitting sixth data to the network device, the sixth data including a third request for fourth image data generated by the additional electronic device; receiving, from the network device, the fourth image data generated by the additional electronic device, the fourth image data representing a fourth image; causing the fourth image to be displayed, instead of the third image, on the display of the client device; receiving, from the network device, seventh data indicating a fourth time at which the fourth image data was generated by the additional electronic device; and causing a fourth indication associated with the fourth time to be displayed on the display of the client device along with the fourth image.

In another embodiment of the twelfth aspect, the method further comprising: receiving an input corresponding to a user selecting the second image; after receiving the input, transmitting fifth data to the network device, the fifth data including a third request for third image data generated by the electronic device; receiving, from the network device, the third image data generated by the electronic device, the third image data representing video recorded by the electronic device; causing the video to be displayed, instead of the second image, on the display.

In another embodiment of the twelfth aspect, the method further comprising: receiving, from the network device, fourth data representing information associated with the electronic device; and causing the information to be displayed on the display, the information being displayed along with at least one of the first image or the second image.

In a thirteenth aspect, a method comprising: receiving an input associated with a request to open an application; opening the application and displaying, on a display of a client device, a graphical user interface (GUI) associated with the application; transmitting first data to a network device, the first data indicating the opening of the application; receiving, from the network device, first image data generated by an electronic device, the first image data representing a first image; causing the first image to be displayed on a portion of the display; after a time interval has elapsed, receiving, from the network device, second image data generated by the electronic device, the second image data representing a second image; and causing the second image to be displayed, instead of the first image, on the portion of the display.

In an embodiment of the thirteenth aspect, the method further comprising: after the time interval has elapsed, transmitting second data to the network device, the second data indicating that the application is still open, receiving the first image data generated by the electronic device occurs after transmitting the second data to the network device.

In another embodiment of the thirteenth aspect, the method further comprising: receiving, from the network device, third image data generated by an additional electronic device, the third image data representing a third image; and causing the third image to be displayed on an additional portion of the display.

In another embodiment of the thirteenth aspect, the method further comprising: after an additional time interval has elapsed, receiving, from the network device, fourth image data generated by the additional electronic device, the fourth image data representing a fourth image; and causing the fourth image to be displayed, instead of the third image, on the additional portion of the display.

In another embodiment of the thirteenth aspect, the method further comprising: causing a plurality of tiles to be displayed on the display, the plurality of tiles including at least a first tile associated with the portion of the display and a second tile associated with the additional portion of the display, wherein: causing the first image to be displayed on the portion of the display comprises causing the first image to be displayed in the first tile; causing the second image to be displayed, instead of the first image, on the portion of the display comprises causing the second image to be displayed, instead of the first image, in the first tile; causing the third image to be displayed on the additional portion of the display comprises causing the third image to be displayed in the second tile; and causing the fourth image to be display, instead of the third image, on the additional portion of the display comprises causing the fourth image to be displayed, instead of the third image, in the second tile.

In another embodiment of the thirteenth aspect, the method further comprising: receiving, from the network device, second data indicating a first time at which the first image data was generated by the electronic device; causing a first indication associated with the first time to be displayed on the display along with the first image; receiving, from the network device, third data indicating a second time at which the second image data was generated by the electronic device; and causing a second indication associated with the second time to be displayed on the display along with the second image.

In another embodiment of the thirteenth aspect, the method further comprising: receiving, from the network device, second data indicating a status of a sensor; and causing an indication of the status to be displayed on an additional portion of the display.

In another embodiment of the thirteenth aspect, the method further comprising: receiving an additional input associated with a user selecting the second image; after receiving the additional input, transmitting second data to the network device, the second data including an additional request for third image data generated by the electronic device; receiving, from the network device, the third image data generated by the electronic device, the third image data representing at least a third image; and causing the at least the third image to be displayed, instead of the second image, on the portion of the display.

In another embodiment of the thirteenth aspect, the method further comprising: causing an interface element to be displayed on the display, the interface element associated with a function of the electronic device; receiving an additional input associated with a user selecting the interface element; and after receiving the additional input, transmitting second data to the network device, the second data representing a command to cause the electronic device to perform the function.

In another embodiment of the thirteenth aspect, the method further comprising: receiving, from the network device, second data representing information associated with the electronic device, the information including at least one of: a number of events detected by the electronic device; a battery level associated with the electronic device; or a state of a light source of the electronic device; and causing the information to be displayed on the display along with at least one of the first image or the second image.

In another embodiment of the thirteenth aspect, the method further comprising: while the application is still open, receiving, from the network device, second data indicating that the electronic device detected an event; and causing an indication of the event to be displayed on the display.

In another embodiment of the thirteenth aspect, the method further comprising: receiving, from the network device, second data representing a current state of a security system associated with the electronic device; and causing an indication of the current state of the security system to be displayed on an additional portion of the display.

In another embodiment of the thirteenth aspect, the method further comprising: causing at least one interface element to be displayed on an additional portion of the display, the at least one interface element associated with changing a mode of a security system; receiving an additional input associated with a user selecting an interface element from the at least one interface element; and after receiving the additional input, transmitting second data to the network device, the second data representing a command to change the mode of the security system.

In a fourteenth aspect, a network device comprising: one or more network interfaces; one or more processors; and one or more computer-readable media storing instructions that, when executed by the one or more processors, cause the one or more processors to perform operations comprising: receiving, using the one or more network interfaces, first image data generated by an electronic device, the first image data representing a first image; receiving, using the one or more network interfaces, first data from a client device, the first data indicating that an application is open on the client device; after receiving the first data, transmitting, using the one or more network interfaces, the first image data to the client device; receiving, using the one or more network interfaces, second image data generated by the electronic device, the second image data representing a second image; determining that a time period has elapsed since transmitting the first image data and that the application is still open on the client device; and transmitting, using the one or more network interfaces, the second image data to the client device.

In an embodiment of the fifteenth aspect, the one or more computer-readable media store further instructions that, when executed by the one or more processors, cause the one or more processors to perform further operations comprising: transmitting, using the one or more network interfaces, second data to the client device, the second data indicating a first time at which the first image data was generated by the electronic device; and transmitting, using the one or more network interfaces, third data to the client device, the third data indicating a second time at which the second image data was generated by the electronic device.

In another embodiment of the fifteenth aspect, the one or more computer-readable media store further instructions that, when executed by the one or more processors, cause the one or more processors to perform further operations comprising: receiving, using the one or more network interfaces, second data representing information associated with the electronic device, the information including at least one of: a number of events detected by the electronic device; a battery level associated with the electronic device; or a state of a light source of the electronic device; and transmitting, using the one or more network interfaces, third data representing the information to the client device.

What is claimed is:

1. A method comprising:
sending, to a network device, a first request for first image data generated by a first electronic device;
receiving, from the network device:
   the first image data generated by the first electronic device; and
   first time data indicating a first time at which the first image data was generated by the first electronic device;
causing a first image representing by the first image data to be displayed on a display of a user device;
causing a first indication associated with the first time to be displayed on the display along with the first image;
determining, by the user device, that a first time interval has elapsed;
based at least in part on the determining that the first time interval has elapsed, sending, by the user device and to the network device, a second request for second image data generated by the first electronic device;
receiving, from the network device:
   the second image data generated by the first electronic device; and
   second time data indicating a second time at which the second image data was generated by the first electronic device;
causing a second image represented by the second image data to be displayed, instead of the first image, on the display; and
causing a second indication associated with the second time data to be displayed on the display along with the second image.

2. The method as recited in claim 1, further comprising:
receiving, from the network device:
   third image data generated by a second electronic device; and
   third time data indicating a third time at which the third image data was generated by the second electronic device;
causing a third image represented by the third image data to be displayed on the display along with the first image;
causing a third indication associated with the third time to be displayed on the display along with the third image;
determining that a second time interval has elapsed;
based at least in part on the determining that the second time interval has elapsed, sending, to the network device, a third request for fourth image data generated by the second electronic device;
receiving, from the network device:
   the fourth image data generated by the second electronic device; and
   fourth time data indicating a fourth time at which the fourth image data was generated by the second electronic device;
causing a fourth image represented by the fourth image data to be displayed, instead of the third image, on the display; and
causing a fourth indication associated with the fourth time to be displayed on the display along with the fourth image.

3. The method as recited in claim 1, further comprising:
receiving an input corresponding to a selection of the second image;
based at least in part on the selection, sending, to the network device, a third request for third image data generated by the first electronic device;
receiving the third image data from the network device; and
causing at least a third image represented by the third image data to be displayed, instead of the second image, on the display.

4. A method comprising:
sending, to a network device, first data associated with an application;
receiving, from the network device, second data generated by a first electronic device, the second data representing a first image;
sending the second data to a display of the user device to cause the first image to be displayed;
determining that a first time interval has elapsed since the receiving of the second data;
determining that the application is still open on the user device;
based at least in part on the determining that the first time interval has elapsed and the application is still open on the user device, sending, to the network device, third data associated with the application;
based at least in part on the sending of the third data, receiving, from the network device, fourth data generated by the first electronic device, the fourth data representing a second image; and
sending the fourth data to the display to cause the second image to replace the first image.

5. The method as recited in claim 4, further comprising:
receiving, from the network device, fifth data generated by a second electronic device, the fifth data representing a third image; and
sending the fifth data to the display to the third image to be displayed with the first image.

6. The method as recited in claim 5, further comprising:
based at least in part on a second time interval having elapsed, receiving, from the network device, sixth data generated by the second electronic device, the sixth data representing a fourth image; and
sending the sixth data to the display to cause the fourth image to replace the third image.

7. The method as recited in claim 6, wherein:
the sending of the second data to the display causes the first image represented by the second data to be displayed at a first portion of the display;
the sending of the fourth data to the display causes the second image represented by the fourth data to be displayed, instead of the first image, at the first portion;
the sending of the fifth data to the display causes the third image represented by the fifth data to be displayed at a second portion of the display; and
the sending of the sixth data to the display causes the fourth image represented by the sixth data to be displayed, instead of the third image, at the second portion.

8. The method as recited in claim 4, further comprising:
receiving, from the network device, fifth data indicating a first time at which the second data was generated by the first electronic device;
sending the fifth data to the display;
receiving, from the network device, sixth data indicating a second time at which the fourth data was generated by the first electronic device; and
sending the sixth data to the display.

9. The method as recited in claim 4, further comprising:
receiving, from the network device, fifth data indicating a status of a sensor, the status indicating at least one of:

an open state;
a closed state; or
motion detected; and
sending the fifth data to the display.

10. The method as recited in claim 4, further comprising:
receiving input data corresponding to a selection;
based at least in part on the selection, sending, to the network device, a request for fifth data generated by the first electronic device;
receiving the fifth data from the network device, the fifth data representing a third image; and
sending the fifth data to the display to cause the third image to be displayed instead of the second image.

11. The method as recited in claim 4, further comprising:
sending, to the display, fifth data representing an interface element, the interface element associated with a function of the first electronic device;
receiving input data corresponding to a selection of the interface element; and
based at least in part on the selection, sending, to the network device, a command to cause the first electronic device to perform the function.

12. The method as recited in claim 4, further comprising:
receiving, from the network device, information associated with the first electronic device, the information including at least one of:
  a number of events detected by the first electronic device;
  a battery level associated with the first electronic device; or
  a state of a light source of the first electronic device; and
sending the information to the display.

13. The method as recited in claim 4, further comprising:
receiving, from the network device, fifth data representing a current state of a security system associated with the first electronic device, the current state including at least one of:
  home mode;
  away mode; or
  disarmed mode; and
sending the fifth data to the display.

14. The method as recited in claim 4, further comprising:
sending fifth data representing at least one interface element to the display, the at least one interface element associated with changing a mode of a security system;
receiving input data corresponding to a selection of an interface element from the at least one interface element; and
based at least in part on the selection, sending, to the network device, a command to change the mode of the security system.

15. The method as recited in claim 4, wherein
the sending of the first data associated with the application comprises sending, by the user device and to the network device, the first data representing a first request for the second data; and
the sending of the third data associated with the application comprises sending, by the user device and to the network device, the third data representing a second request for the fourth data.

16. The method as recited in claim 4, wherein
the sending of the first data associated with the application comprises sending, by the user device and to the network device, the first data indicating that the application is open on the user device; and
the sending of the third data associated with the application comprises sending, by the user device and to the network device, the third data indicating that the application is still open on the user device.

17. The method as recited in claim 4, further comprising:
determining that the first electronic device is associated with a portion of the display; and
sending, to the display, a command to display the first image using the portion of the display.

18. A network device comprising:
one or more network interfaces;
one or more processors; and
one or more computer-readable media storing instructions that, when executed by the one or more processors, cause the one or more processors to perform operations comprising:
  receiving, using the one or more network interfaces, first data from a user device, the first data indicating that an application is open on the user device;
  receiving, using the one or more network interface, second data generated by an electronic device, the second data representing a first image;
  based at least in part on the receiving of the first data, sending, using the one or more network interfaces, the second data to the user device;
  receiving, using the one or more network interfaces, third data from the user device, the third data indicating that the application is still open on the user device;
  determining that a time interval has elapsed since the sending of the second data;
  based at least in part on the determining that the time interval has elapsed, sending, using the one or more network interfaces and to the electronic device, a request for fourth data;
  receiving, using the one or more network interfaces, the fourth data generated by the electronic device, the fourth data representing a second image; and
  sending, using the one or more network interfaces, the fourth data to the user device.

19. The network device as recited in claim 18, the one or more computer-readable media storing further instructions that, when executed by the one or more processors, cause the one or more processors to perform further operations comprising:
  sending, using the one or more network interfaces, fifth data to the user device, the fifth data indicating a first time at which the second data was generated by the electronic device; and
  sending, using the one or more network interfaces, sixth data to the user device, the sixth data indicating a second time at which the fourth data was generated by the electronic device.

20. The network device as recited in claim 18, the one or more computer-readable media storing further instructions that, when executed by the one or more processors, cause the one or more processors to perform further operations comprising:
  receiving, using the one or more network interfaces, information associated with the electronic device, the information including at least one of:
    a number of events detected by the electronic device;
    a battery level associated with the electronic device; or
    a state of a light source of the electronic device; and sending, using the one or more network interfaces, the information to the user device.

\* \* \* \* \*